(12) United States Patent
Fujinaka

(10) Patent No.: US 6,774,524 B2
(45) Date of Patent: Aug. 10, 2004

(54) MOTOR CORE AND MOTOR USING THE SAME

(75) Inventor: Hiroyasu Fujinaka, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 24 days.

(21) Appl. No.: 10/668,591

(22) Filed: Sep. 23, 2003

(65) Prior Publication Data

US 2004/0056554 A1 Mar. 25, 2004

Related U.S. Application Data

(62) Division of application No. 09/607,103, filed on Jun. 29, 2000.

(30) Foreign Application Priority Data

Jun. 29, 1999 (JP) ............................................. 11-182866

(51) Int. Cl.[7] ................................................ H02K 1/00
(52) U.S. Cl. ......................... 310/216; 310/261; 310/269
(58) Field of Search ................................. 310/216, 261, 310/269, 258, 259, 152, 154.01, 154.02, 154.34, 154.35

(56) References Cited

U.S. PATENT DOCUMENTS

| 4,672,253 | A |   | 6/1987 | Tajima et al. |
| 5,030,864 | A |   | 7/1991 | Van Hout et al. |
| 5,057,731 | A | * | 10/1991 | Hancock ...................... 310/180 |
| 5,760,520 | A | * | 6/1998 | Hasebe et al. ............... 310/261 |
| 6,081,058 | A | * | 6/2000 | Suzuki et al. ........... 310/156.45 |
| RE37,027 | E | * | 1/2001 | Torok .......................... 310/181 |
| 6,316,850 | B1 | * | 11/2001 | Nakamura ............ 310/40 MM |

FOREIGN PATENT DOCUMENTS

| JP | 2-254954 | 10/1990 |
| JP | 3-3622 | 1/1991 |
| JP | 4-304151 | 10/1992 |

* cited by examiner

Primary Examiner—Thanh Lam
(74) Attorney, Agent, or Firm—RatnerPrestia

(57) ABSTRACT

A motor generating cogging torque has one-quarter the cycle of basic cogging torque and an extremely small absolute value. First, in order to reduce the cycle of the cogging torque to one-half the cycle of the basic cogging torque, a basic configuration of the core is determined by setting opening angles of its slots to an appropriate electrical angle ranging from 80° to 95° and from 20° to 35°. Next, to produce the above-mentioned effects, an angular displacement of one-quarter the cycle of the basic cogging torque is provided in the motor. Furthermore, polarizing the core with a skew angle equal to one-half or less the cycle of the basic cogging torque at the same time allows the cogging torque to be reduced effectively while decrease in efficiency is minimized.

32 Claims, 54 Drawing Sheets

Angle of rotation (°)
(in mechanical angle)

Angle of rotation (°)
(in mechanical angle)

Angle of rotation (°)
(in mechanical angle)

Angle of rotation (°)
(in mechanical angle)

Angle of rotation (°)
(in mechanical angle)

Angle of rotation (°)
(in mechanical angle)

Electrical angle (°)

Electrical angle (°)

Electrical angle (°)

Electrical angle (°)

Angle of rotation (°)
(in mechanical angle)

Angle of rotation (°)
(in mechanical angle)

Angle of rotation (°)
(in mechanical angle)

Angle of rotation (°)
(in mechanical angle)

Angle of rotation (°)
(in mechanical angle)

Angle of rotation (°)
(in mechanical angle)

MOTOR CORE AND MOTOR USING THE SAME

This Application is a divisional of U.S. patent application Ser. No. 09/607,103, filed Jun. 29, 2000.

FIELD OF THE INVENTION

The present invention relates to a motor to be used for information, audiovisual, industrial equipment, and the like.

BACKGROUND OF THE INVENTION

Recently, higher-density recording is being promoted in the motors used for information, audiovisual equipment, etc. as represented by a digital video disk drive (DVD) unit and a hard disk drive (HDD) unit. With these advances, the motors used for such equipment are required to have higher rotational accuracy. There is also a growing demand for motors used in the machinery for manufacturing such equipment to have rotation accuracy high enough to meet the rotational accuracy of the equipment.

The causes of deteriorating the rotational accuracy of a motor are: (1) cogging torque resulting from a change in magnetic attraction force between the core and the magnet of a motor; (2) torque ripples produced from the current flowing; and (3) irregular vibration resulting from the shaft whiling with some deviation in the bearing. Among these causes, this invention particularly addresses reduction of cogging torque.

Conventional techniques of reducing cogging torque by specifically designing plane configurations of cores are disclosed in Japanese Patent Application Non-examined Publication No.H04-304151, Japanese Patent Application Non-examined Publication No.H09-163649, Japanese Patent Application Non-examined Publication No.H09-285047, and others.

The motor structure described in the above-mentioned Japanese Patent Application Non-examined Publication No.H04-304151 is shown in FIG. 52. In FIG. 52, the core reduces cogging torque by providing a positional relation with slightly different angles between salient pole tips 311, 312, 321, 322, 331, 332 and respective poles of magnet 302.

Meanwhile, techniques of reducing cogging torque by changing axial configurations instead of plane configurations of cores are disclosed in Japanese Patent Application Non-examined Publication No.H02-254954 and Japanese Patent Application Non-examined Publication No.H03-3622.

The motor structure described in the above-mentioned Japanese Patent Application Non-examined Publication No.H02-254954 is shown in FIG. 53.

In FIG. 53, cylindrical core 401 is divided into upper core 411 and lower core 412. The positional relation between upper core 411 and the magnet is different from that between lower core 412 and the magnet. This structure cancels out the cogging torque waveforms generated by the upper and lower cores each other, thereby reducing the cogging torque of the entire motor.

FIG. 54 shows the structure of a motor armature described in Japanese Patent Application Non-examined Publication No.H03-3622.

In FIG. 54, laminated core 501 is configured by axially laminating cores in which salient poles have different opening angles (an angle a salient pole tip forms with respect to the center of the core), or the salient poles of teeth have different widths at X and Y. This structure allows different cogging torque waveforms to be canceled, thereby reducing cogging torque.

Techniques of reducing cogging torque using specifically designed magnet polarization instead of core shapes are disclosed in Japanese Patent Publication No.2588661. A structure of a brushless motor described in the publication is shown FIG. 55.

In FIG. 55, the motor is made in 4:3 structure in which ring-shaped magnet 602 has 4n poles and the stator core has 3n poles. Skew angle θ2 of the magnetic poles of rotor magnet 602 is set as $(30°/n) \times 0.8 \leq \theta2 \leq (30°/n) \times 1.2$. This structure reduces cogging torque and distortion ratio of induced voltages.

However, these conventional techniques have the following problems.

First, among the techniques mentioned above, those utilizing core shapes have not completely eliminated cogging torque even though produced a certain extent of effects. Consequently, a level of cogging torque remains producing at one-half the cycle of basic cogging torque determined by a least common multiple of the number of core slots and the number of field poles.

Basic cogging torque may be calculated, for example, by determining the least common multiple (LCM) of the number of magnetic poles and the number of core slots in the motor. The LCM is divided into 360 degrees to calculate a basic cogging torque cycle. For 8 poles and 6 slots, for example, the basic cogging torque cycle is 15 degrees ((360 degrees/LCM 24)=15 degrees).

Meanwhile, for conventional techniques of providing a magnet with a skew, a large skew angle is needed for effective reduction of cogging torque. This generates more ineffective magnetic flux; thus involving such adverse effects in performance as decreasing motor efficiency and increasing core loss. Furthermore, as considerably affecting accuracy in polarization or motor assembling, the conventional techniques have posed problems such as unstable motor characteristics.

SUMMARY OF THE INVENTION

The present invention reduces the cycle of the cogging torque produced due to a basic configuration of a core to one-quarter or less of the cycle of basic cogging torque determined by a least common multiple of the number of core salient poles and the number of field poles, and to minimize the absolute value of the cogging torque as well.

The motor core of the present invention has the following structure.

A core used in a motor having magnetic field generating means having N and S magnetic poles for generating a magnetic field and the core made of magnetic material and opposed to the magnetic field generating means, where one of the magnetic field generating means and the core rotates with respect to the other:

in which the number of magnetic poles is 2m and the number of core slots is 6n (m and n are integers), and in which a basic configuration of the core is determined by setting its slot opening angles (where "slot opening angle" is an angle a slot opening forms with respect to the center of the core) to a value ranging from 80° to 95° in electrical angle α (each corresponding to (α/m)° in mechanical angle) and from 20° to 35° in electrical angle β (each corresponding to (β/m)° in mechanical angle). This configuration allows the cycle of produced cogging torque to be reduced to one-half the cycle of basic cogging torque.

Electrical angle is defined in relationship to that portion of the core occupied by a pair of N and S magnets. One N and S magnet pair are assumed to occupy an electrical angle of 360 degrees. Thus, for example, if a slot occupies one half of the circumference occupied by an N and S magnet pair, then the slot is said to have an electrical angle of 180 degrees.

In addition, two core shapes are combined so that the slots in each core are displaced by an angle equal to one-quarter the cycle of the basic cogging torque (($90/k$)° in mechanical angle [k is a least multiple of 2m and 6n]). This cancels different cogging torque waveforms in the same motor, thereby reducing the resultant cogging torque cycle to one-quarter the cycle of the basic cogging torque and also minimizing the absolute value of the cogging torque.

Moreover, by polarizing the core with a skew angle equal to one-half or less the angle used for conventional techniques, the cogging torque can be further reduced while decrease in motor efficiency is minimized.

BRIEF DESCRIPTION OF THE DRAWINGS

FIG. 45B illustrates a cross section taken on line 45B—45B of the core shape shown in FIG. 45A;

FIG. 45C illustrates a cross section taken on line 45C—45C of the core shape shown in FIG. 45A;

FIG. 45D illustrates a cross section taken on line 45D—45D of the core shape shown in FIG. 45A;

FIG. 45E illustrates a cross section taken on line 45E—45E of the core shape shown in FIG. 45A;

FIG. 46A illustrates a vertical section of a laminated core shape in accordance with a nineteenth embodiment of the present invention;

FIG. 46B illustrates a cross section taken on line 46B—46B of the core shape shown in FIG. 46A;

FIG. 46C illustrates a cross section taken on line 46C—46C of the core shape shown in FIG. 46A;

Figure 46A:
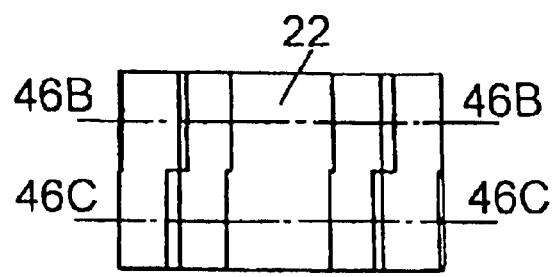
Figure 46B:
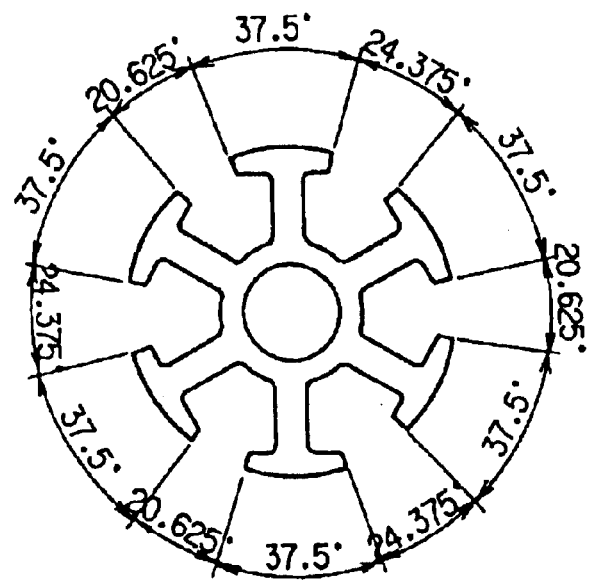
Figure 46C:
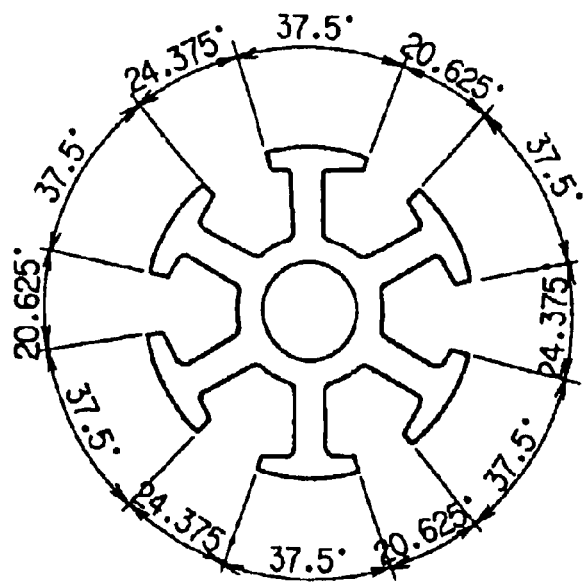
Figure 47A:
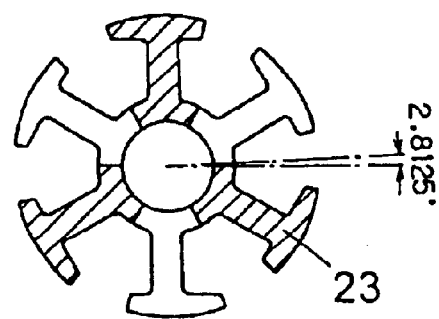
Figure 47B:
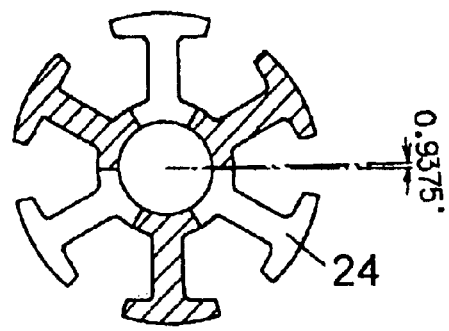
Figure 47C:
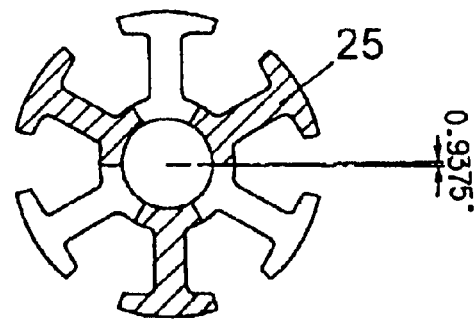
Figure 47D:
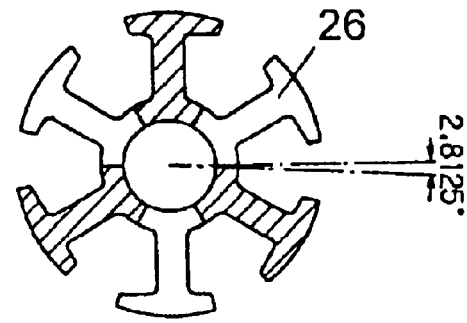
Figure 48A:
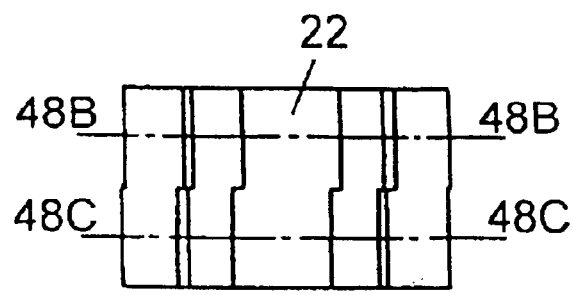
Figure 48B:
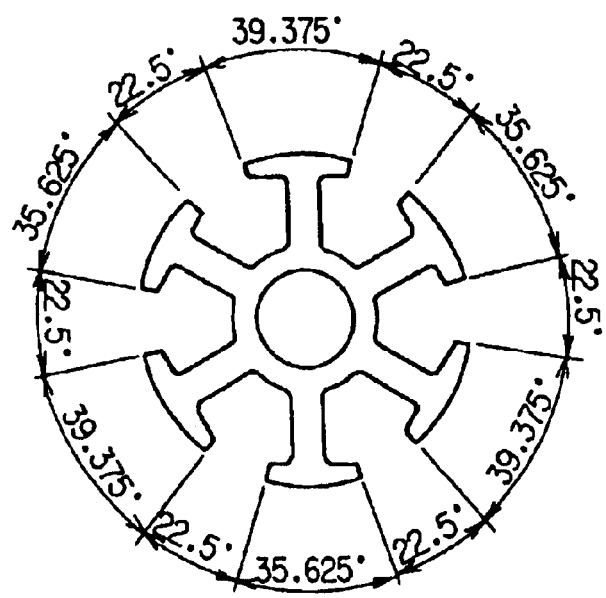
Figure 48C:
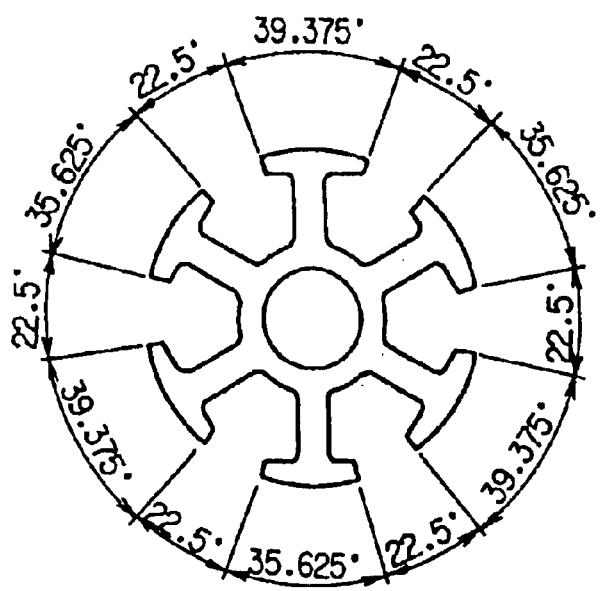
Figure 49A:
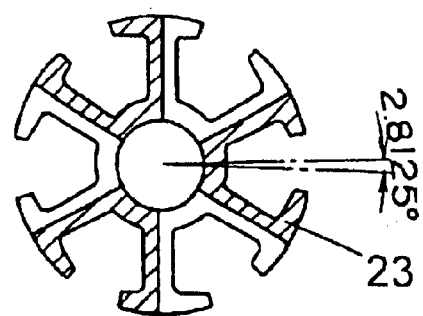
Figure 49B:
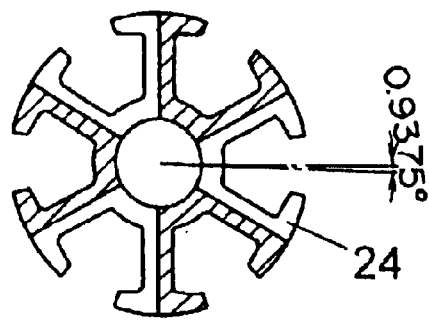
Figure 49C:
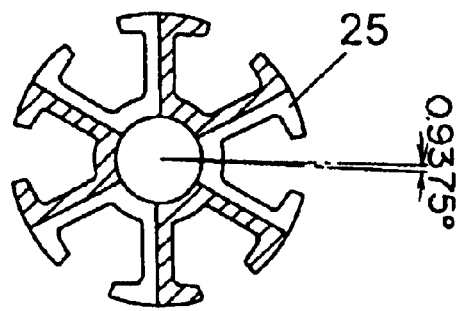
Figure 49D:
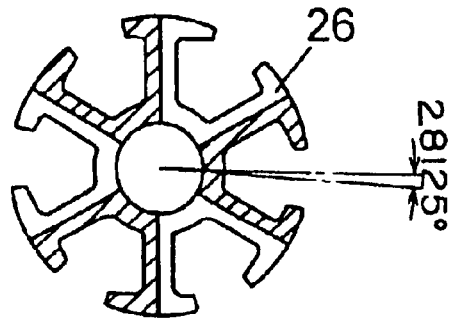
Figure 50:
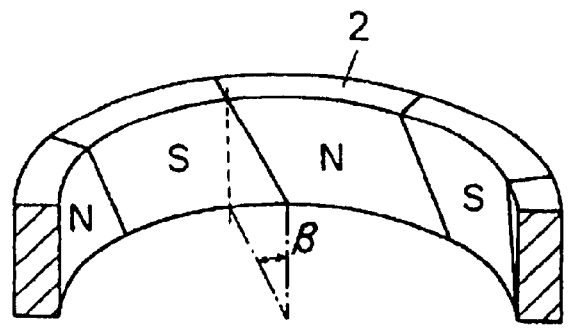
Figure 51A:
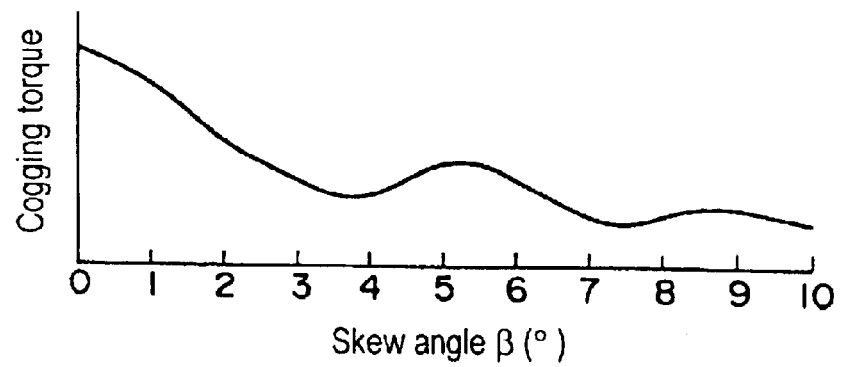
Figure 51B:
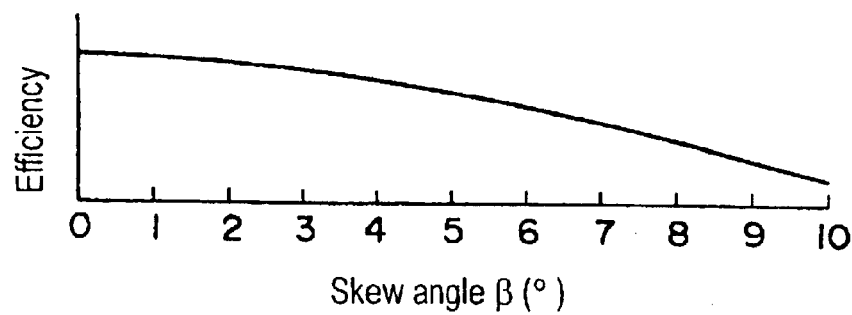
Figure 52:
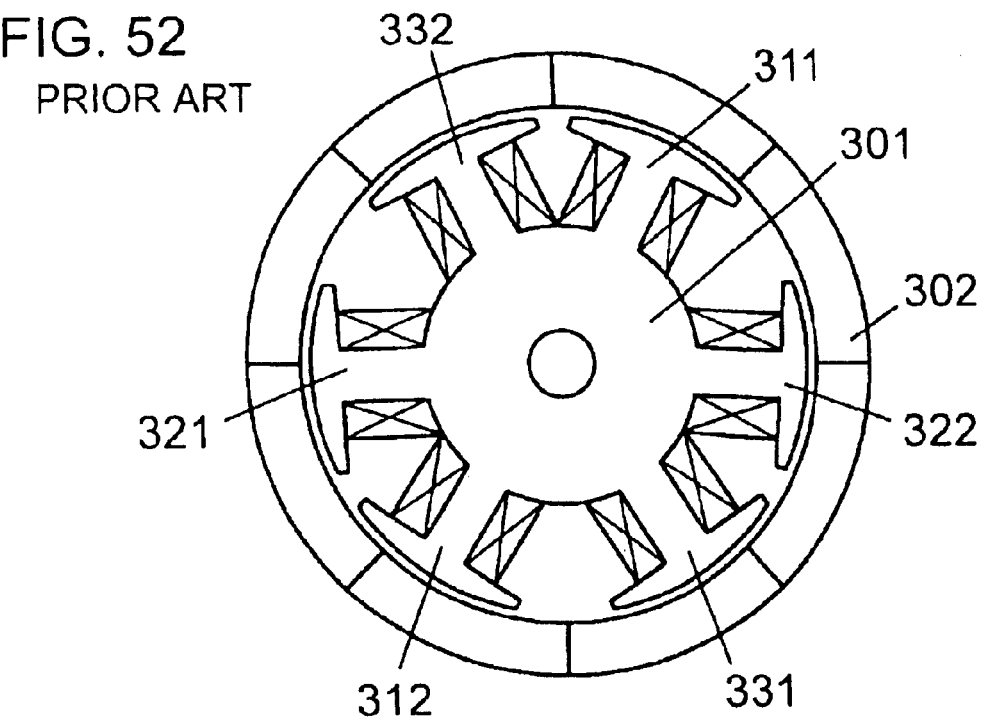
Figure 53:
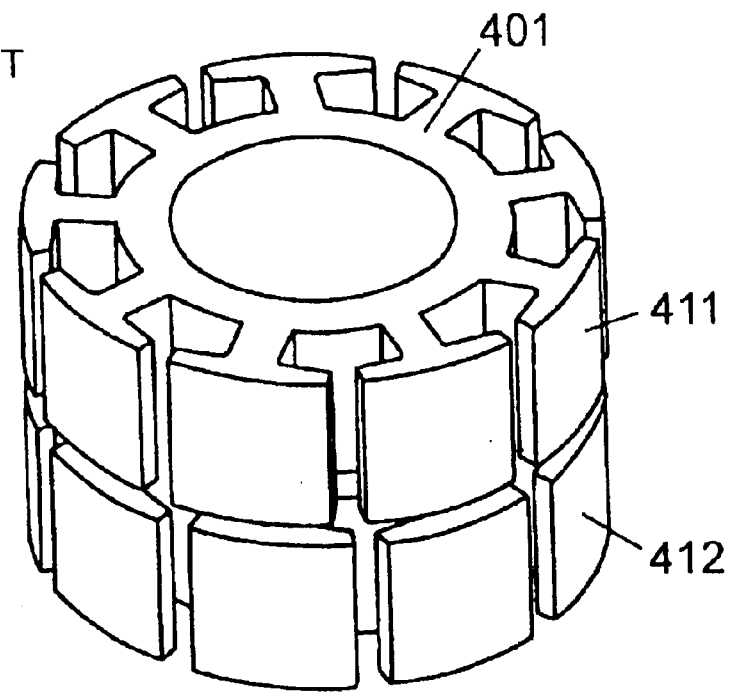
Figure 54:
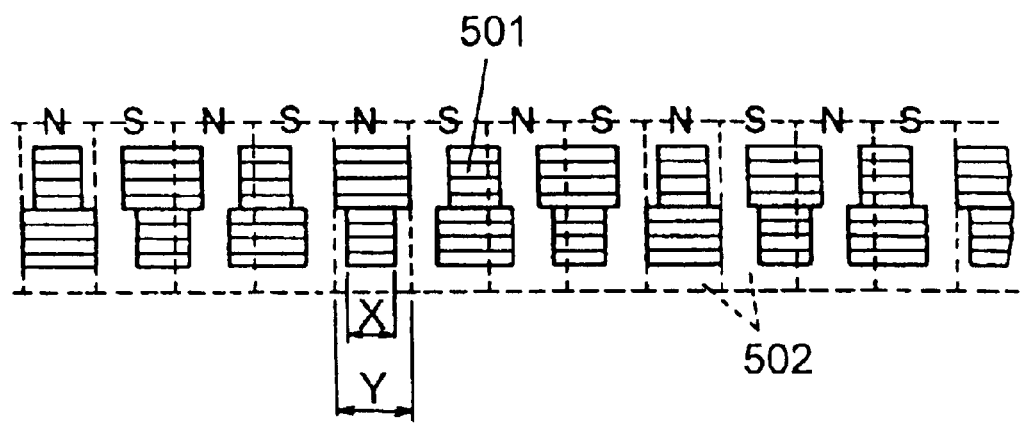
Figure 55:
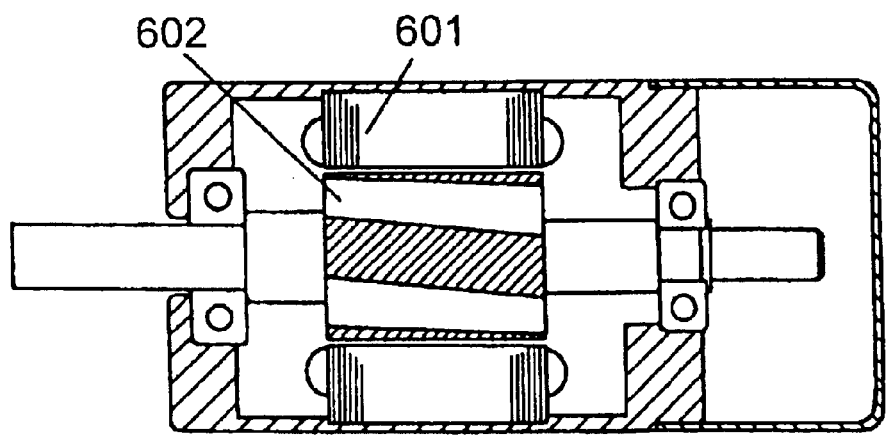

FIGS. 47A and 47B partially illustrate the cross section of the core shape taken on line 46B—46B as shown in FIG. 46B;

FIGS. 47C and 47D partially illustrate the cross section of the core shape taken on line 46C—46C as shown FIG. 46C;

FIG. 48A shows another core shape in accordance with the nineteenth embodiment of the present invention;

FIG. 48B illustrates a cross section taken on line 48B—48B of the core shape shown in FIG. 48A;

FIG. 48C illustrates a cross section taken on line 48C—48C of the core shape shown in FIG. 48A;

FIGS. 49A and 49B partially illustrate the cross section of the core shape taken on line 48B—48B as shown FIG. 48B;

FIGS. 49C and 49D partially illustrate the cross section of the core shape taken on line 48C—48C as shown FIG. 48C;

FIG. 50 shows polarized condition of a magnet in accordance with a twentieth embodiment of the present invention;

FIG. 51A shows cogging torque-skew angle characteristics of the same embodiment;

FIG. 51B shows efficiency-skew angle characteristics of he same embodiment;

FIG. 52 shows a motor of a conventional technique described in Japanese Patent Application Non-examined Publication No. H04-304151;

FIG. 53 shows a motor core of a conventional technique described in Japanese Patent Application Non-examined Publication No. H02-254954;

FIG. 54 shows a rotating armature of a rotating machine of a conventional technique described in Japanese Patent Application Non-examined Publication No. H03-3622; and FIG. 55 shows a motor of a conventional technique described in Japanese Patent Publication No. 2588661.

DETAILED DESCRIPTION OF THE INVENTION

Exemplary embodiments of the present invention will be described hereinafter with reference to the accompanying drawings.

First Embodiment

Figure 1A:
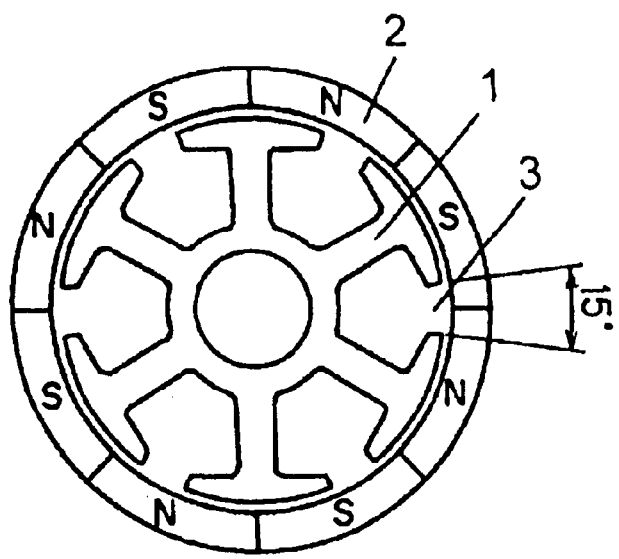
FIG. 1A shows a relation between a core slot opening angle (15°) and a magnet in accordance with a first embodiment of the present invention.
Figure 1B:
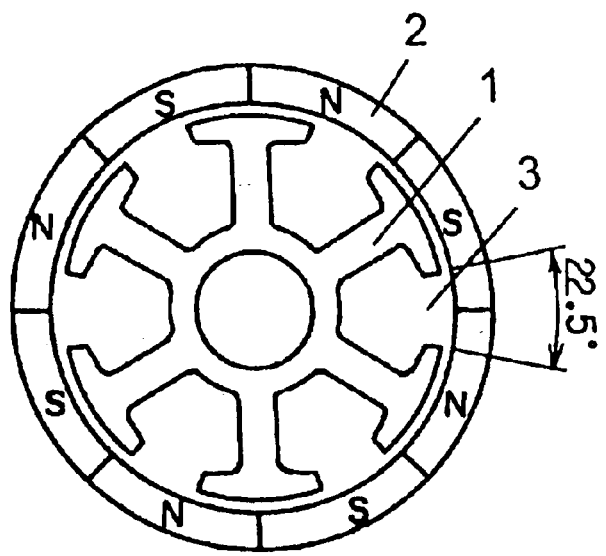
FIG. 1B shows a relation between a core slot opening angle (22.5°) and a magnet in accordance with the same embodiment.
Figure 1C:
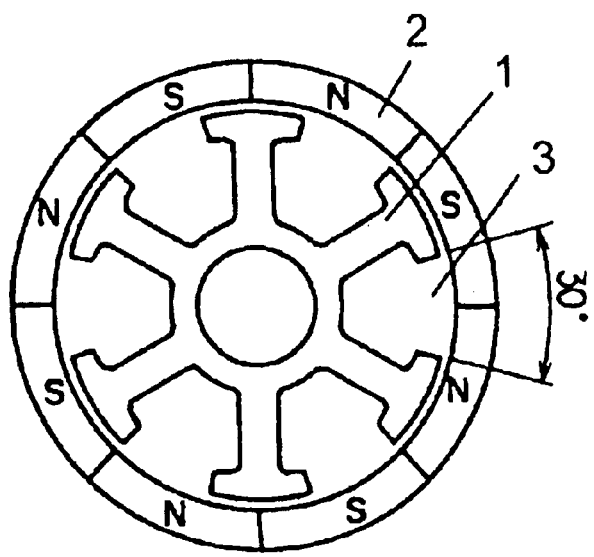
FIG. 1C shows a relation between a core slot opening angle (30°) and a magnet in accordance with the same embodiment.
Figure 1D:
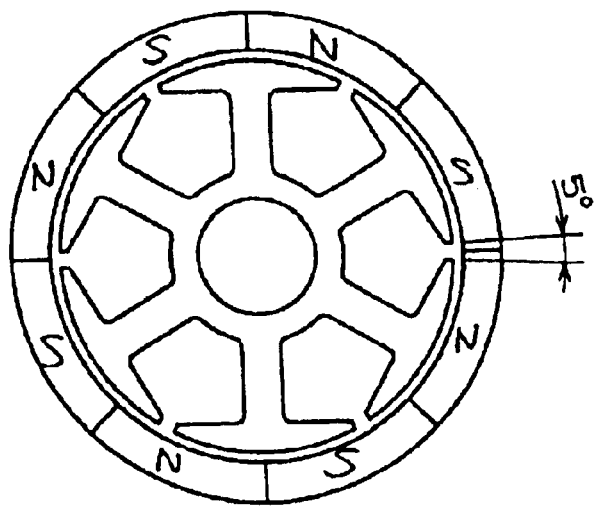
FIGS. 1D–F show relations between core slot opening angles and a magnet in accordance with the same embodiment
Figure 1E:
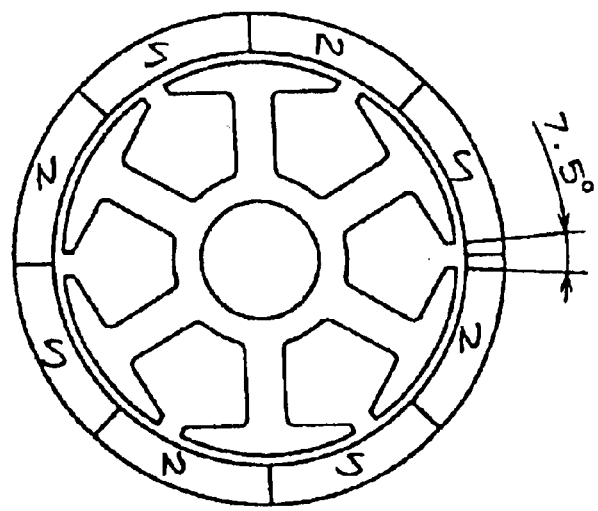
Figure 1F:
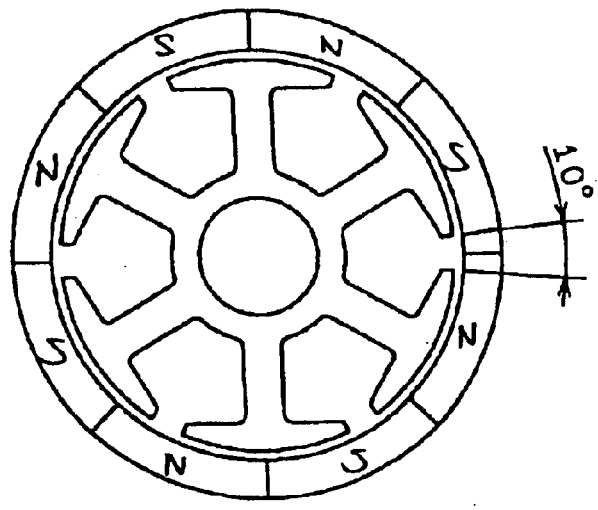

FIGS. 1A, 1B, and 1C show relations between core 1 of a motor and magnet 2 functioning as magnetic field generating means. Magnet 2 has four N poles and four S poles disposed alternately with an equal angular pitch. Core 1 has six slots 3 equally spaced each other.

A difference in FIGS. 1A, 1B, and 1C are only the angles the openings of slots 3 provided in core 1 form with respect to the center of the core (hereinafter referred to as a "slot opening angle"). The slot opening angles are set to become larger in steps: 15° in mechanical angle (60° in electrical angle) for FIG. 1A; 22.5° in mechanical angle (90° in electrical angle) for FIG. 1B; and 30° in mechanical angle (120° in electrical angle) for FIG. 1C.

When magnet 2 rotates with respect to core 1, the force of attraction between core 1 and magnet 2 periodically changes, which generates torque ripples called "cogging torque" between core 1 and magnet 2.

Figure 2A:
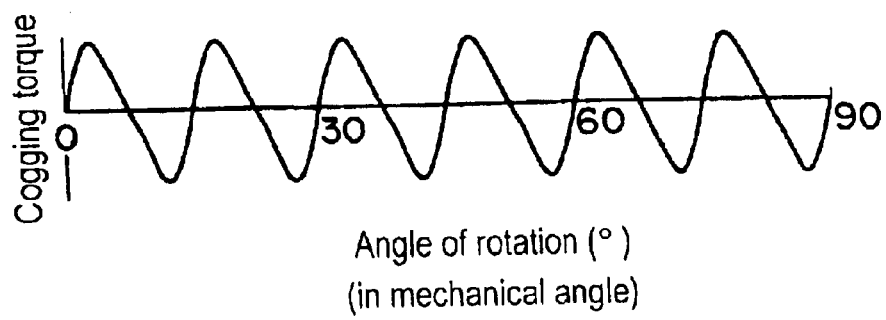
FIG. 2A shows a cogging torque waveform of the motor shown in FIG. 1A.
Figure 2B:
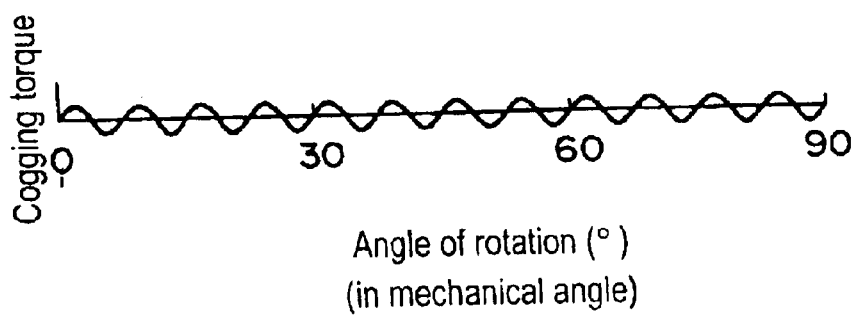
FIG. 2B shows a cogging torque waveform of the motor shown in FIG. 1B.
Figure 2C:
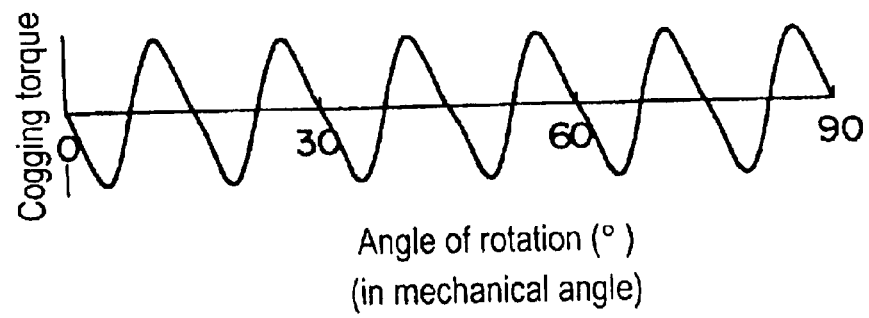
FIG. 2C shows a cogging torque waveform of the motor shown in FIG. 1C.
Figure 2D:
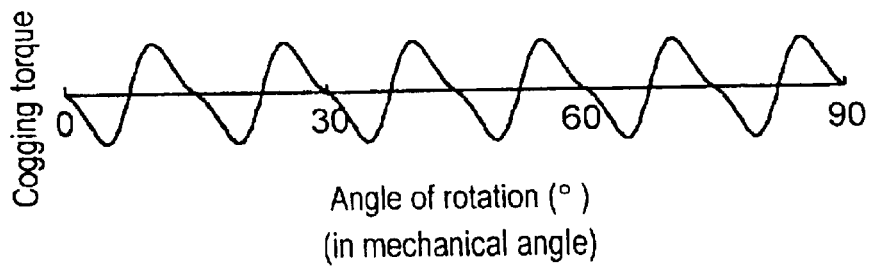
FIGS. 2D–F show cogging torque waveforms of the motors shown in FIGS. 1D–1F.
Figure 2E:
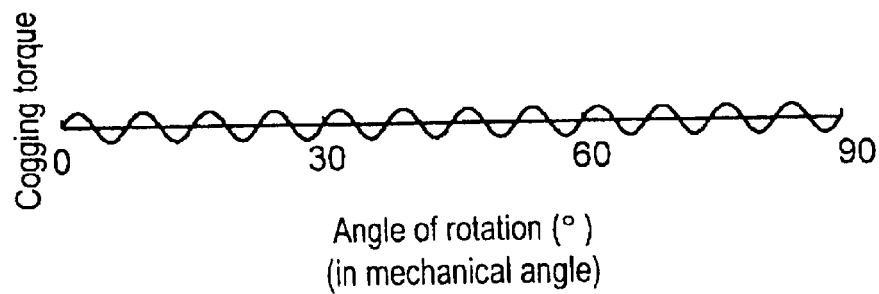
Figure 2F:
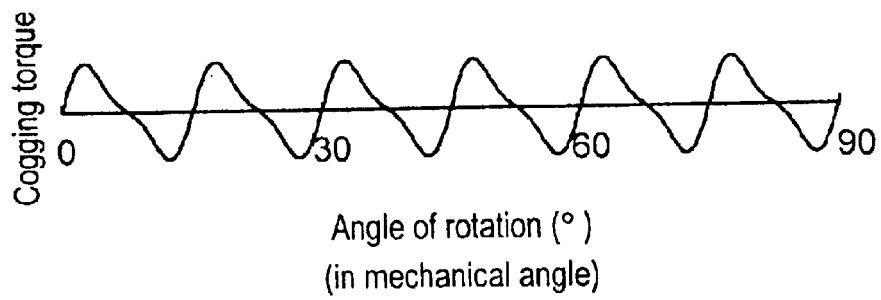

FIGS. 2A, 2B, and 2C show waveforms of cogging torque produced in the motors shown FIGS. 1A, 1B, and 1C, respectively. The cogging torque of the motor shown in FIG. 1A has a waveform repeated 24 times per revolution as shown in FIG. 2A. This figure corresponds to the least common multiple "24" of the number of core slots "6" and the number of magnet poles "8". This is not limited to this motor, but it is common for ordinary motors to be subjected to such cogging torque, i.e. the cogging torque having a cycle equal to the least common multiple of the number of core slots and the number of magnet poles (this cycle is hereinafter referred to as a "cycle of basic cogging torque").

For the motor shown in FIG. 1C, or in the case where the opening angles of slots 3 are large, as understood from comparison between FIGS. 2A and 2C, the cycles and absolute values of the cogging torque are substantially equal but the waveforms are 180° out of phase.

For the motor shown in FIG. 1B, or in the case where the opening angles of slots 3 are set to 90° in electrical angle, as shown in FIG. 1B, cogging torque having one-half the cycle of basic cogging torque, in other words, twice the frequency of the basic cogging torque is produced and its absolute value is reduced considerably.

Figure 3:
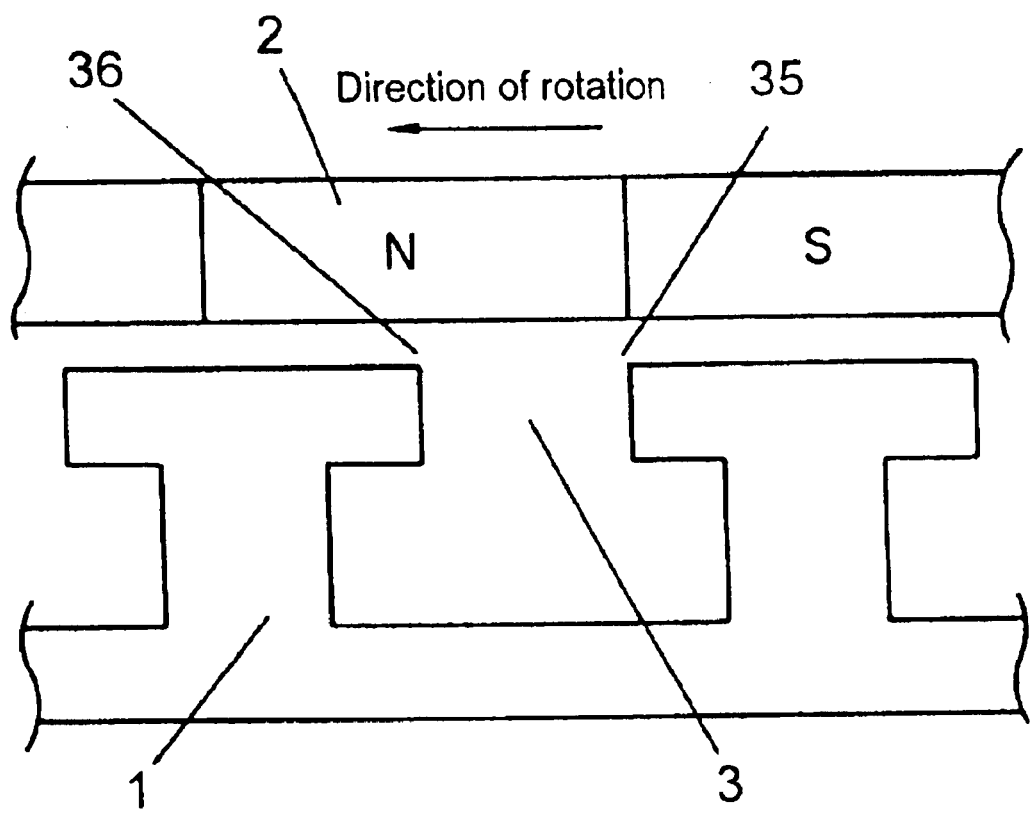
FIG. 3 illustrates a relation between a magnet and a core slot of the motor shown FIG. 1B.
Figure 4A:
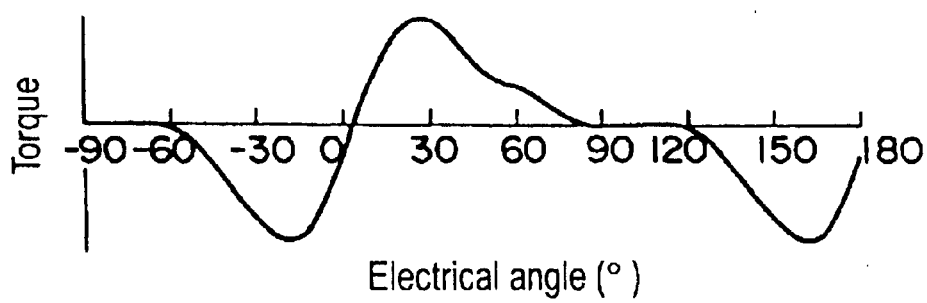
FIGS. 4A, 4B, 4C, and 4D illustrate reduction of cogging torque in the motor shown in FIG. 1B.

The reasons for these phenomena will be described with reference to FIGS. 3 and 4A to 4D. For ease of explanation, FIG. 3 shows a condition when the transition part between N and S poles of magnet 2 is approaching edge 35 of core slot 3. Now, FIG. 4A shows how torque varies with changes in rotation angles (indicated in electrical angle). That is, rotation of magnet 2 accompanies change in the magnetic energy between magnet 2 and core 1, thus generating torque as shown in FIG. 4A. In this waveform, torque reaches zero when edge 35 of slot 3 almost meets the pole transition part.

Figure 4B:
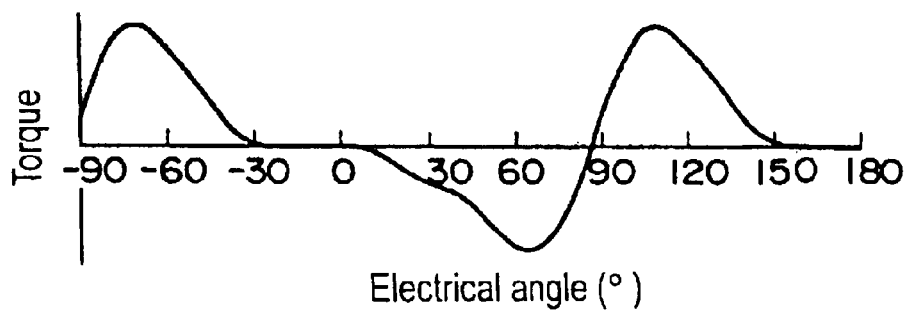
Figure 4C:
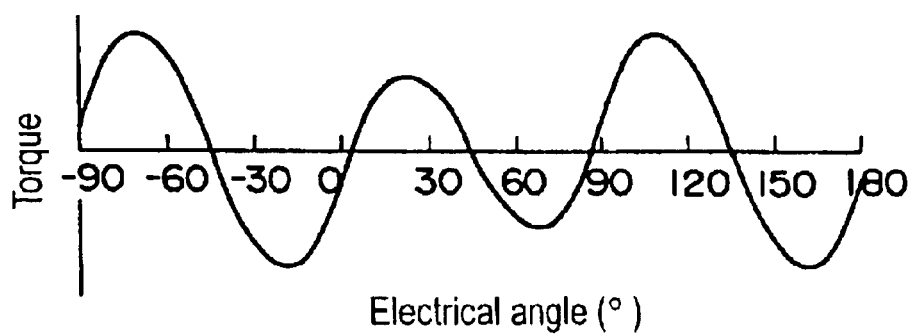
Figure 4D:
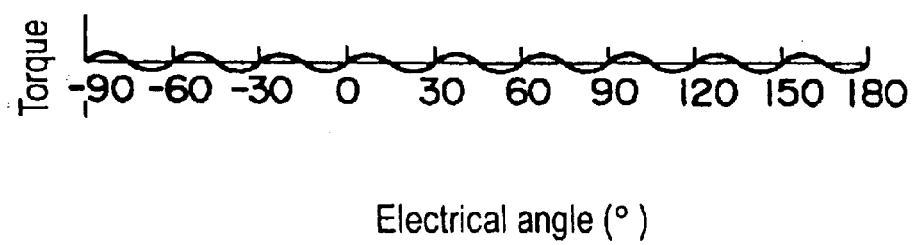

Likewise, at opposite edge 36 of slot 3, similar torque is generated. Also in this torque waveform, torque reaches zero when edge 36 of slot 3 almost meets the pole transition part. The waveforms shown in FIGS. 4B and 4A are symmetric with respect to a point. Now, when the opening angles of slot 3 are set to 90° in electrical angle, the torque waveforms generated at edges 35 and 36 opposing each other of slot 3 are 180° out of phase, and whereby cancelled. As a result, within one slot 3, the third-order components are eliminated to form a torque waveform as shown FIG. 4C. While this torque waveform is generated in one slot 3, the torque waveform generated in the entire motor is a synthesis of the torque waveforms generated in all the slots. Therefore, in the motor as a whole, since the first-, second-, fourth-, fifth-, seventh-order components, etc. of the torque waveform shown in FIG. 4C are cancelled by the torque waveforms each 120° out of phase in electrical angle that are generated in other five slots, torque of higher-than-sixth-order components appears as shown in FIG. 4D. Consequently, the entire motor generates cogging torque having a waveform repeated 48 times per revolution (with one-half the cycle of the basic cogging torque) and minimized absolute value.

In this first embodiment, it has shown that cogging torque is minimized when the opening angles of slots are 90° in electrical angle. Similarly, when the opening angles of slots is 30°, torque waveforms 60° out of phase are also produced at both opposite edges of one slot; and therefore, the third-order components of the cogging torque waveforms generated in the slot are eliminated and a phenomenon similar to the above occurs.

In the first embodiment, it has shown that cogging torque is minimized when the opening angles of slots are 90°. As for other angles around 90°, the third-order components of the cogging torque produced in slot 3 are eliminated by 50% when the opening angles are set to 80° or 100° in electrical angle. When the opening angles of slots are set to 85° or 95° in electrical angle, the third-order components of the cogging torque produced in one slot are eliminated by 74%. For these reasons, in order to attain practical performance, setting opening angles to a value ranging from 85° to 95°, at which the third-order components of the cogging torque waveforms generated in one slot are eliminated to about one quarter or less, allows the basic cycle components of the cogging torque to be reduced considerably, thus minimizing the cogging torque.

Figure 5A:
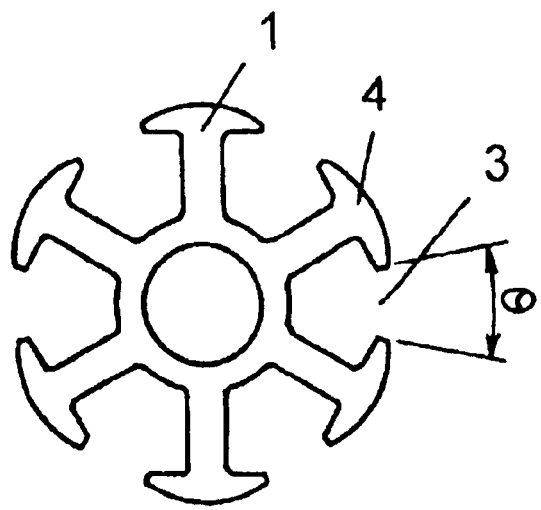
FIGS. 5A, 5B, and 5C show examples of core shapes in accordance with the same embodiment.
Figure 5B:
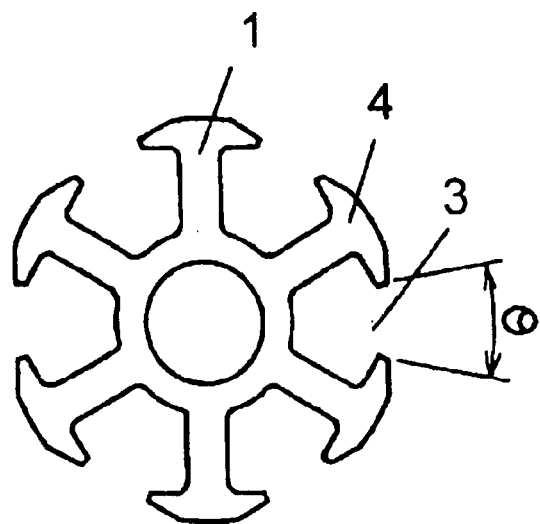
Figure 5C:
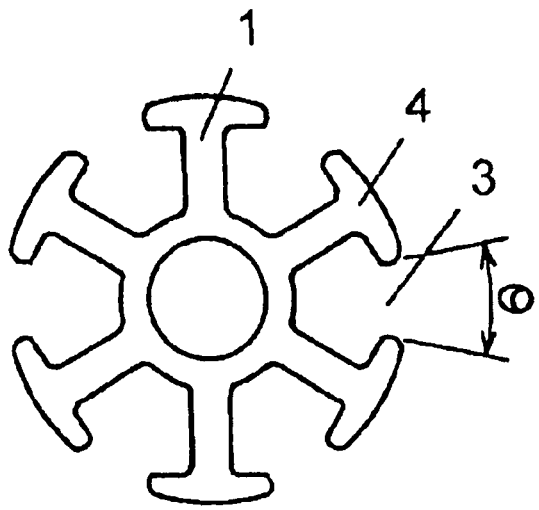

When tips of salient poles 4 are shaped non-circular as shown in FIGS. 5A through 5C, or such effects as magnetic saturation of the core are taken into account, the slots can be considered to have a large opening angle from the viewpoint of magnetic properties. For this reason, when the opening angle θ of slot 3 is relatively small (about 5° in electrical angle), cogging torque may be minimized.

Consequently, in general, when the slot opening angles are set to an appropriate value ranging from 85° to 95°, or 20° to 35°, cogging torque having one-half the cycle of basic cogging torque is produced and its absolute value can be minimized, irrespective of the number of magnet poles and core slots.

Each of the following embodiments will show the techniques of further reducing the cogging torque based on a basic core configuration that inherently produces little cogging torque having one-half the cycle of basic cogging torque.

Second Embodiment

Figure 6A:
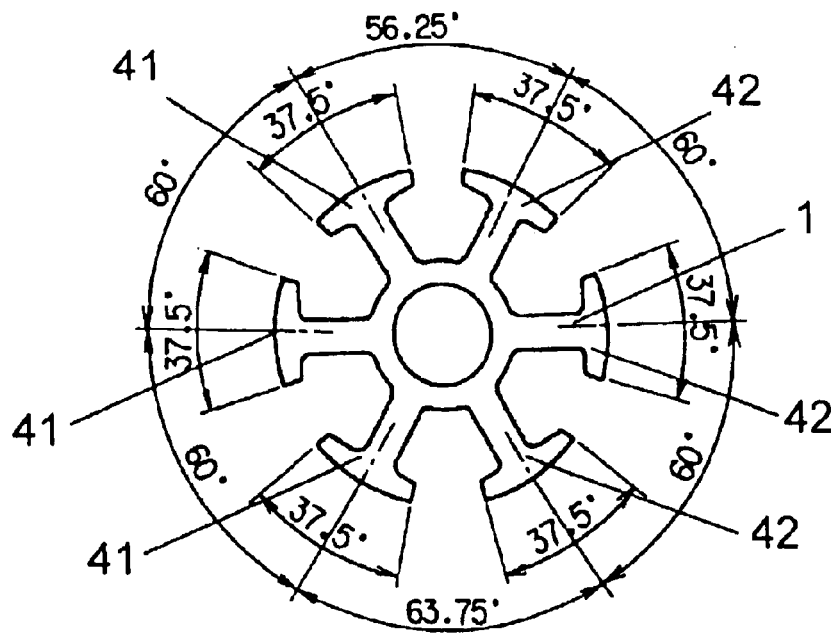
FIG. 6A shows a core shape in accordance with a second embodiment of the present invention.

FIG. 6A shows a core shape in accordance with a second embodiment. In FIG. 6A, core 1 is configured so that the opening angles of salient pole tips are constant at 37.5° in mechanical angle (150° in electrical angle), and salient pole tips 41 on a half side of the core are displaced 1.875° (one-eighth the cycle of basic cogging torque) clockwise and salient pole tips 42 on the other half are displaced 1.875° counterclockwise.

The shape of core 1 is based on the following ideas.

Figure 6B:
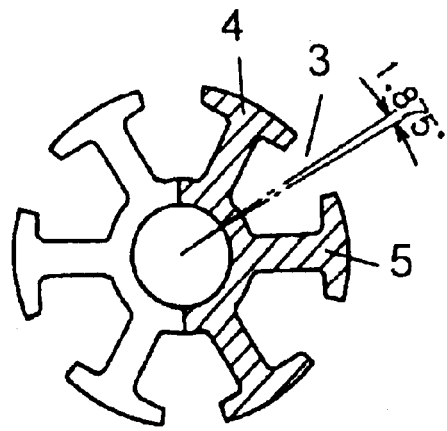
FIG. 6B illustrates a core section displaced counterclockwise from a basic configuration in the core shape shown in FIG. 6A.

In FIG. 6B, core 5 is configured so that the opening angle of slot 3 is set to 90° in electrical angle and salient pole tip 4 is displaced 1.875° (one-eighth the cycle of basic cogging torque) counterclockwise. This core 5 has salient pole tip 4 configured in a manner slightly different from a basic configuration; however, as shown by the solid line in FIG. 7A, the core produces cogging torque identical to that produced by the basic configuration except that the phase is slightly different In FIG. 6C, core 6 is configured so that the opening angle of slot 3 is set to 90° in electrical angle and salient pole tip 4 is displaced 1.875° clockwise. Likewise, as shown by the solid line in FIG. 7B, the core 6 also produces cogging torque identical to that produced by the basic configuration except that the phase is slightly different.

The cogging torque produced in these two cores 5 and 6 are identical in absolute value but 180° out of phase (3.75° in mechanical angle, one-quarter the cycle of the basic cogging torque).

Figure 6C:
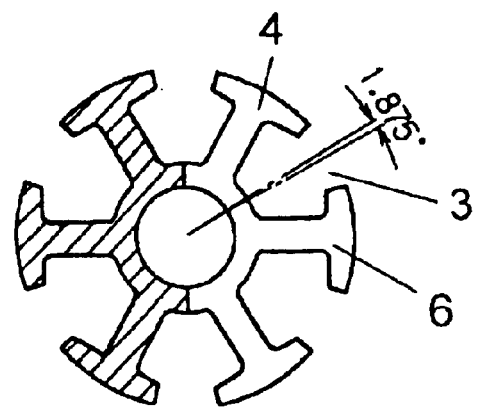
FIG. 6C illustrates a core section displaced clockwise from the basic configuration in the core shape shown in FIG. 6A.
Figure 7A:
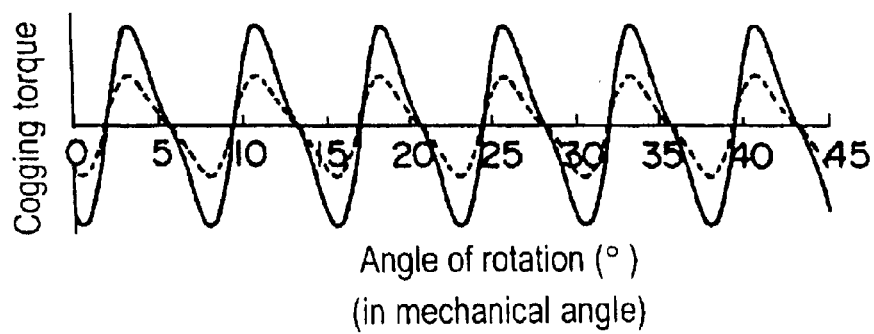
FIG. 7A shows a cogging torque waveform generated by the core shape shown in FIG. 6B.
Figure 7B:
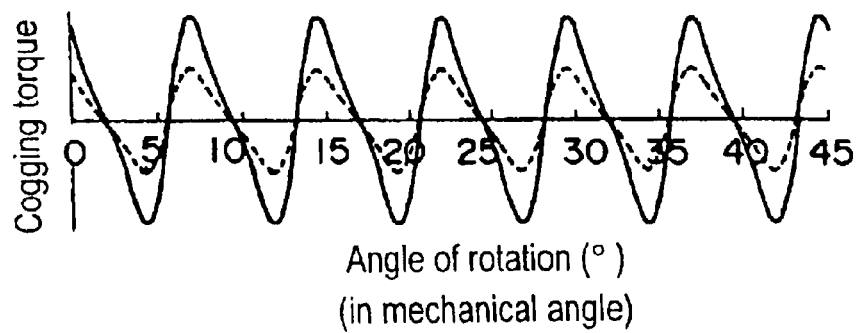
FIG. 7B shows a cogging torque waveform generated by the core shape shown in FIG. 6C.
Figure 7C:
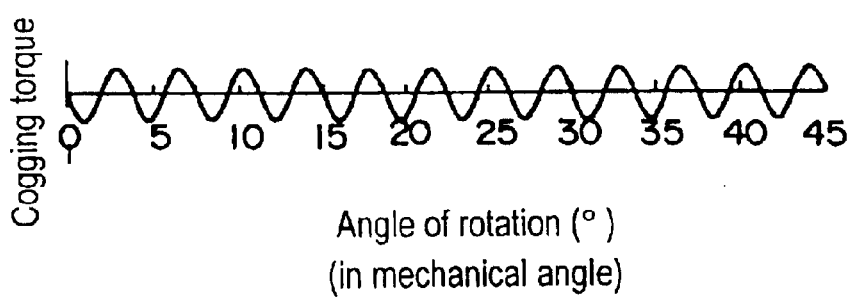
FIG. 7C shows a cogging torque waveform generated by the core shape shown in FIG. 6A that is a combination of those shown in FIGS. 7A and 7B.

Core 1 of the second embodiment (FIG. 6A) is configured by combining the diagonally shaded parts of cores 5 and 6 shown in FIGS. 6B and 6C, respectively. The diagonally shaded parts and the other parts in FIG. 6B have equal positional relations with the magnet, so the cogging torque produced by the shaded parts has one-half the absolute value of the cogging torque produced by the entire core and in phase with it. The same holds true for the core shape shown in FIG. 6C. For core 1 of the second embodiment (FIG. 6A) in which these two shapes are combined, cogging torque waveforms generated by the respective shapes cancel out each other, thus canceling odd-numbered-order components of the cogging torque waveforms. Therefore, as shown in FIG. 7C, resultant cogging torque has a waveform repeated 96 times per revolution, and its cycle is one-half (one-quarter the cycle of the basic cogging torque) and its absolute value is less than one-half of those produced by the basic configuration.

The above-mentioned structure reduces a cycle of cogging torque to one-quarter or less the cycle of ordinary cogging torque as well as its absolute value. Therefore, the cogging torque can be reduced to the extent that its cycle is one-half and its absolute value is less than one-half of those produced with the conventional techniques described in Japanese Patent Application Non-examined Publication No. H04-304151, and others.

Third Embodiment

Figure 8A:
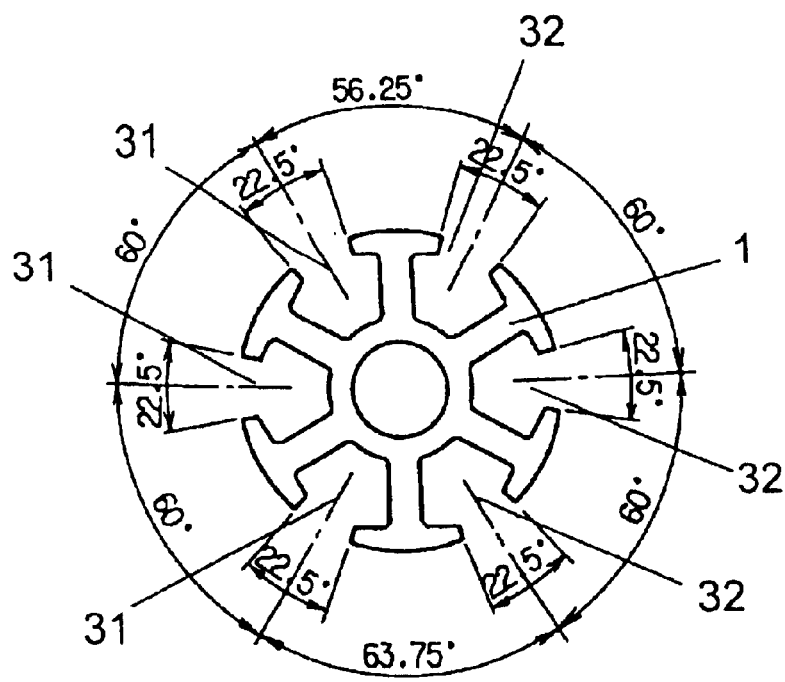
FIG. 8A shows a core shape in accordance with a third embodiment of the present invention.

FIG. 8A shows a core shape in accordance with a third embodiment.

In FIG. 8A, core 1 is configured so that the opening angles of slots are constant at 90° in electrical angle, slots 31 on a half side of the core are displaced 1.875° (one-eighth the basic cogging cycle) clockwise and slots 32 on the other half are displaced 1.875° counterclockwise.

Figure 8B:
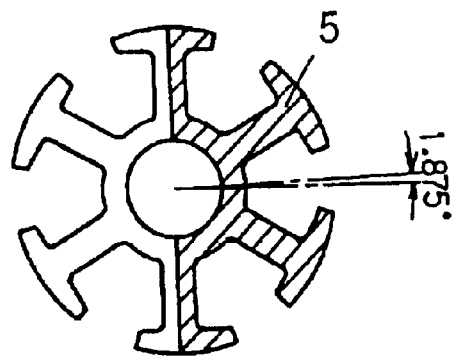
FIG. 8B illustrates a core section displaced counterclockwise from a basic configuration in the core shape shown in FIG. 8A.
Figure 8C:
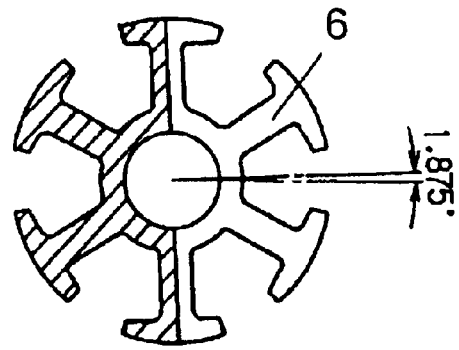
FIG. 8C illustrates a core section displaced clockwise from the basic configuration in the core shape shown in FIG. 8A.

Similar to the second embodiment mentioned above, this shape is a combination of the halves of cores 5 and 6 shown in FIGS. 8B and 8C that generate cogging torque waveforms 180° out of phase. This shape has completely the same effects as those produced by the second embodiment.

Fourth Embodiment

Figure 9A:
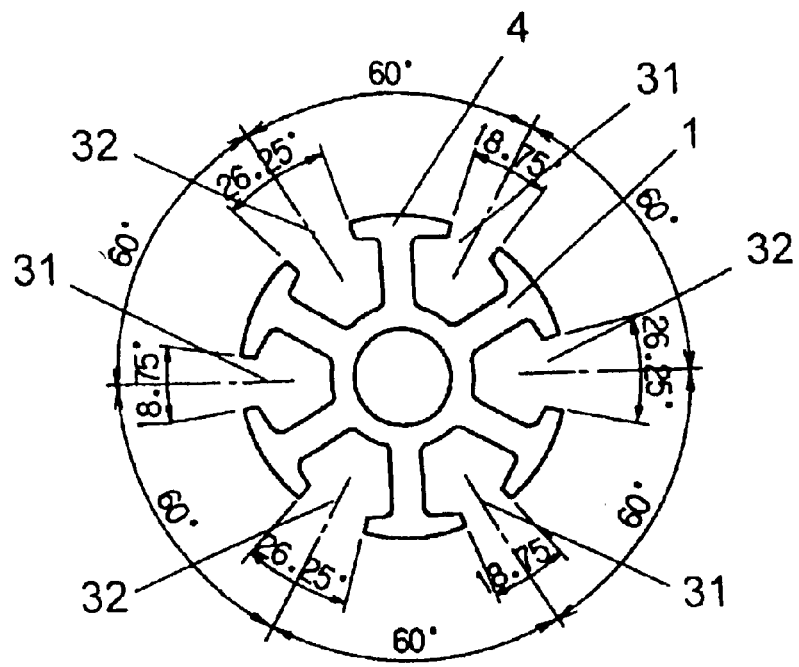
FIG. 9A shows a core shape in accordance with a fourth embodiment of the present invention.
Figure 9B:
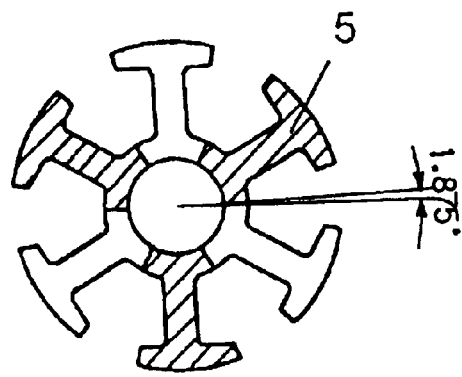
FIG. 9B illustrates a core section displaced counterclockwise from a basic configuration in the core shape shown in FIG. 9A.
Figure 9C:
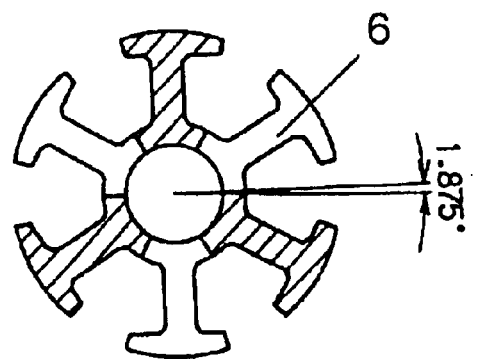
FIG. 9C illustrates a core section displaced clockwise from the basic configuration in the core shape shown in FIG. 9A.

FIG. 9A shows a core shape in accordance with a fourth embodiment.

In FIG. 9A, core 1 is configured so that slots are disposed with an equal angular pitch, and slots 31 each having an opening angle of 18.75° (90° in electrical angle−one-quarter the cycle of basic cogging torque) and slots 32 each having an opening angle of 26.25° (90° in electrical angle+one-quarter the cycle of the basic cogging torque) are alternately provided. The configuration of this core 1 is similar to those of the techniques described in Japanese Patent Application Non-examined Publication No. H04-304151. However, in accordance with the present invention, the angular displacement of salient pole tip 4 is one-half of that described in the above-mentioned publication. The core shape of this embodiment reduces cogging torque, making its absolute value less than one-half while maintaining the efficiency produced by the basic configuration as much as possible.

Fifth Embodiment

Figure 10A:
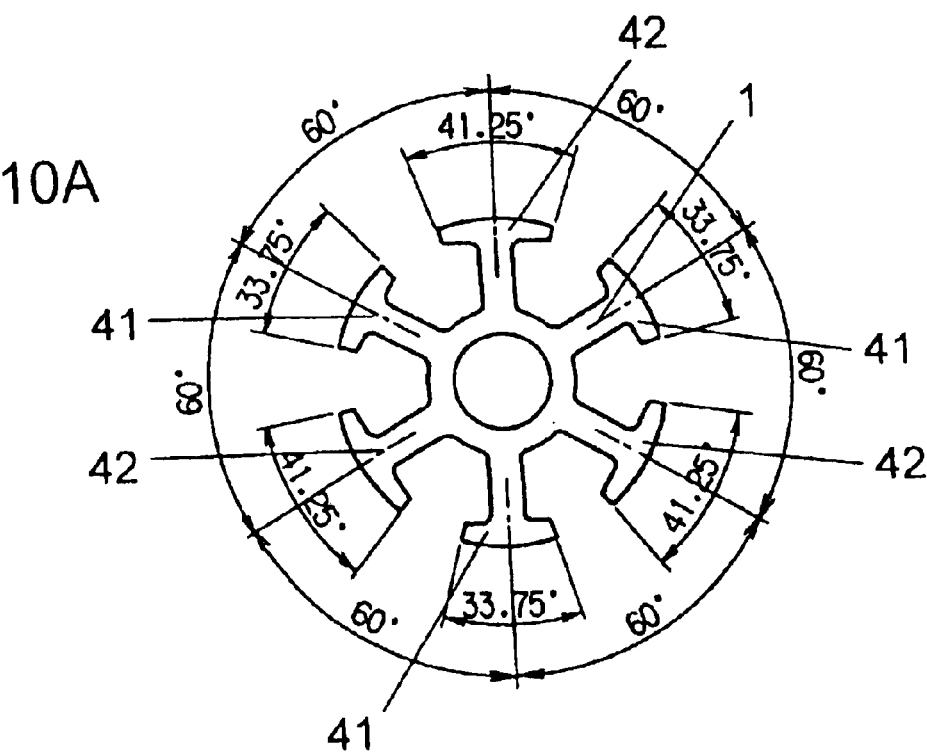
FIG. 10A shows a core shape in accordance with a fifth embodiment of the present invention.
Figure 10B:
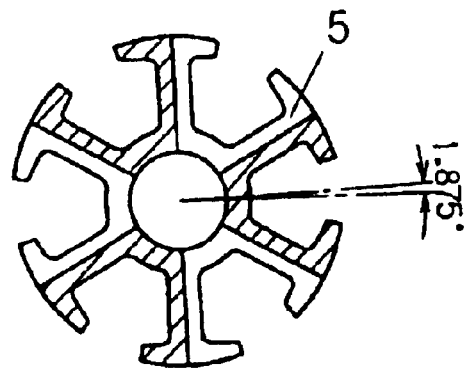
FIG. 10B illustrates a core section displaced counterclockwise from a basic configuration in the core shape shown in FIG. 10A.
Figure 10C:
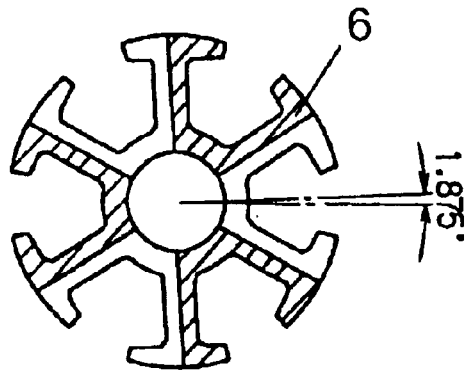
FIG. 10C illustrates a core section displaced clockwise from the basic configuration in the core shape shown in FIG. 10A.

FIG. 10A shows a core shape in accordance with a fifth embodiment.

In FIG. 10A, core 1 is configured so that salient pole tips are disposed with an equal angular pitch, and salient poles tips 41 each having an opening angle of 33.75° (150° in electrical angle−one-quarter the cycle of basic cogging torque) and salient pole tips 42 each having an opening angle of 41.25° (150° in electrical angle+one-quarter the cycle of the basic cogging torque) are alternately provided.

Since the core shapes described in these fourth and fifth embodiments are more laterally symmetrical than the shapes described in the second and third embodiments, the shapes of fourth and fifth embodiments are less susceptible to directional influence when assembled and more advantageous for mass production. They are also more advantageous to improve rotational accuracy because of their excellent magnetic balance in lateral direction.

Six Embodiment

Figure 11A:
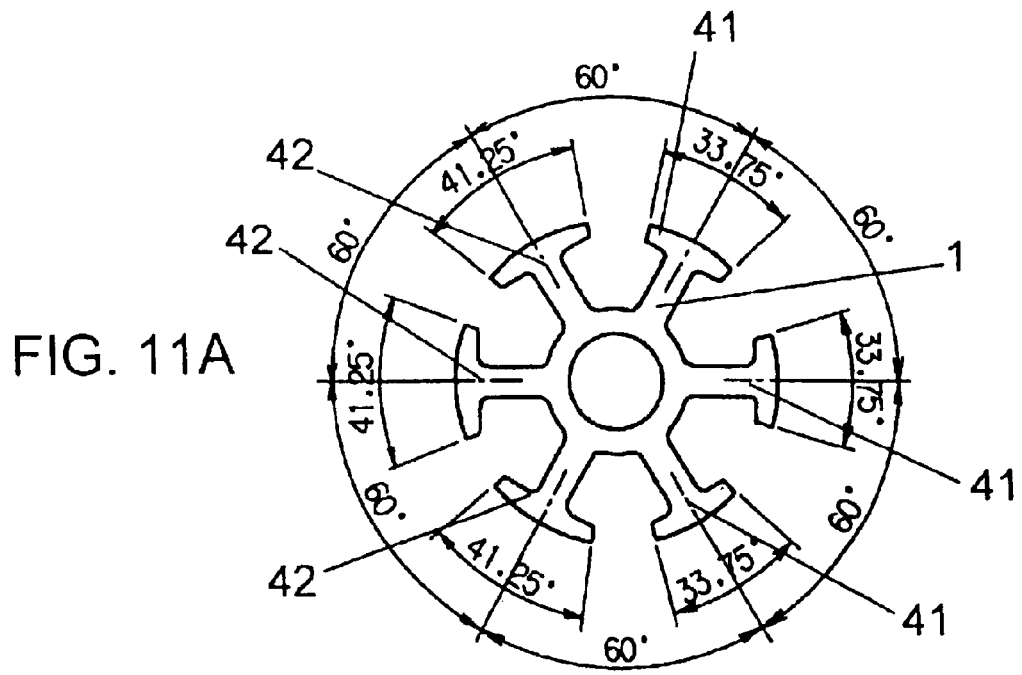
FIG. 11A shows a core shape in accordance with a sixth embodiment of the present invention.
Figure 11B:
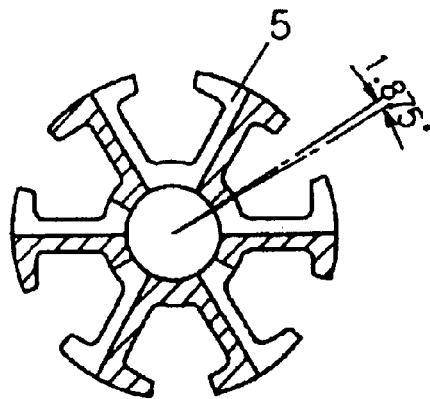
FIG. 11B illustrates a core section displaced counterclockwise from a basic configuration in the core shape shown in FIG. 11A.
Figure 11C:
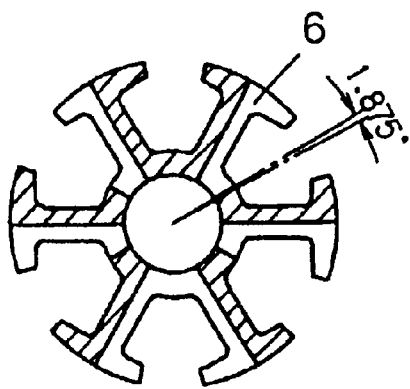
FIG. 11C illustrates a core section displaced clockwise from the basic configuration in the core shape shown in FIG. 11A.

FIG. 11A shows a core shape in accordance with a sixth embodiment.

In FIG. 11A, core 1 is configured so that salient pole tips are disposed with an equal angular pitch, and salient pole tips 41 on a half side of the core have an opening angle of 33.75° (150° in electrical angle−one-quarter the cycle of basic cogging torque) and salient pole tips 42 on the other half have an opening angle of 41.25° (150° in electrical angle+one-quarter the cycle of the basic cogging torque).

Contrary to the cases described in these fourth and fifth embodiments, this shape intends to unbalance lateral magnetic condition. This unbalanced condition adds force of always attracting the magnet toward one direction, thus providing an action for preventing the rotor from whirling with some deviation. This shape is advantageous to improve rotational accuracy when slide bearings such as an oil impregnated metal powder sintered bearing are used as the bearing.

Seventh Embodiment

Figure 12A:
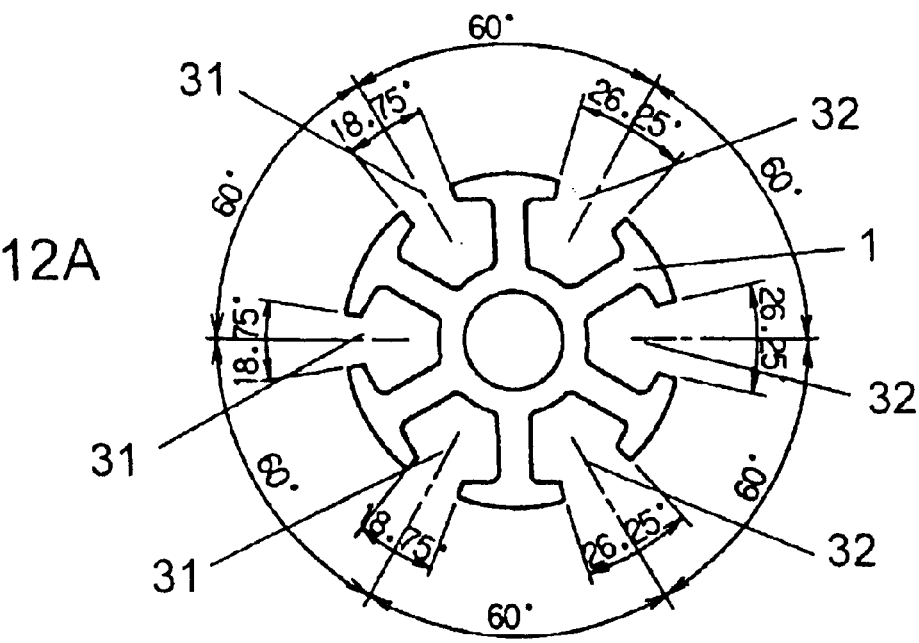
FIG. 12A shows a core shape in accordance with a seventh embodiment of the present invention.
Figure 12B:
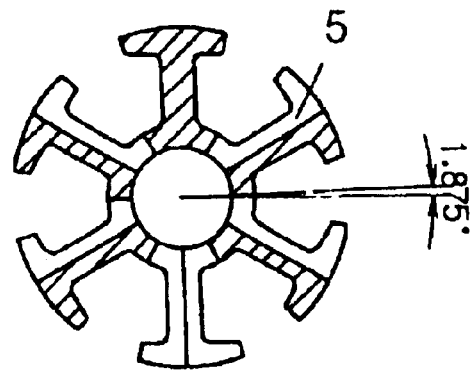
FIG. 12B illustrates a core section displaced counterclockwise from a basic configuration in the core shape shown in FIG. 12A.
Figure 12C:
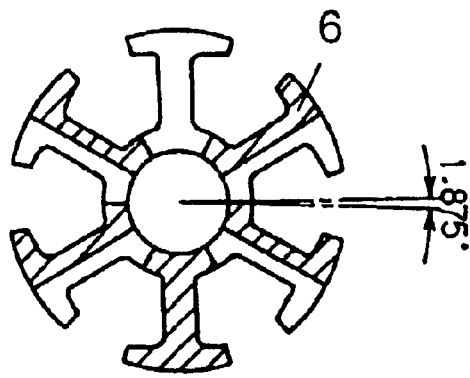
FIG. 12C illustrates a core section displaced clockwise from the basic configuration in the core shape shown in FIG. 12A.

FIG. 12A shows a core shape in accordance with a seventh embodiment.

In FIG. 12A, core 1 is configured so that slots are disposed with an equal angular pitch, and slots 31 on a half side of the core have an opening angle of 18.75° (90° in electrical angle−one-quarter the cycle of basic cogging torque) and slots 32 on the other half have an opening angle of 26.25° (90° in electrical angle+one-quarter the cycle of the basic cogging torque). With intentionally unbalanced lateral magnetic condition, this shape also has the same effects that have been produced by the sixth embodiment.

Furthermore, in the core shape of the seventh embodiment, slots 32 having a larger opening angle disposed on one side serve as suitable spaces for placing position sensitive elements such as Hall elements.

Like these, in these second through seventh embodiments, cases where the number of magnet poles is "8" and the number of core slots is "6" have been described as examples. The similar techniques are applicable to motors having a different number of magnetic poles or core slots.

Eighth Embodiment

In the eighth embodiment, cases where the same technique is applied to motors having "16" magnet poles and "12" core slots will be described.

Figure 13A:
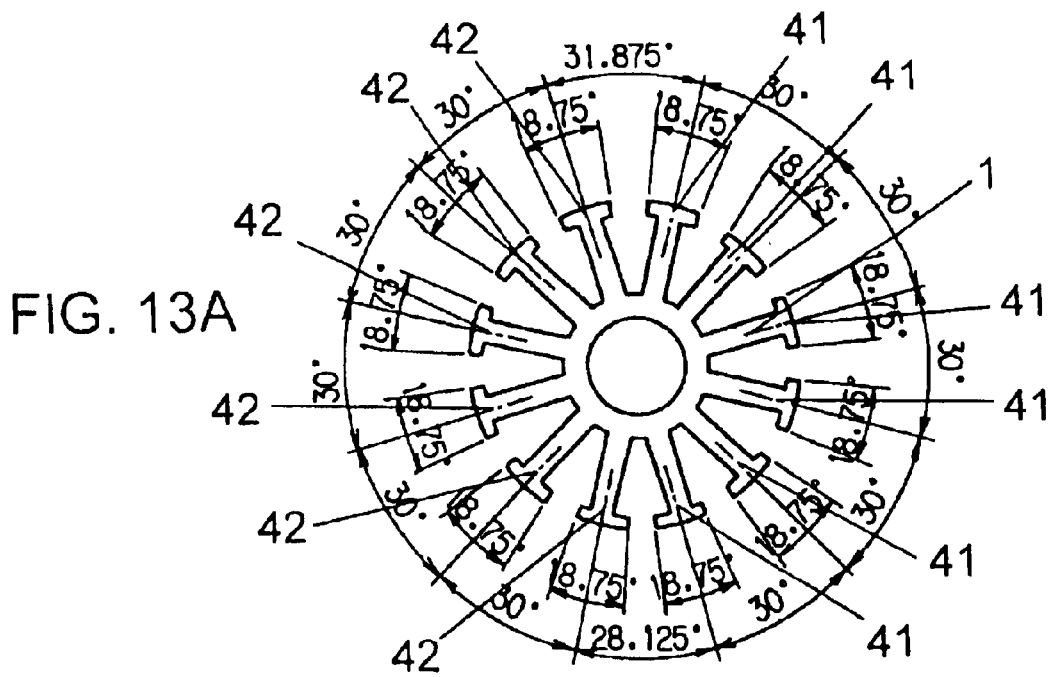
FIG. 13A shows a core shape in accordance with an eighth embodiment of the present invention.
Figure 13B:
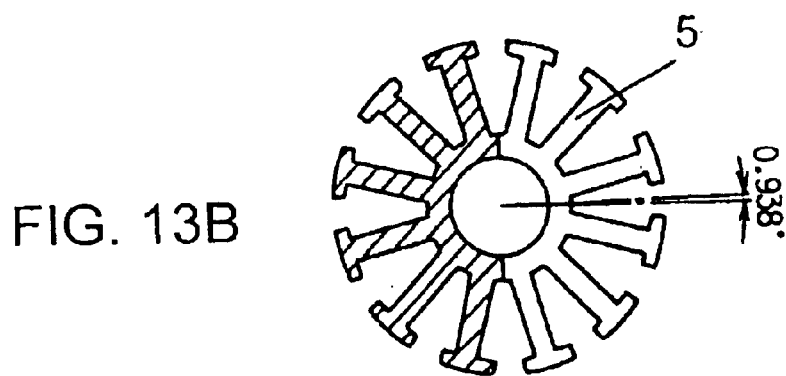
FIG. 13B illustrates a core section displaced counterclockwise from a basic configuration in the core shape shown in FIG. 13A.
Figure 13C:
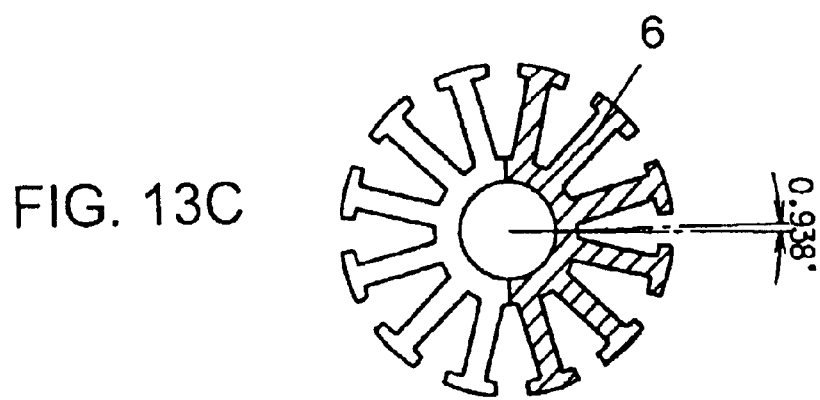
FIG. 13C illustrates a core section displaced clockwise from the basic configuration in the core shape shown in FIG. 13A.

FIG. 13A shows a core shape in accordance with the eighth embodiment. In this embodiment, since the number of magnet cores (not shown) is "16", a mechanical angle of 45° corresponds to an electrical angle of 360°.

In FIG. 13A, core 1 is configured so that the opening angles of salient pole tips are constant at 150° in electrical angle (18.75° in mechanical angle), and salient pole tips 41 on a half side of the core are displaced 0.9375° (one-eighth the cycle of basic cogging) clockwise and salient pole tips 42 on the other half are displaced 0.9375° counterclockwise. For this configuration, the technique described in the second embodiment is employed, and its effects are the same as those produced by the second embodiment.

FIGS. 14A through 18A show other core shapes in accordance with the eighth embodiment.

Figure 14A:
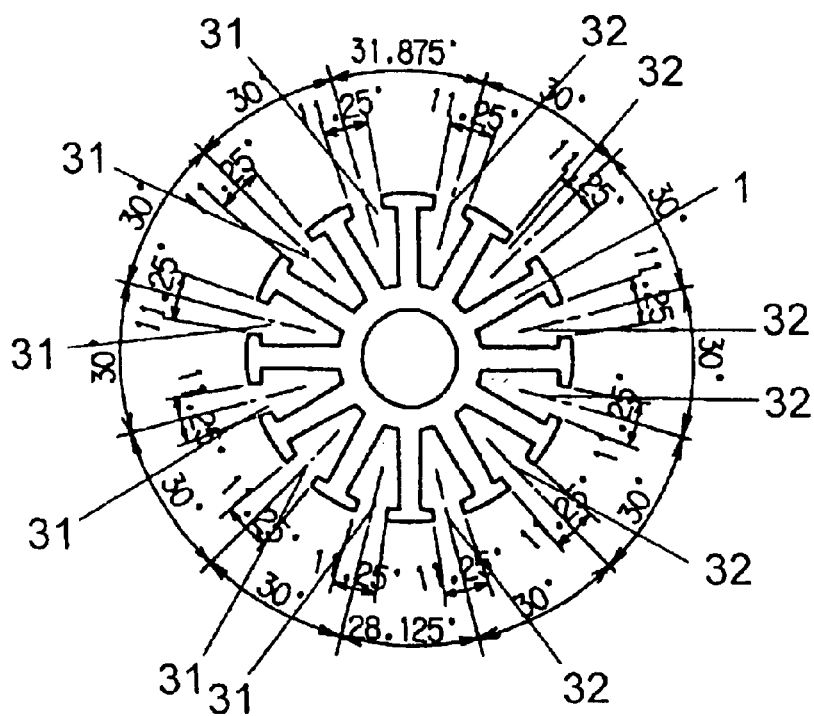
FIG. 14A shows another core shape in accordance with the eighth embodiment of the present invention.
Figure 14B:
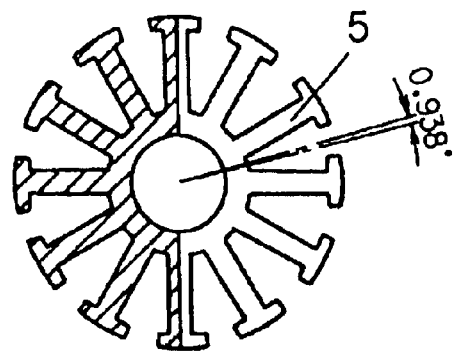
FIG. 14B illustrates a core section displaced counterclockwise from a basic configuration in the core shape shown in FIG. 14A.
Figure 14C:
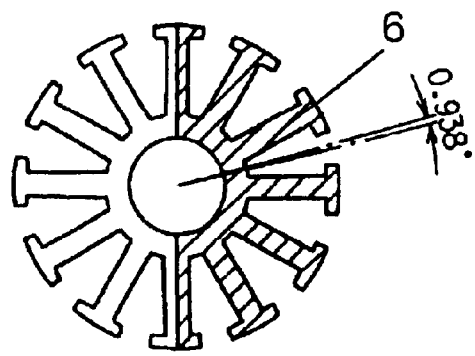
FIG. 14C illustrates a core section displaced clockwise from the basic configuration in the core shape shown in FIG. 14A.

In FIG. 14A, core 1 is configured so that the opening angles of slots are constant at 90° in electrical angle (11.25° in mechanical angle), and slots 31 on a half side of the core are displaced 0.9375° (one-eighth the cycle of basic cogging torque) clockwise and slots 32 on the other half are displaced 0.9375° counterclockwise. For this configuration, the technique described in the third embodiment is employed, and its effects are the same as those produced by the third embodiment.

Figure 15A:
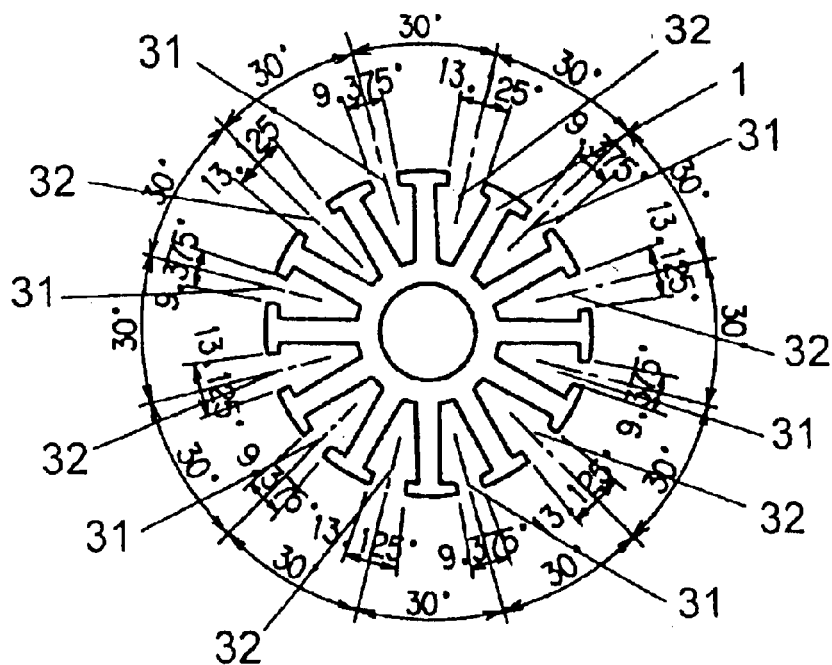
FIG. 15A shows still another core shape in accordance with the eighth embodiment of the present invention.
Figure 15B:
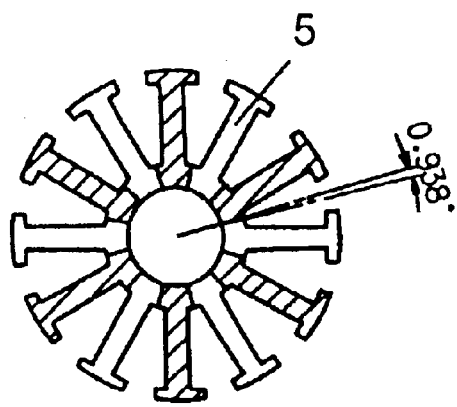
FIG. 15B illustrates a core section displaced counterclockwise from a basic configuration in the core shape shown in FIG. 15A.
Figure 15C:
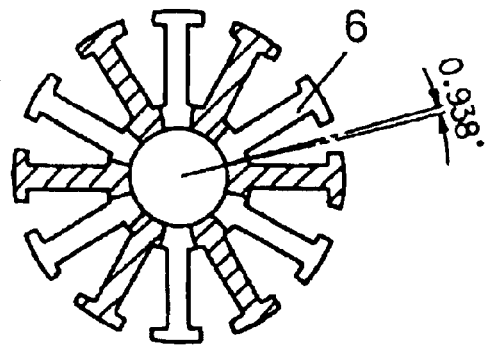
FIG. 15C illustrates a core section displaced clockwise from the basic configuration in the core shape shown in FIG. 15A.

In FIG. 15A, core 1 is configured so that slots are disposed with an equal angular pitch, and slots 31 each having an opening angle of 9.375° (90° in electrical angle–one-quarter the cycle of basic cogging torque) and slots 32 each having an opening angle of 13.125° (90° in electrical angle+one-quarter the cycle of the basic cogging torque) are alternately provided. For this configuration, the technique described in the fourth embodiment is employed, and its effects are the same as those produced by the fourth embodiment.

Figure 16A:
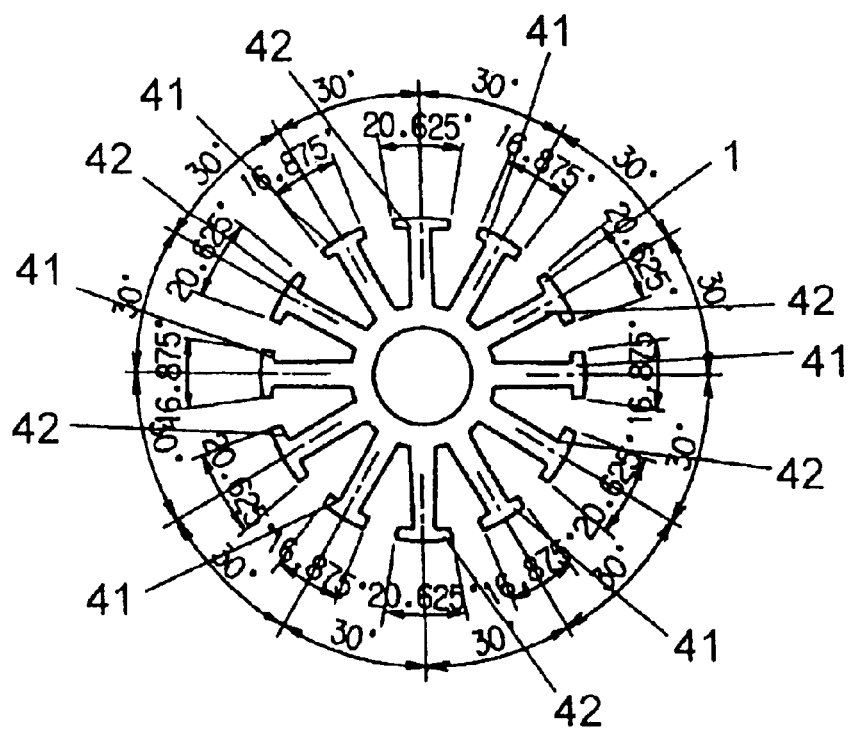
FIG. 16A shows still another core shape in accordance with the eighth embodiment of the present invention.
Figure 16B:
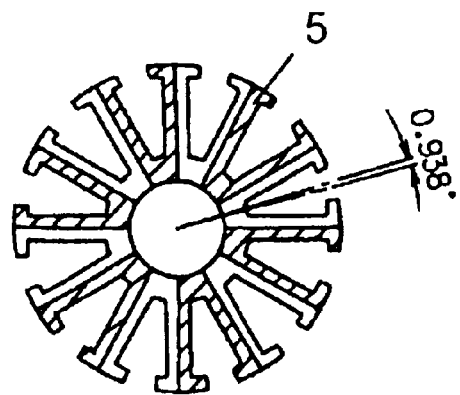
FIG. 16B illustrates a core section displaced counterclockwise from a basic configuration in the core shape shown in FIG. 16A.
Figure 16C:
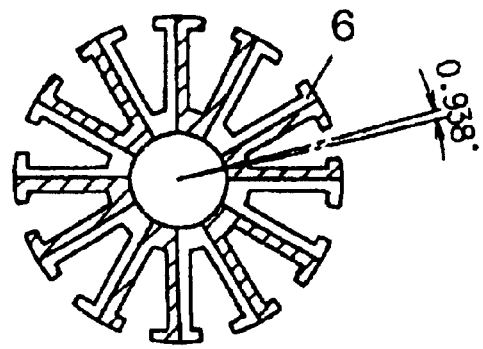
FIG. 16C illustrates a core section displaced clockwise from the basic configuration in the core shape shown in FIG. 16A.

In FIG. 16A, core 1 is configured so that salient pole tips are disposed with an equal angular pitch, and salient poles tips 41 each having an opening angle of 16.875° (150° in electrical angle–one-quarter the cycle of basic cogging torque) and salient poles tips 42 each having an opening angle of 20.625° (150° in electrical angle+one-quarter the cycle of the basic cogging torque) are alternately provided. For this configuration, the technique described in the fifth embodiment is employed, and its effects are the same as those produced by the fifth embodiment.

Figure 17A:
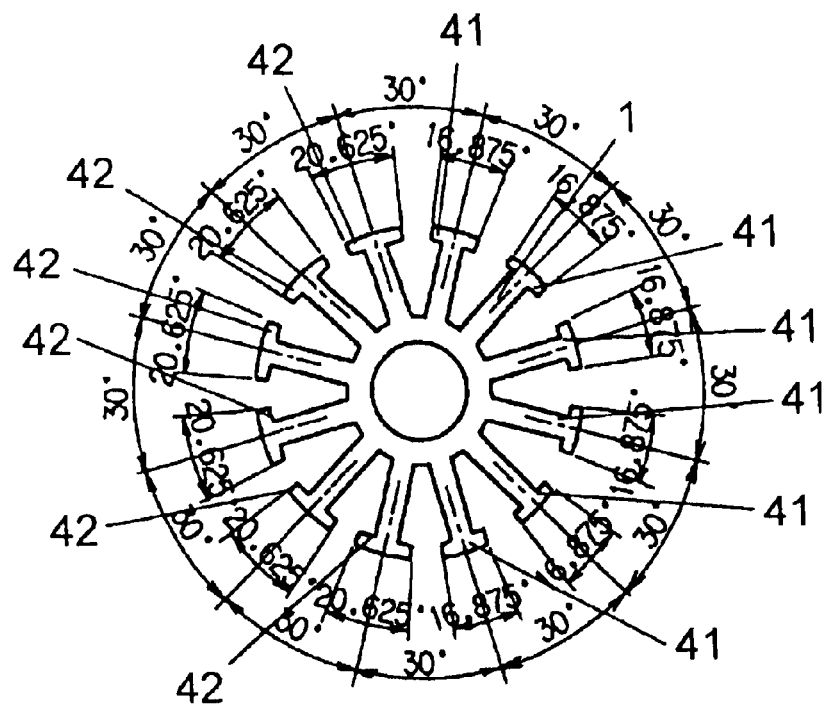
FIG. 17A shows still another core shape in accordance with the eighth embodiment of the present invention.
Figure 17B:
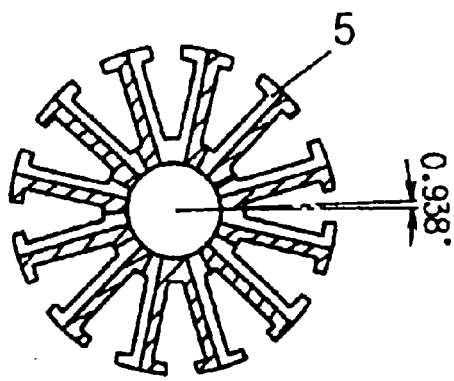
FIG. 17B illustrates a core section displaced counterclockwise from a basic configuration in the core shape shown in FIG. 17A.
Figure 17C:
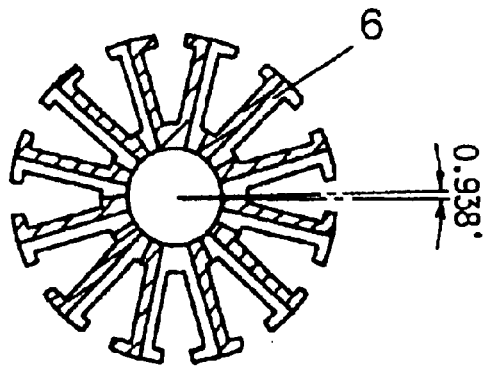
FIG. 17C illustrates a core section displaced clockwise from the basic configuration in the core shape shown in FIG. 17A.

In FIG. 17A, core 1 is configured so that salient pole tips are disposed with an equal angular pitch, and salient pole tips 41 on a half side of the core have an opening angle of 16.875° (150° in electrical angle–one-quarter the cycle of basic cogging torque) and salient pole tips 42 on the other half have an opening angle of 20.625° (150° in electrical angle+one-quarter the cycle of the basic cogging torque). For this configuration, the technique described in the sixth embodiment is employed, and its effects are the same as those produced by the sixth embodiment.

Figure 18A:
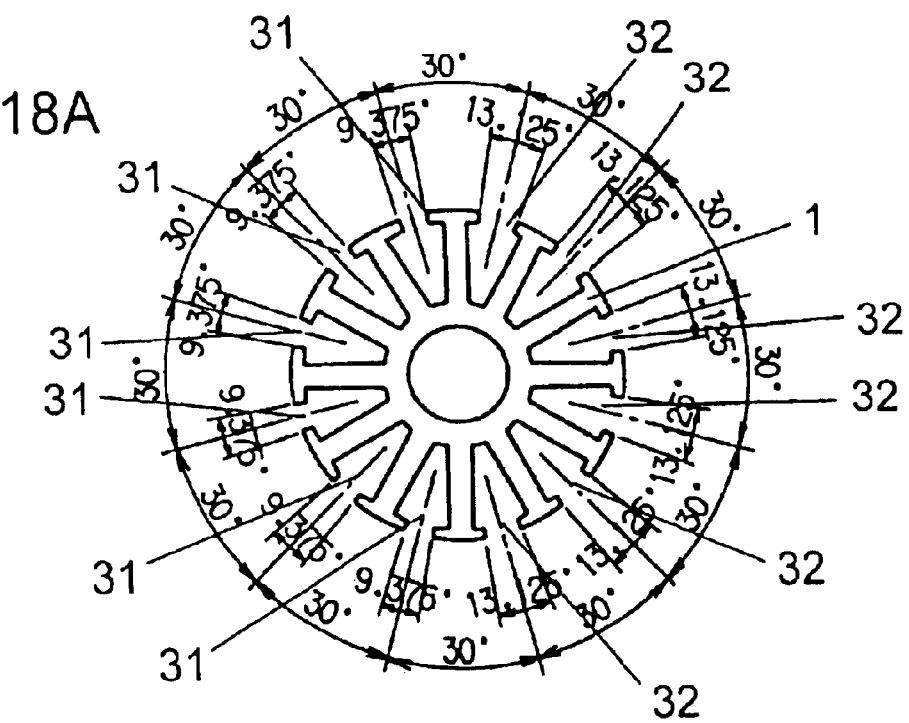
FIG. 18A shows still another core shape in accordance with the eighth embodiment of the present invention.
Figure 18B:
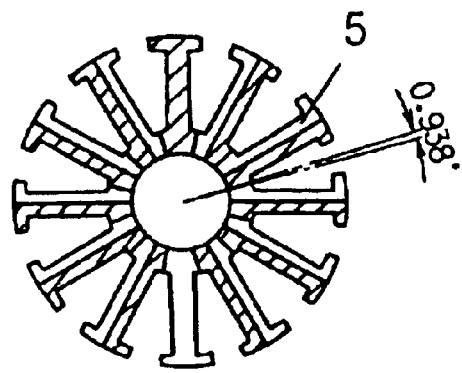
FIG. 18B illustrates a core section displaced counterclockwise from a basic configuration in the core shape shown in FIG. 18A.
Figure 18C:
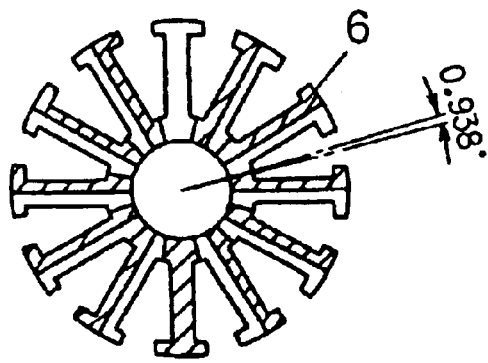
FIG. 18C illustrates a core section displaced clockwise from the basic configuration in the core shape shown in FIG. 18A.

In FIG. 18A, core 1 is configured so that slots are disposed with an equal angular pitch, and slots 31 on a half side of the core have an opening angle of 9.375° (90° in electrical angle–one-quarter the cycle of basic cogging torque) and slots 32 on the other half have an opening angle of 13.125° (90° in electrical angle+one-quarter the cycle of the basic cogging torque). For this configuration, the technique described in the seventh embodiment is employed, and its effects are the same as those produced by the seventh embodiment.

In addition, FIGS. 19A through 22A also show still other core shapes in accordance with the eighth embodiment.

Figure 19A:
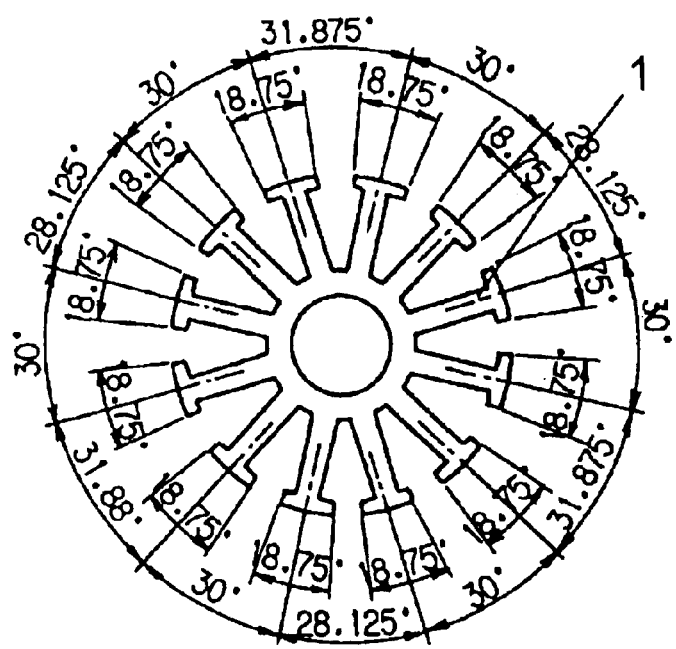
FIG. 19A shows still another core shape in accordance with the eighth embodiment of the present invention.
Figure 19B:
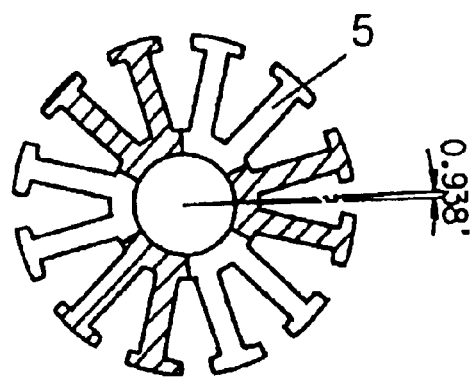
FIG. 19B illustrates a core section displaced counterclockwise from a basic configuration in the core shape shown in FIG. 19A.
Figure 19C:
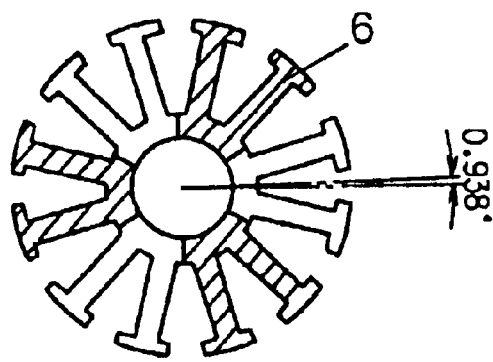
FIG. 19C illustrates a core section displaced clockwise from the basic configuration in the core shape shown in FIG. 19A.
Figure 20A:
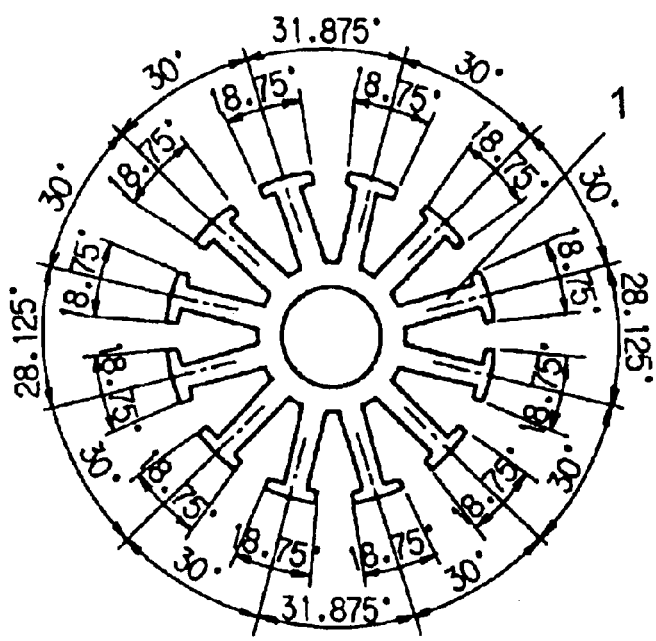
FIG. 20A shows still another core shape in accordance with the eighth embodiment of the present invention.
Figure 20B:
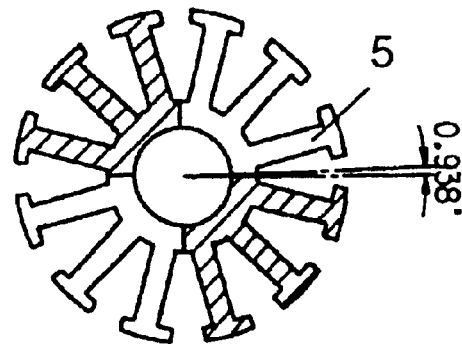
FIG. 20B illustrates a core section displaced counterclockwise from a basic configuration in the core shape shown in FIG. 20A.
Figure 20C:
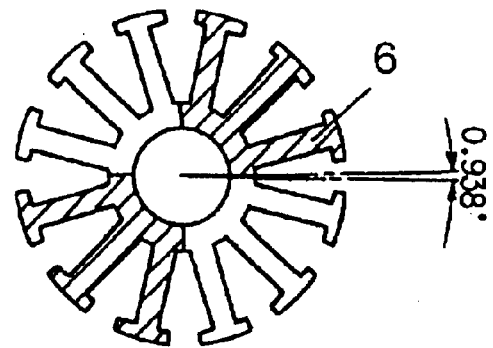
FIG. 20C illustrates a core section displaced clockwise from the basic configuration in the core shape shown in FIG. 20A.
Figure 21A:
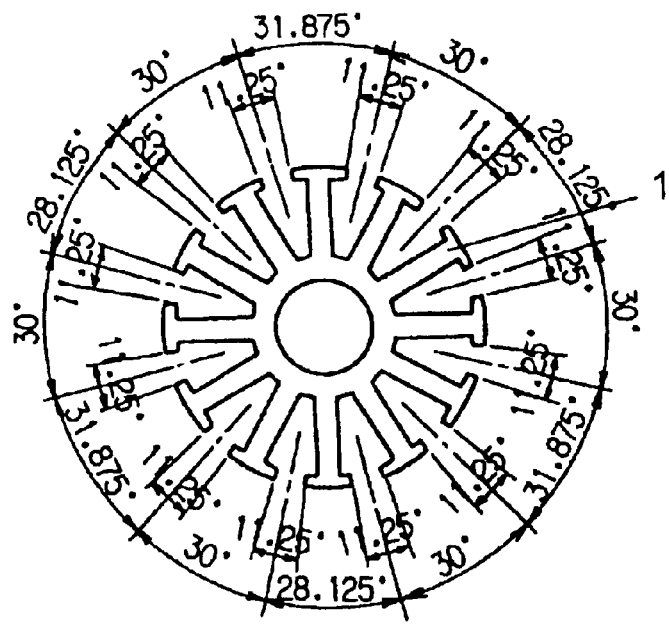
FIG. 21A shows still another core shape in accordance with the eighth embodiment of the present invention.
Figure 21B:
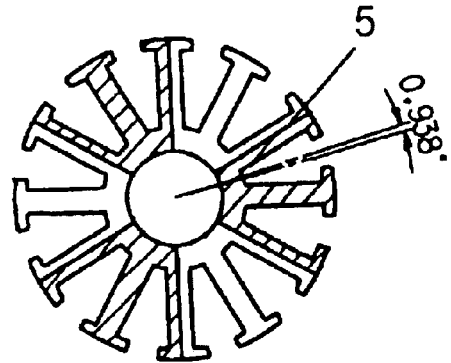
FIG. 21B illustrates a core section displaced counterclockwise from a basic configuration in the core shape shown in FIG. 21A.
Figure 21C:
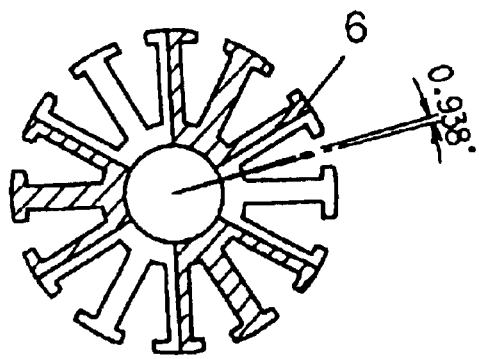
FIG. 21C illustrates a core section displaced clockwise from the basic configuration in the core shape shown in FIG. 21A.
Figure 22A:
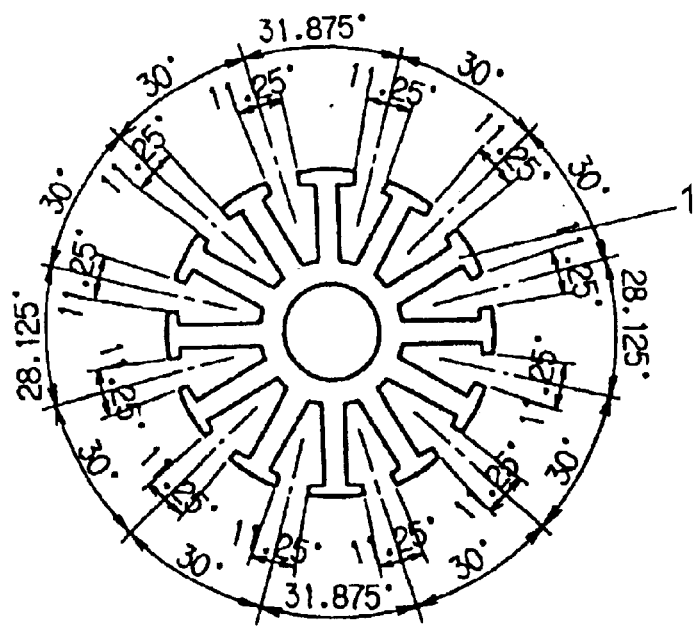
FIG. 22A shows still another core shape in accordance with the eighth embodiment of the present invention.
Figure 22B:
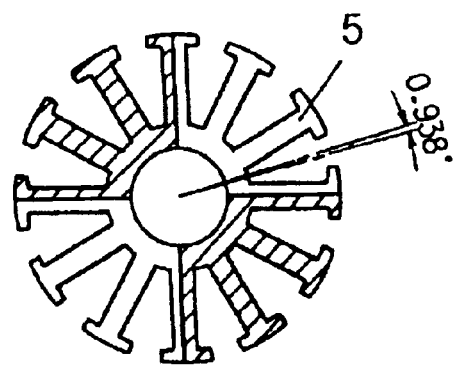
FIG. 22B illustrates a core section displaced counterclockwise from a basic configuration in the core shape shown in FIG. 22A.
Figure 22C:
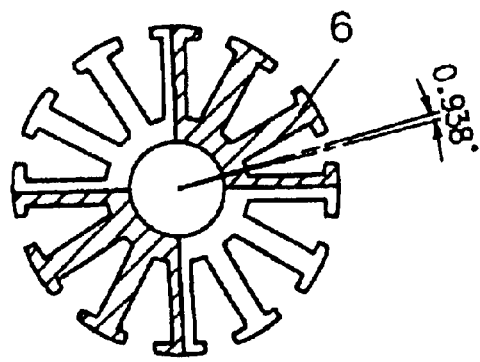
FIG. 22C illustrates a core section displaced clockwise from the basic configuration in the core shape shown in FIG. 22A.

When the number of the slots is "12", two types of configurations can be used. For one type, as shown in FIGS. 19A or 20A, the opening angles of salient pole tips are constant at 18.75° (150° in electrical angle), and salient poles are disposed with different angular pitches. For the other type, as shown in FIGS. 21A or 22A, the opening angles of core slots are constant at 11.25° (90° in electrical angle), and slots are disposed-with different angular pitches.

These second through eighth embodiments are the examples designed according to basic configurations in which the opening angles of core slots are set to 90° in electrical angle. As described in the first embodiment, it is preferable to set the opening angles of core slots of a basic configuration to an appropriate value ranging from 80° to 95° and 20° to 35°. For each of these embodiments in which slot opening angles are set to 90° in electrical angle and the number of magnet poles are set to 2m (m is an integer), the preferable range of slot opening angles can be generalized as from (80/m)° to (90/m)° and from (20/m)° to (35/m)° in mechanical angle.

In addition, the above-mentioned preferable range can be generalized for the opening angles of salient pole tips. When a ratio of the number of magnet poles to the number of core slots is 4:3, for a core in which the opening angles of its salient pole tips are set to 150° in electrical angle, the preferable range of a salient pole tip opening angle can be generalized as from (145/m)° to (160/m)° and from (205/m)° to (220/m)° in mechanical angle in a similar manner.

Even in cases of different number of magnet poles or core slots, the above-mentioned preferable range can be used. When the number of magnet poles is 2m and the number of core slots is 6n (m and n are integers), generally, a basic configuration of a core shape that produces cogging torque having one-half the cycle of basic cogging torque is determined by setting its slot opening angles to an appropriate value ranging from 80° to 95° and from 20° to 35° in electrical angle (from (80/m)° to (90/m)° and from (20/m)° to (35/m)° in mechanical angle). Furthermore, combining two core shapes each having the slots displaced by an angle equal to one-quarter the cycle of basic cogging torque ((90/k)° in mechanical angle [k is a least common multiple of 2m and 6n]) can provide a motor in which the cogging torque has one-quarter the cycle of the basic cogging torque and its absolute value is considerably reduced.

Ninth Embodiment

The above second through eighth embodiments are cases where a core has a even number of slots; and even with a core having an odd number of slots, the same effects are produced as well in a manner described below.

In the ninth embodiment, a case where the number of magnet poles is "12" and the number of core slots is "9" will be described as an example. Since the number of the magnet poles is "12", a mechanical angle of 60° corresponds to an electrical angle of 360°. The least common multiple of "12" and "9" is "36"; and thus the cycle of basic cogging torque is 10° in mechanical angle, or 60° in electrical angle.

In these second through eighth embodiments, two core shapes generating cogging torque waveforms 180° out of phase (one-quarter the cycle of basic cogging torque) each other are combined. As for the ninth embodiment, a core is configured by combining three shapes generating waveforms 120° out of phase each other.

Figure 23A:
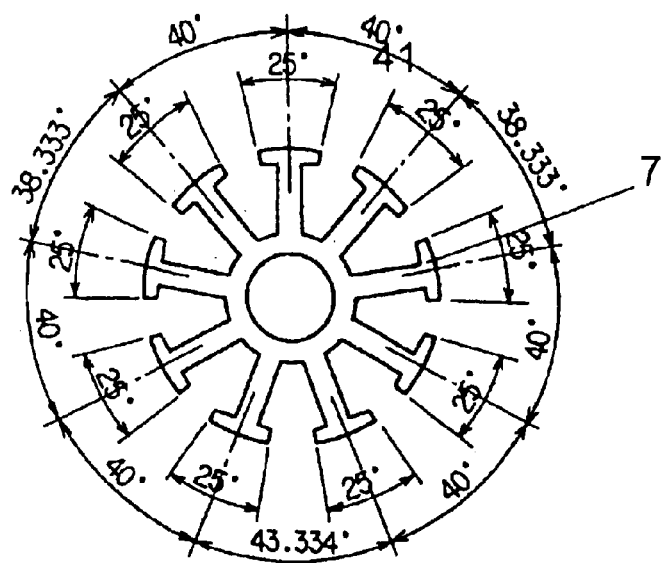
FIG. 23A shows a core shape in accordance with a ninth embodiment of the present invention.

FIG. 23A shows a core shape in accordance with the ninth embodiment.

Figure 23B:
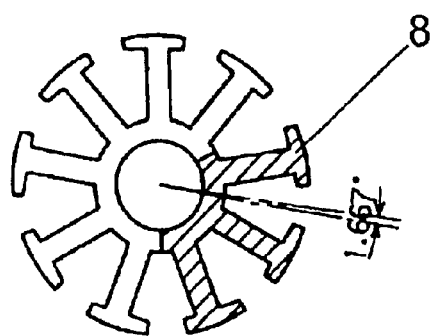
FIG. 23B illustrates a core section displaced counterclockwise from a basic configuration in the core shape shown in FIG. 23A.
Figure 23C:
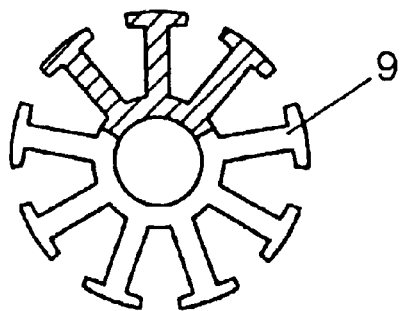
FIG. 23C illustrates a core section of the basic configuration in the core shape shown in FIG. 23A.
Figure 23D:
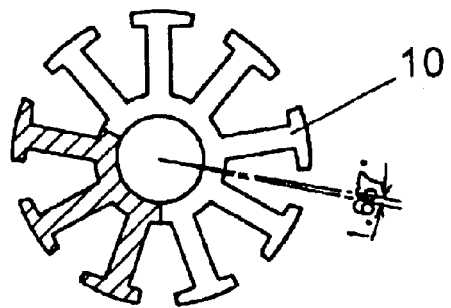
FIG. 23D illustrates a core section displaced clockwise from the basic configuration in the core shape shown in FIG. 23A.
Figure 24A:
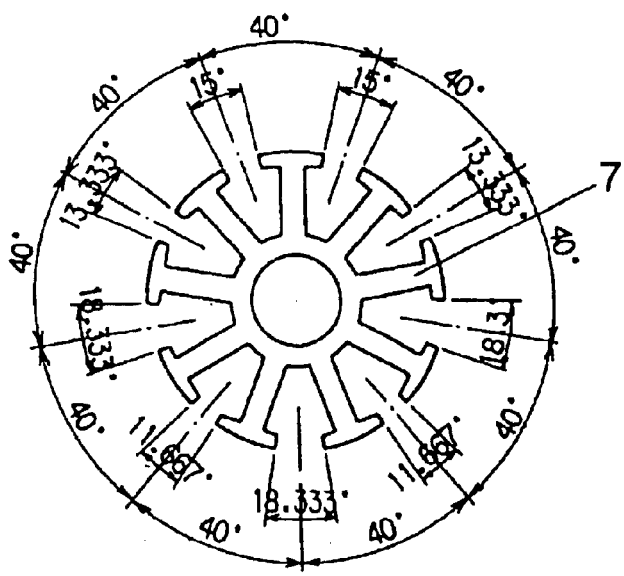
FIG. 24A shows another core shape in accordance with the ninth embodiment of the present invention.
Figure 24B:
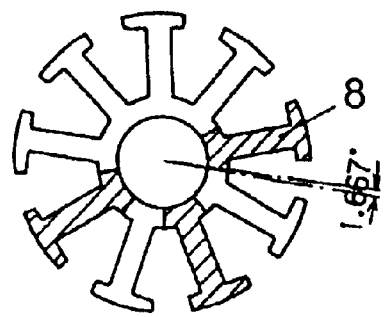
FIG. 24B illustrates a core section displaced counterclockwise from a basic configuration in the core shape shown in FIG. 24A.
Figure 24C:
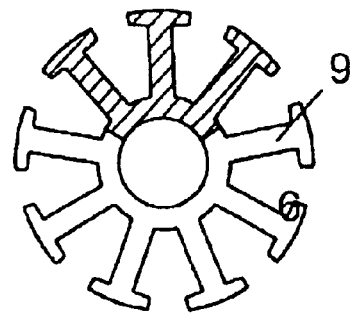
FIG. 24C illustrates a core section of the basic configuration in the core shape shown in FIG. 24A.
Figure 24D:
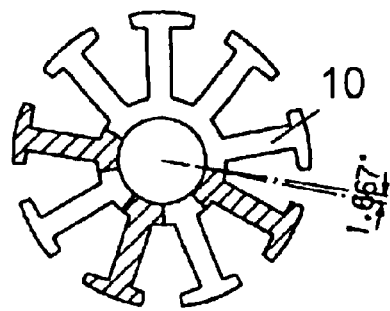
FIG. 24D illustrates a core section displaced clockwise from the basic configuration in the core shape shown in FIG. 24A.
Figure 25A:
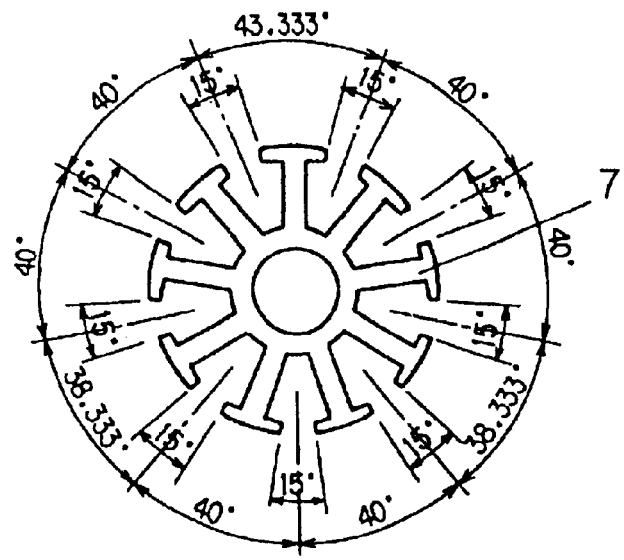
FIG. 25A shows still another core shape in accordance with the ninth embodiment of the present invention.
Figure 25B:
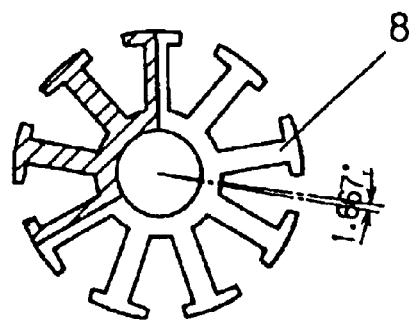
FIG. 25B illustrates a core section displaced counterclockwise from a basic configuration in the core shape shown in FIG. 25A.
Figure 25C:
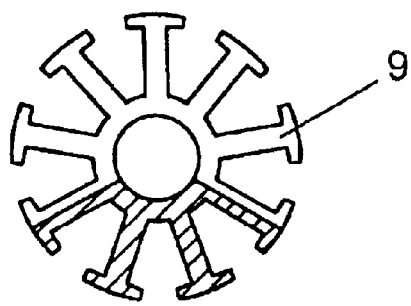
FIG. 25C illustrates a core section of the basic configuration in the core shape shown in FIG. 25A.
Figure 25D:
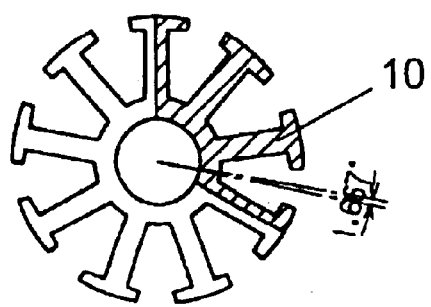
FIG. 25D illustrates a core section displaced clockwise from the basic configuration in the core shape shown in FIG. 25A.
Figure 26A:
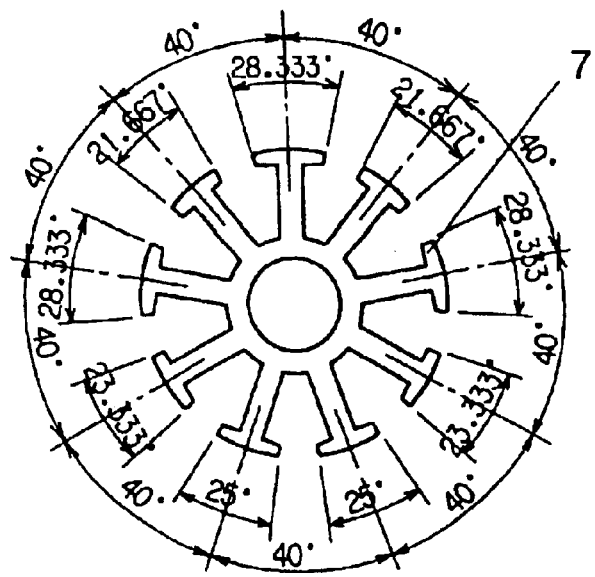
FIG. 26A shows still another core shape in accordance with the ninth embodiment of the present invention.
Figure 26B:
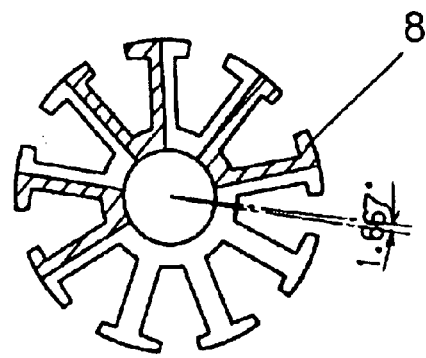
FIG. 26B illustrates a core section displaced counterclockwise from a basic configuration in the core shape shown in FIG. 26A.
Figure 26C:
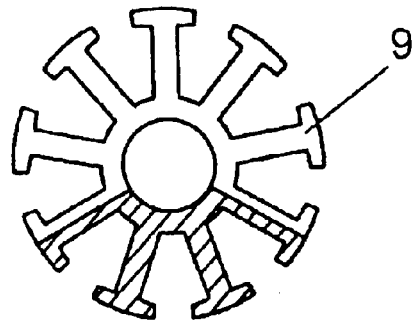
FIG. 26C illustrates a core section of the basic configuration in the core shape shown in FIG. 26A.
Figure 26D:
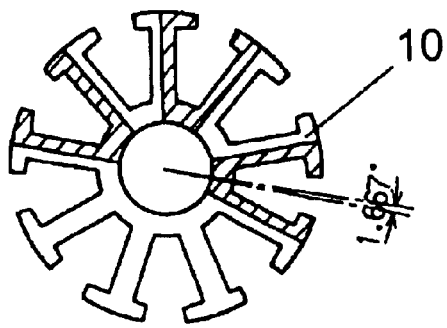
FIG. 26D illustrates a core section displaced clockwise from the basic configuration in the core shape shown in FIG. 26A.
Figure 27A:
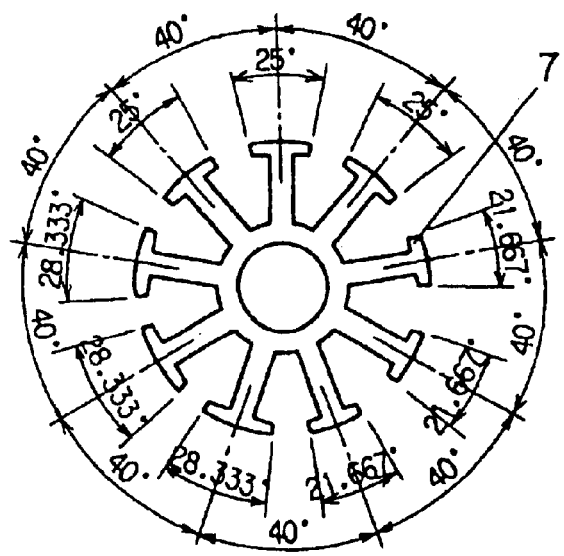
FIG. 27A shows still another core shape in accordance with the ninth embodiment of the present invention.
Figure 27B:
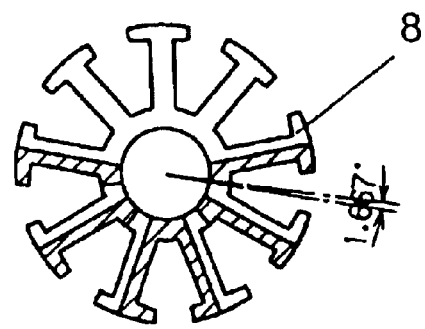
FIG. 27B illustrates a core section displaced counterclockwise from a basic configuration in the core shape shown in FIG. 27A.
Figure 27C:
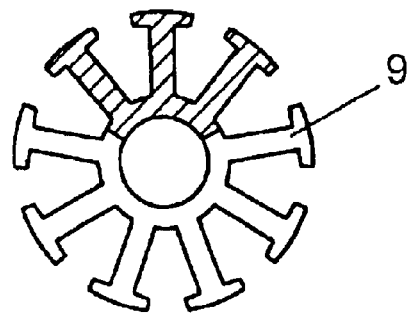
FIG. 27C illustrates a core section of the basic configuration in the core shape shown in FIG. 27A.
Figure 27D:
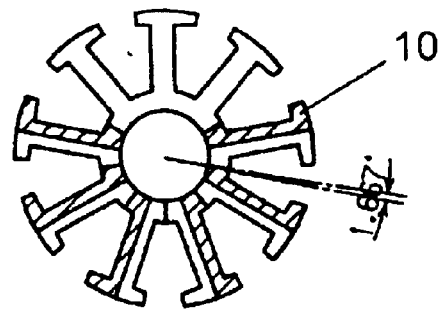
FIG. 27D illustrates a core section displaced clockwise from the basic configuration in the core shape shown in FIG. 27A.
Figure 28A:
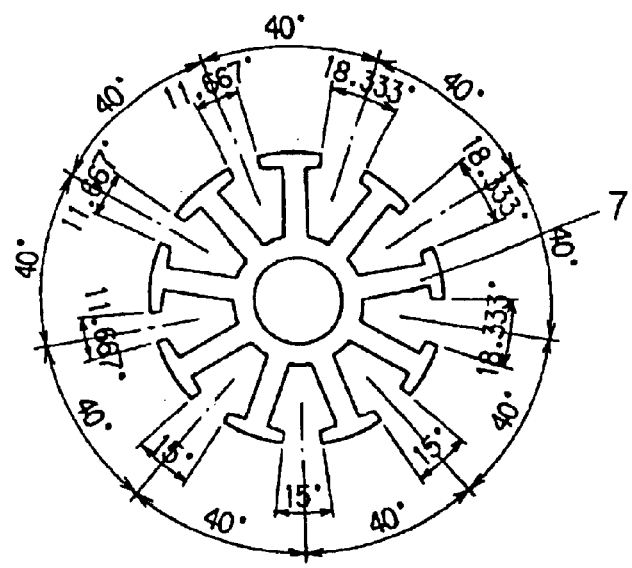
FIG. 28A shows still another core shape in accordance with the ninth embodiment of the present invention.
Figure 28B:
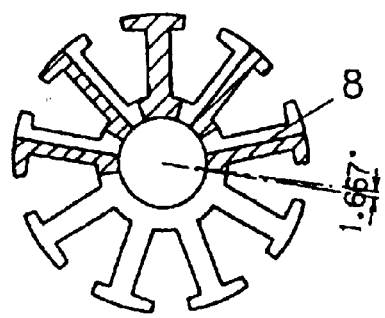
FIG. 28B illustrates a core section displaced counterclockwise from a basic configuration in the core shape shown in FIG. 28A.
Figure 28C:
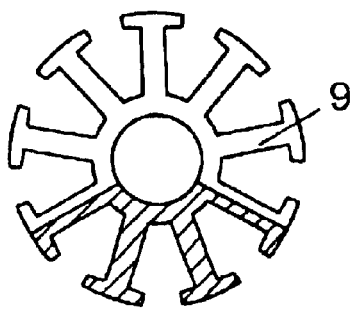
FIG. 28C illustrates a core section of the basic configuration in the core shape shown in FIG. 28A.
Figure 28D:
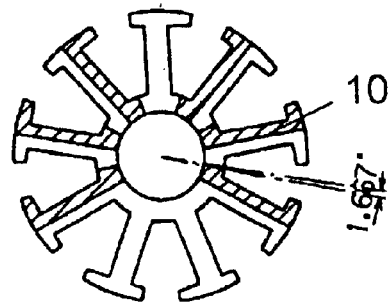
FIG. 28D illustrates a core section displaced clockwise from the basic configuration in the core shape shown in FIG. 28A.

Core 7 of the ninth embodiment (FIG. 23A) is configured by combining a third of core 9 of a basic configuration as shown in FIG. 23C, a third of core 8 in which salient pole tips of the basic configuration are displaced 1.667° (one-sixth the cycle of the basic cogging torque) counterclockwise as shown in FIG. 23B, and a third of core 10 in which salient pole tips of the basic configuration are displaced 1.667° clockwise as shown in FIG. 23D The cogging torque waves generated in core 8, 9, and 10 shown in FIGS. 23B, 23C, and 23D, respectively, are equal in absolute value and waveform, but 120° out of phase each other. In the cogging torque waveform generated by core 7 that is a combination of these core thirds, the first-, second-, fourth-, fifth-, seventh-order components, etc. are cancelled; and thus the cycle of cogging torque is reduced to one-third of that generated by the basic configuration and its absolute value is also reduced. According to the similar idea, core shapes shown in FIGS. 24A through 28A can be produced as well.

In addition, even to cases of a different number of magnet poles or core slots, the above idea can be applied. When the number of magnet poles is 2n and the number of core slots is 3n (m and n are integers), generally, a basic configuration of a core shape producing cogging torque having one-half the cycle of basic cogging torque is determined by setting its slot opening angles to an appropriate value ranging from 80° to 95° and from 20° to 35° in electrical angle (from (80/m)° to (95/m)° and from (20/m)° to (35/m)° in mechanical angle). Furthermore, combining three core shapes each having the slots displaced by an angle equal to one-sixth the cycle of the basic cogging torque ((60/k)° in mechanical angle [k is a least common multiple of 2m and 6n]) allows the cycle of cogging torque to be reduced to one-half the cycle of the basic cogging torque (an effect of the basic configuration)×⅓ (an effect of the combination of these three core shapes) i.e. one-sixth the cycle of the basic cogging torque, and its absolute value to be reduced considerably as well.

Tenth Embodiment

In these second through ninth embodiments, a combination of two or three core shapes has produced cogging torque having one-quarter or one-sixth the cycle of basic cogging torque. As for the tenth embodiment, a technique of further reducing the cogging torque using a combination of four or more core shapes.

In the tenth embodiment, examples of combinations of four shapes generating cogging torque waveforms 90° out of phase each other will be described.

Figure 29A:
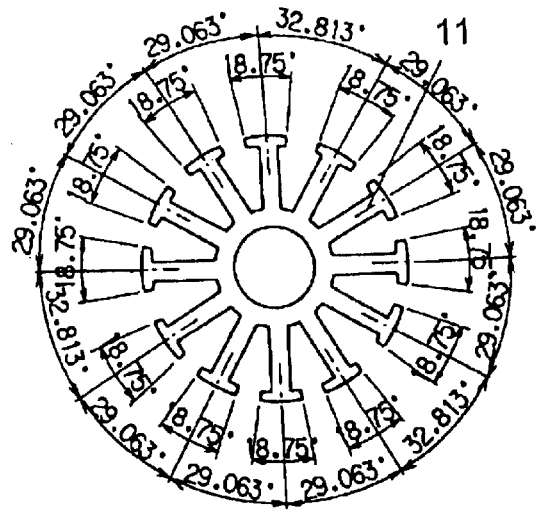
FIG. 29A shows a core shape in accordance with a tenth embodiment of the present invention.
Figure 29B:
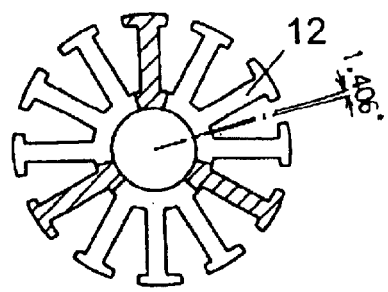
FIGS. 29B, 29C, 29D, and 29E illustrate core sections 90° in electrical angle out of phase each other constituting the core shape shown in FIG. 29A.
Figure 29C:
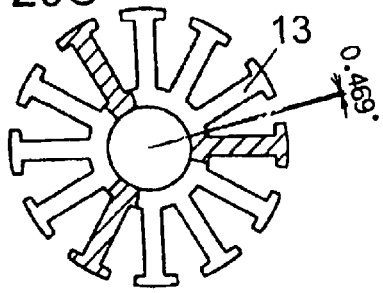
Figure 29D:
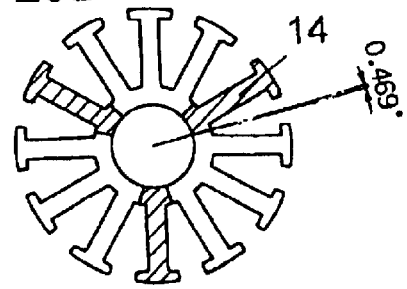
Figure 29E:
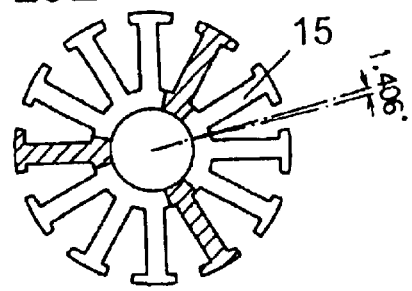

FIG. 29A shows a core shape in accordance with the tenth embodiment. In the tenth embodiment, a case where the number of magnet poles is "16" and the number of slots is "12" is described as an example. Since the number of the magnet poles is "16", a mechanical angle of 45° corresponds to an electrical angle of 360°. The least common multiple of "16" and "12" is "48"; and thus the cycle of basic cogging torque is 7.5° in mechanical angle, or 60° in electrical angle.

Core 11 of the tenth embodiment is configured by combining fourths of four cores 12, 13, 14, and 15. As shown in FIGS. 29B through 29E, in those cores, respective cogging torque waveforms are made 90° out of phase each other by providing the salient pole tips of each fourth with angular displacement by 0.9375° (one-eighth the cycle of the basic cogging torque) each.

In the cogging torque waveform generated by core 11 made of a combination of these fourths, the odd-numbered-order components and second-order components are cancelled out; and whereby its cycle is made one-quarter the cycle of the basic cogging torque and its absolute value is further reduced. According to the similar idea, a core shape shown in FIG. 30A and other various shapes can be produced. Thus, motors having a slightly complicated core shape but extremely minimized cogging torque can be provided.

Figure 30A:
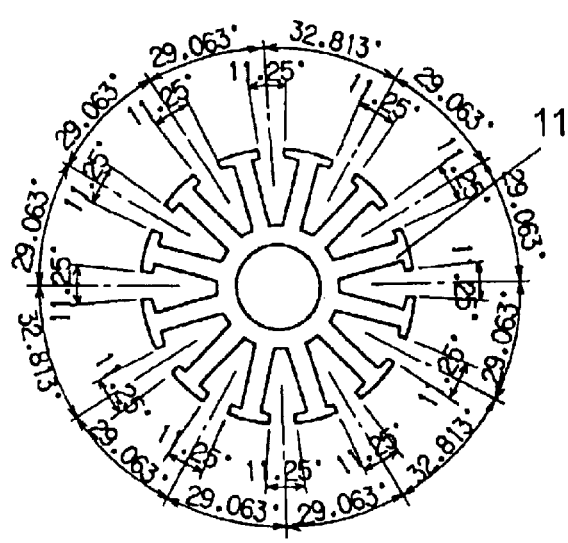
FIG. 30A shows another core shape in accordance with the tenth embodiment of the present invention.
Figure 30B:
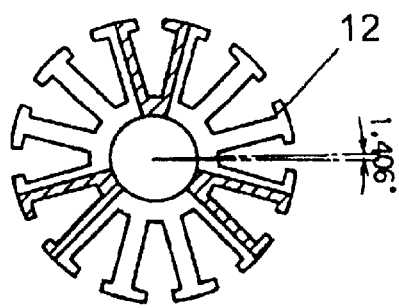
FIGS. 30B, 30C, 30D, and 30E illustrate core sections 90° in electrical angle out of phase each other constituting the core shape shown in FIG. 30A.
Figure 30C:
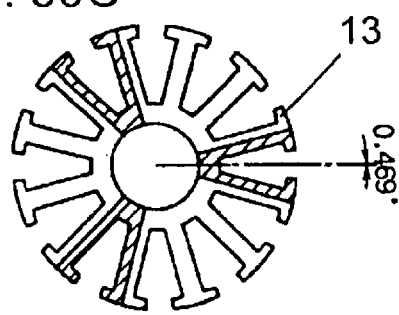
Figure 30D:
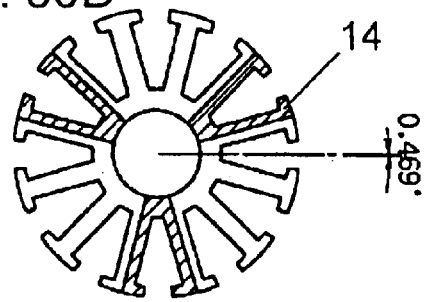
Figure 30E:
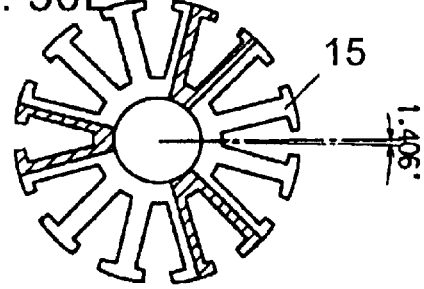

For the motors shown FIGS. 29A and 30A, the cycle of cogging torque is reduced to one-half the cycle of basic cogging torque (an effect of the basic configuration)×¼ (an effect of the combination of these four core shapes), i.e. one-eighth the cycle of the basic cogging torque, and it absolute value is also reduced considerably.

In the above description, a combination of four shapes is used; and the same technique can be used for five or more core shapes. Generally, when the number of magnetic poles is 2m and the number of core slots is 3n (m and n are integers, n☐4), a basic configuration of a core shape is determined by setting its slot opening angles to an appropriate value ranging from 80° to 95° and from 20° to 35° in electrical angle (from (80/m)° to (95/m)° and from(20/m)° to (35/m)° in mechanical angle). Furthermore, combining P core shapes each having the slots displaced by an angle equal to one-2P-th the cycle of basic cogging torque (180/ (n·k))° in mechanical angle [k is a least common multiple of 2m and 3n]) allows a cycle of cogging torque to be reduced to one-2P-th the cycle of the basic cogging torque and its absolute value to be reduced considerably as well.

Eleventh Embodiment

Eleventh through eighteenth embodiments below will describe techniques of reducing cogging torque using core shapes which also vary in axial direction.

Figure 31A:
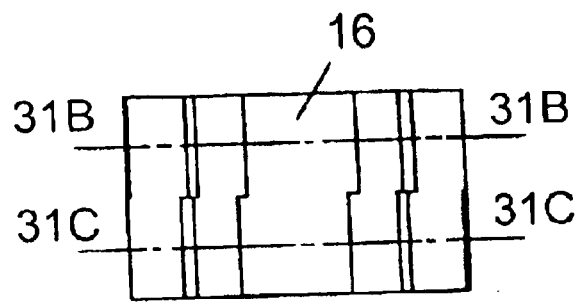
FIG. 31A illustrates a vertical section of a laminated core shape in accordance with an eleventh embodiment of the present invention.
Figure 31B:
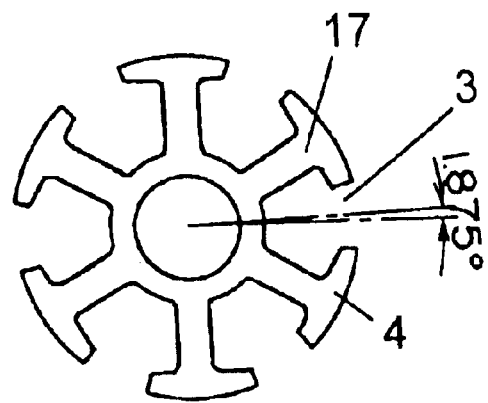
FIG. 31B illustrates a cross section taken on line 31B—31B of the core shape shown in FIG. 31A.
Figure 31C:
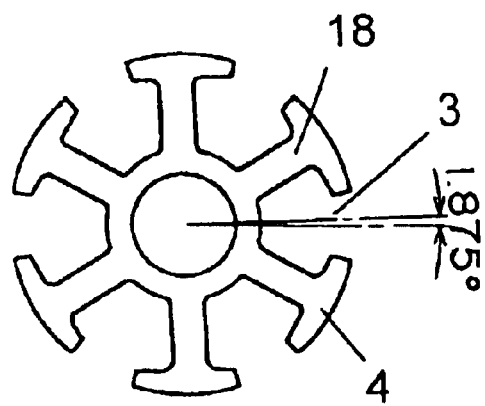
FIG. 31C illustrates a cross section taken on line 31C—31C of the core shape shown in FIG. 31A.

FIGS. 31A to 31C show core shapes in accordance with the eleventh embodiment.

In the eleventh embodiment, a case where the number of magnet poles is "8" and the number of core slots is "6" is described as an example. Since the number of the magnet poles is "8", a mechanical angle of 90° corresponds to an electrical angle of 360°. The least common multiple of "8 and "6" is "24"; and thus the cycle of basic cogging torque is 15° in mechanical angle, or 60° in electrical angle.

In FIGS. 31A through 31C, core 16 is configured so that opening angles of its salient pole tips are constant at 150° in electrical angle, and salient pole tip 4 in the upper half of the core is displaced 1.875° (one-eighth the cycle of basic cogging torque) clockwise and salient pole tip 4 in the lower half is displaced 1.875° counterclockwise. This core 16 is configured according to the following idea.

Figure 32A:
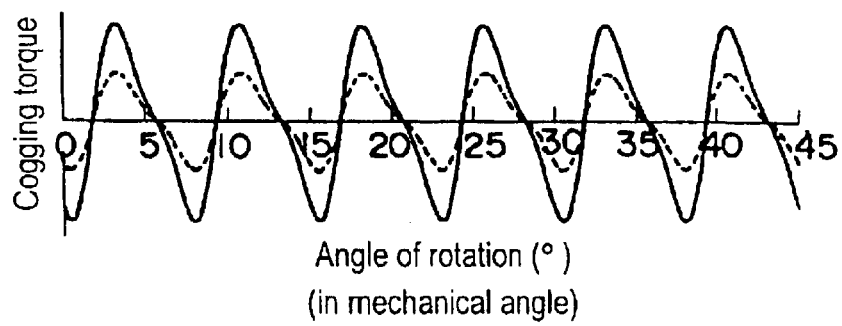
FIG. 32A shows a cogging torque waveform of the core shape shown in FIG. 31B.

FIG. 31B shows core 17 configured so that the opening angle of slot 3 is set to 90° in electrical angle and salient pole tip 4 is displaced 1.875° (one-eighth the cycle of basic cogging torque) counterclockwise. For this core 17, salient pole tip 4 are configured in a manner slightly different from the basic configuration; however, as shown by the solid line in FIG. 32A, the core produces cogging torque identical to that produced by the basic configuration except that the phase is slightly different.

Figure 32B:
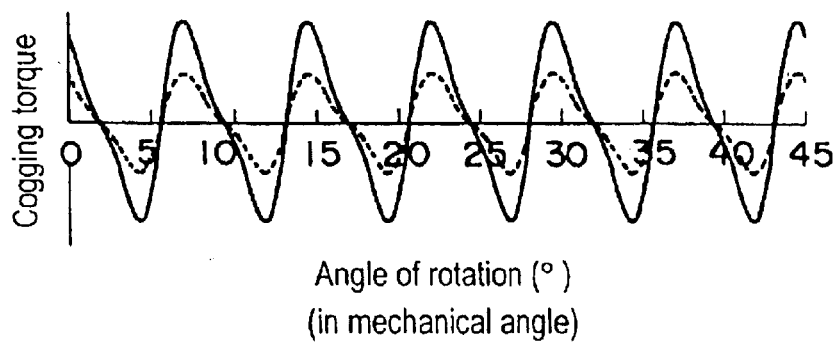
FIG. 32B shows a cogging torque waveform of the core shape shown in FIG. 31C.

FIG. 31C shows core 18 configured so that the opening angle of slot 3 is set to 90° in electrical angle and salient pole tip 4 is displaced 1.875° clockwise. Likewise, as shown by the solid line in FIG. 32B, core 18 also produces cogging torque identical to that produced by the basic configuration except that the phase is slightly different.

The cogging torque waveforms generated in these two cores 17 and 18 are the same in absolute value and 180° out of phase (3.75° in mechanical angle, or one-quarter the cycle of the basic cogging torque).

Figure 32C:
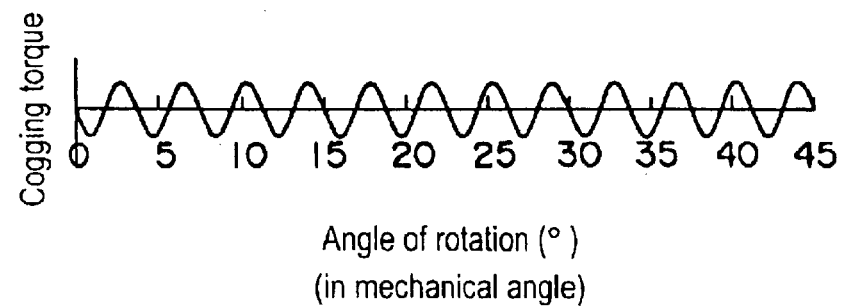
FIG. 32C shows a cogging torque waveform generated by the core shape shown in FIG. 31A that is a combination of those shown in FIGS. 32A and 32B.

Core 16 of the eleventh embodiment is configured by placing a half of core 17 shown in FIG. 31B on a half of core 18 shown in FIG. 31C. As shown by the broken line in FIG. 32A, the upper half of core 17 produces cogging torque having one-half the absolute value of and in phase with the cogging torque produced by the entire core 17 shown in FIG. 31B. The same holds true for the lower half of core 18. For core 16 of the eleventh embodiment where these two halves are combined, cogging torque waveforms generated by these halves cancel out each other, thus canceling odd-numbered-order components of the cogging torque. Therefore, as shown in FIG. 32C, the resultant cogging torque has a waveform repeated 96 times per revolution and its cycle is one-half of (one-quarter the cycle of the basic cogging torque) and its absolute value is one-half or less than those generated by the basic configuration.

The above-mentioned structure reduces the cycle of cogging torque to one-quarter or less the cycle of ordinary cogging torque as well as its absolute value. Therefore, the cogging torque can be reduced to the extent that its cycle is one-half of and its absolute value is one-half or less than those produced with the conventional techniques described in Japanese Patent Application Non-examined Publication No. H02-254954, Japanese Patent Application Non-examined Publication No. H03-3622, and others.

Although the configuration of core 16 of the eleventh embodiment is similar to those in accordance with the techniques described in Japanese Patent Application Non-examined Publication No. H02-254954, etc., the angular displacement between upper and lower halves of core 16 is one-half of that described in the above-mentioned publication. The core in accordance with the present invention is superior in reducing the cogging torque to one-half or less while maintaining the efficiency produced by the basic configuration as much as possible.

Twelfth Embodiment

Figure 33A:
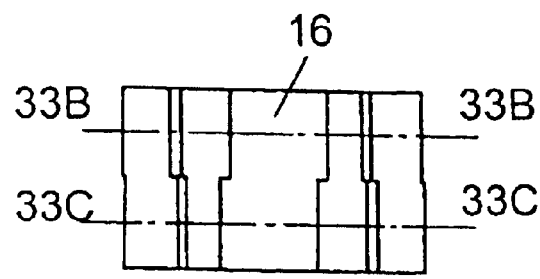
FIG. 33A illustrates a vertical section of a laminated core shape in accordance with a twelfth embodiment of the present invention.
Figure 33B:
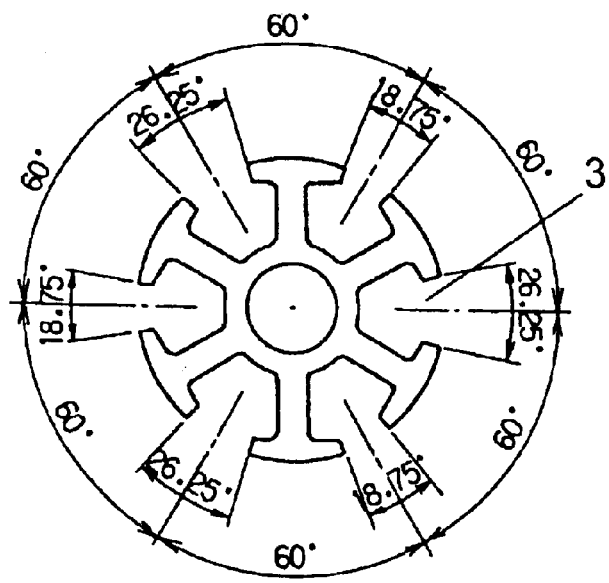
FIG. 33B illustrates a cross section taken on line 33B—33B of the core shape shown in FIG. 33A.
Figure 33C:
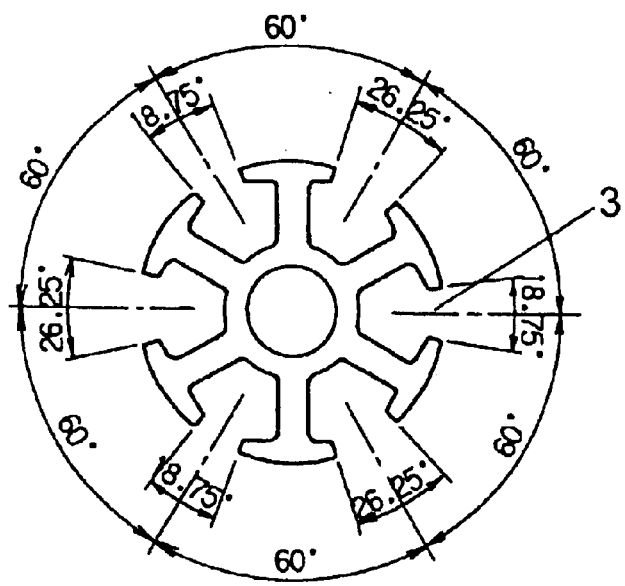
FIG. 33C illustrates a cross section taken on line 33C—33C of the core shape shown in FIG. 33A.

FIGS. 33A through 33C show core shapes in accordance with a twelfth embodiment. In this embodiment, like the eleventh embodiment mentioned above, a case where the number of magnet poles is "8" and the number of core slots is "6" is described as examples.

In FIG. 33A, core 16 is configured by placing laterally inverted two core halves one over the other. In each of the core halves, slots are disposed with an equal angular pitch (60° in mechanical angle), and slots each having an opening angle of 18.75° (90° in electrical angle−one-quarter the cycle of basic cogging torque) and slots each having an opening angle of 26.25° (90° in electrical angle+one-quarter the cycle of the basic cogging torque) are alternately provided. This core shape is more complicated than that of the eleventh embodiment; and, it is configured by combining two halves of cores 17 and 18 shown in FIGS. 34A and 34B generating cogging torque waveforms 180° out of phase each other.

Figure 34A:
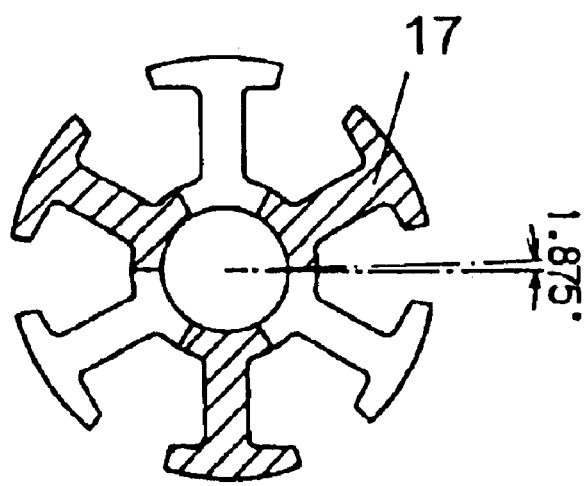
FIGS. 34A and 34B illustrate the configuration of core sections constituting the core shape shown in FIG. 33A.
Figure 34B:
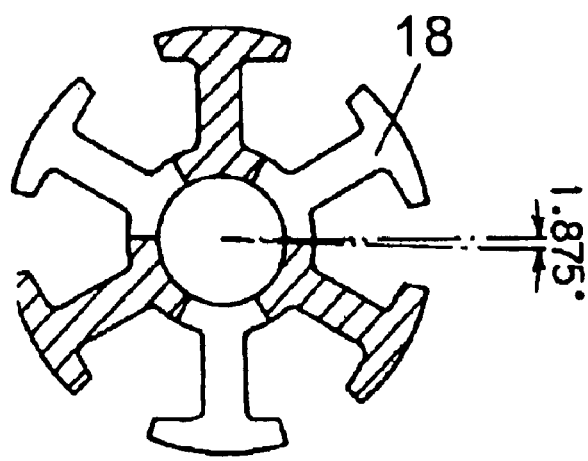

The upper half of core 16 shown in FIG. 33B is configured by a combination of the diagonally shaded parts of cores 17 and 18 shown in FIGS. 34A and 34B, respectively. The lower half of core 16 is configured by the parts other than the diagonally shaded parts of cores 17 and 18 shown in FIGS. 34A and 34B. This shape has the same effects of reducing cogging torque that are produced by the above eleventh embodiment. Moreover, since core 16 is superior in vertical and lateral symmetry and magnetic balance, its structure is advantageous to improve rotational accuracy.

Thirteenth Embodiment

Figure 35A:
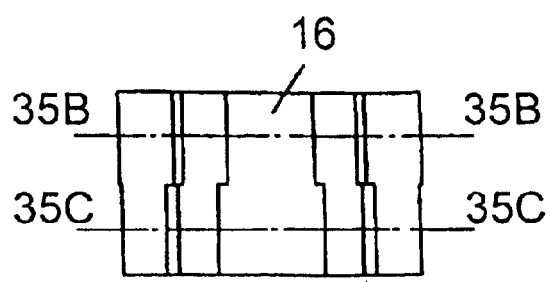
FIG. 35A illustrates a vertical section of a laminated core shape in accordance with a thirteenth embodiment of the present invention.
Figure 35B:
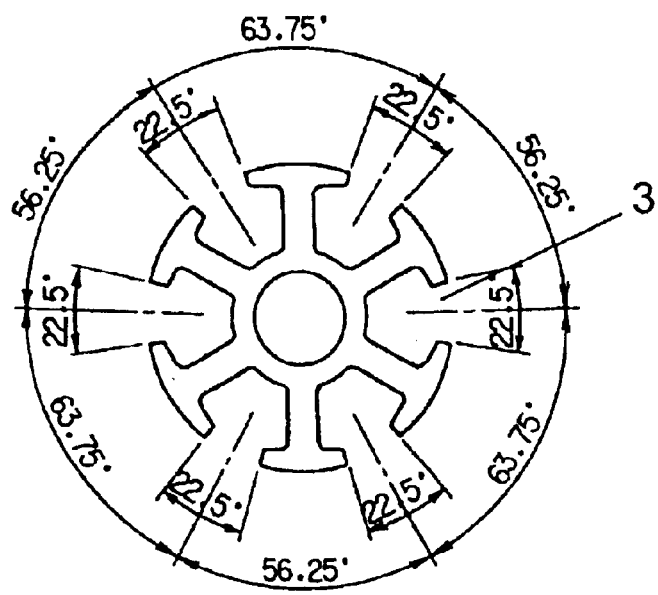
FIG. 35B illustrates a cross section taken on line 35B—35B of the core shape shown in FIG. 35A.
Figure 35C:
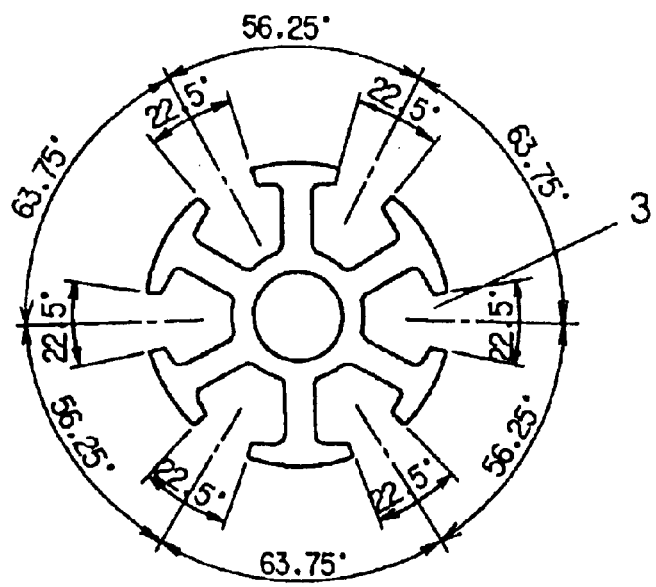
FIG. 35C illustrates a cross section taken on line 35C—35C of the core shape shown in FIG. 35A.

FIGS. 35A through 35C show core shapes in accordance with a thirteenth embodiment. In this embodiment, like the eleventh and twelfth embodiments mentioned above, a case where the number of magnet poles is "8" and the number of core slots is "6" is described as an example.

In FIG. 35A, core 16 is configured by placing vertically inverted two core halves one over the other. In each of the core halves, the opening angles of slots are constant at 90° in electrical angle, and slots each disposed with an angular pitch of 63.75° (a quotient of 360° divided by the number of slots+one-quarter the cycle of basic cogging torque) and slots each disposed with an angular pitch of 56.25° (the quotient of 360° divided by the number of slots−one-quarter the cycle of the basic cogging torque) are alternately provided. This core is also a combination of the halves of cores 17 and 18 shown in FIGS. 36A and 36B like the twelfth embodiment mentioned above.

Figure 36A:
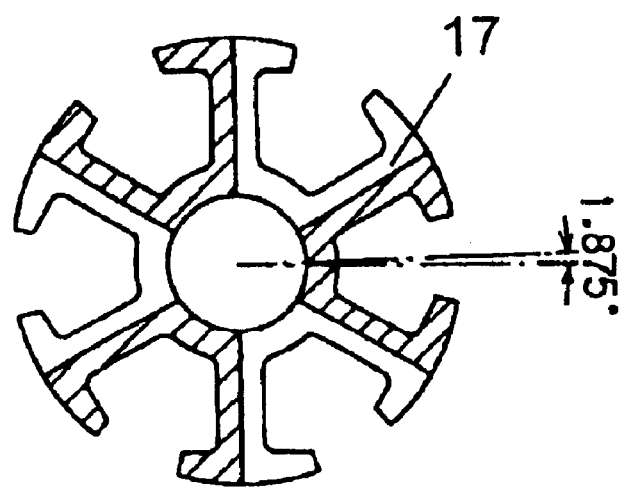
FIGS. 36A and 36B illustrate the configuration of core sections constituting the core shape shown in FIG. 35A.
Figure 36B:
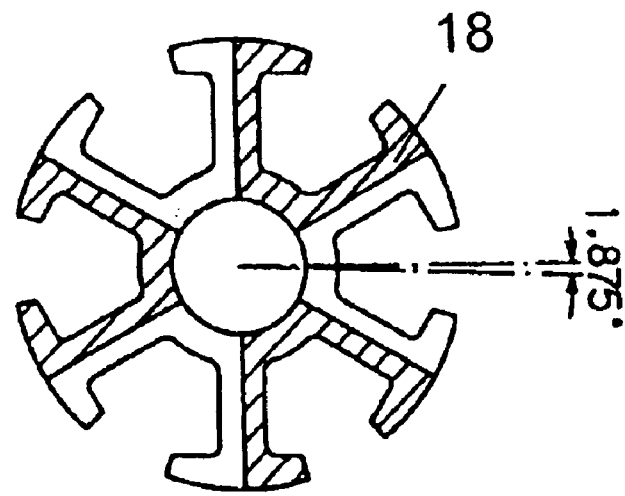

The upper half of core 16 shown in FIG. 35B is configured by a combination of the diagonally shaded parts of cores 17 and 18 shown in FIGS. 36A and 36B, respectively. The lower half of core 16 shown in FIG. 35C is configured by the parts other than the diagonally shaded parts of cores 17 and 18 shown in FIGS. 36A and 36B. This shape has the same effects of reducing cogging torque that are produced by the eleventh and twelfth embodiments described above. Moreover, since core 16 is superior in vertical and lateral symmetry and magnetic balance like the twelfth embodiment, its structure is advantageous to improve rotational accuracy.

The configuration of core 16 of the thirteenth embodiment is similar to those made by the techniques described in Japanese Patent Application Non-examined Publication No. H03-3622, and others. However, in accordance with the description of these publications, cogging torque has been reduced to only one-half the cycle of basic cogging torque. In accordance with the present invention, since predetermined relations are provided between the slot opening angle and angular pitches in core 16, cogging torque is reduced to the extent that its cycle is one-half and its absolute value is one-half or less than those generated by the above-mentioned techniques. Obviously, the present invention has technical advantages over those prior arts.

Fourteenth Embodiment

Figure 37A:
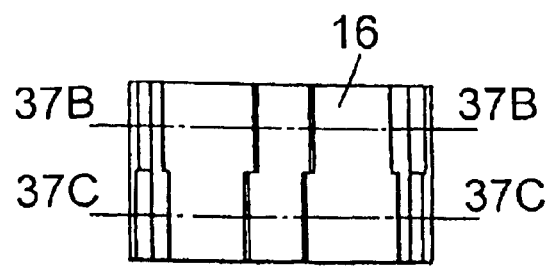
FIG. 37A illustrates a vertical section of a laminated core shape in accordance with a fourteenth embodiment of the present invention.
Figure 37B:
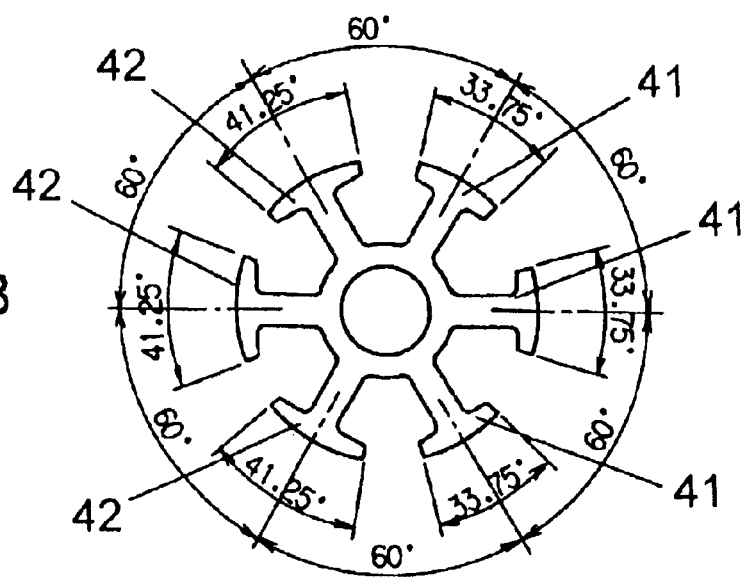
FIG. 37B illustrates a cross section taken on line 37B—37B of the core shape shown in FIG. 37A.
Figure 37C:
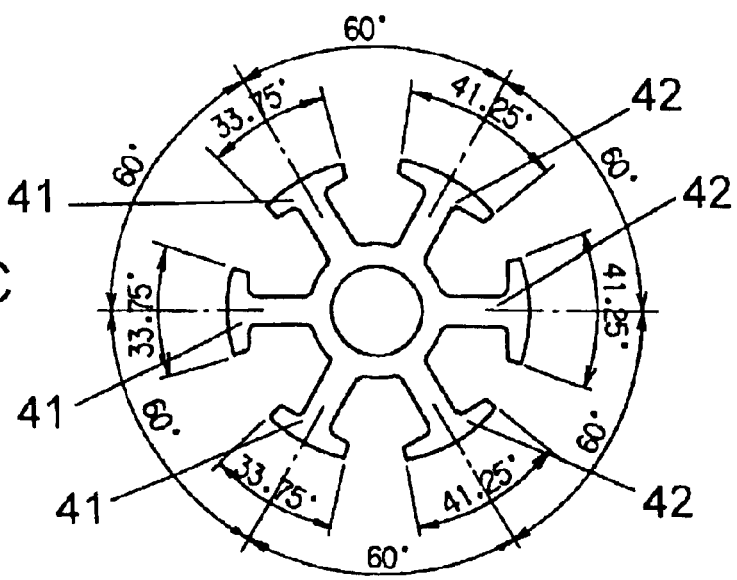
FIG. 37C illustrates a cross section taken on line 37C—37C of the core shape shown in FIG. 37A.

FIGS. 37A to 37C show core shapes in accordance with a fourteenth embodiment. Also in this embodiment, like the eleventh, twelfth, and thirteenth embodiments, a case where the number of magnet poles is "8" and the number of core slots is "6" is described as an example.

Figure 38A:
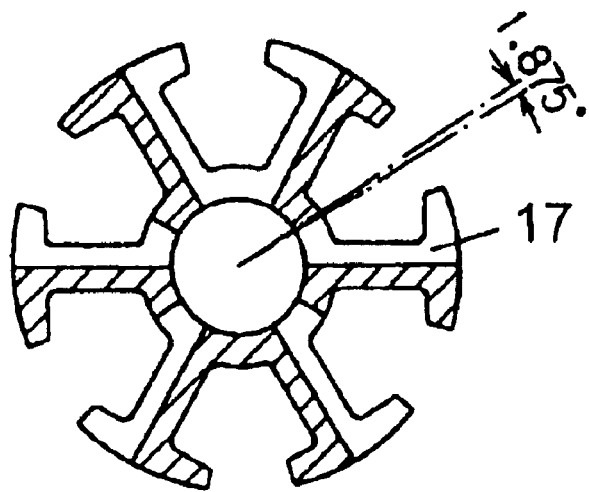
FIGS. 38A and 38B illustrate the configuration of core sections constituting the core shape shown in FIG. 37A.
Figure 38B:
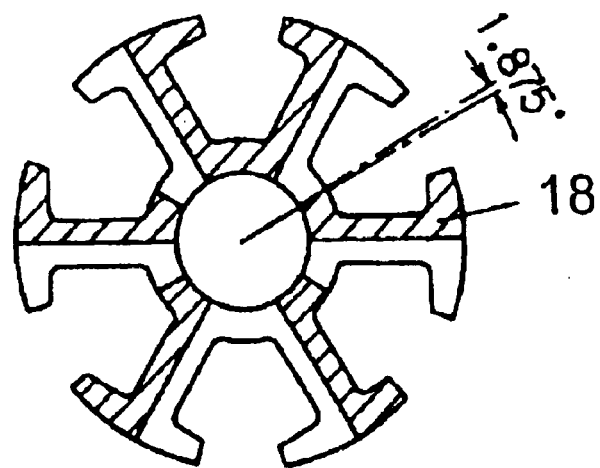

In FIG. 37A, core 16 is made of two core halves laterally inverted each other. For the upper half of core 16, the salient pole tips are disposed with an equal angular pitch (60° in mechanical angle), and the opening angles of salient pole tips 41 on a half side of the upper core are 33.75° (150° in electrical angle−one-quarter the cycle of basic cogging torque), and the opening angles of salient pole tips 42 on the other side of the upper core are 41.25° (150° in electrical angle+one-quarter the cycle of the basic cogging torque). The lower half of the core is configured by laterally inverting the upper half. Like the eleventh through thirteenth embodiments, this core shape is also a combination of cores 17 and 18 shown in FIGS. 38A and 38B, though it may be rather complicated.

Unlike the cases described in the above twelfth and thirteenth embodiments, the shape of the fourteenth embodiment intends to unbalance the lateral magnetic condition. This unbalanced condition adds moment force of always attracting the magnet toward one direction, thus providing an action for preventing the rotor from whirling with some deviation. This shape is advantageous to improve rotational accuracy when slide bearings such as an oil impregnated metal powder sintered bearing are used as the bearing.

Fifteenth Embodiment

Figure 39A:
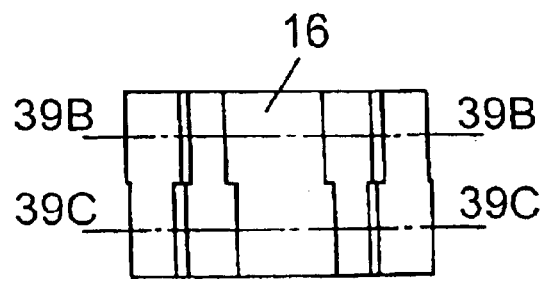
FIG. 39A illustrates a vertical section of a laminated core shape in accordance with a fifteenth embodiment of the present invention.
Figure 39B:
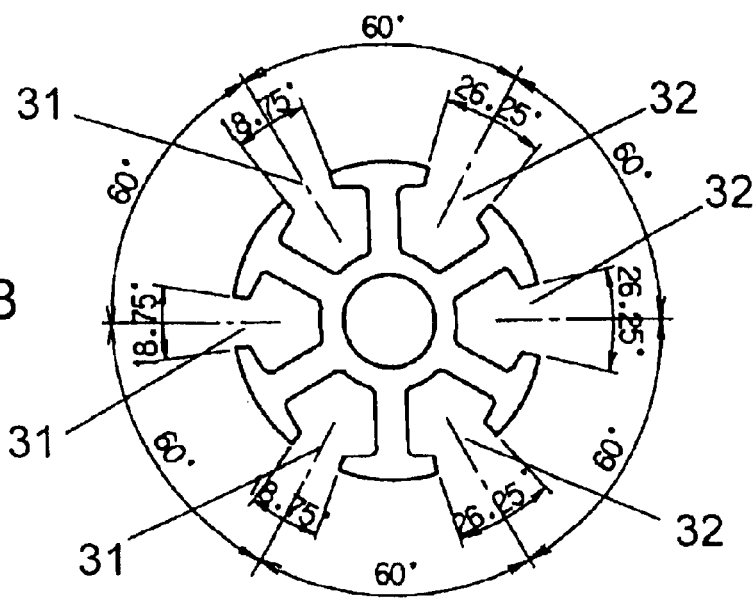
FIG. 39B illustrates a cross section taken on line 39B—39B of the core shape shown in FIG. 39A.
Figure 39C:
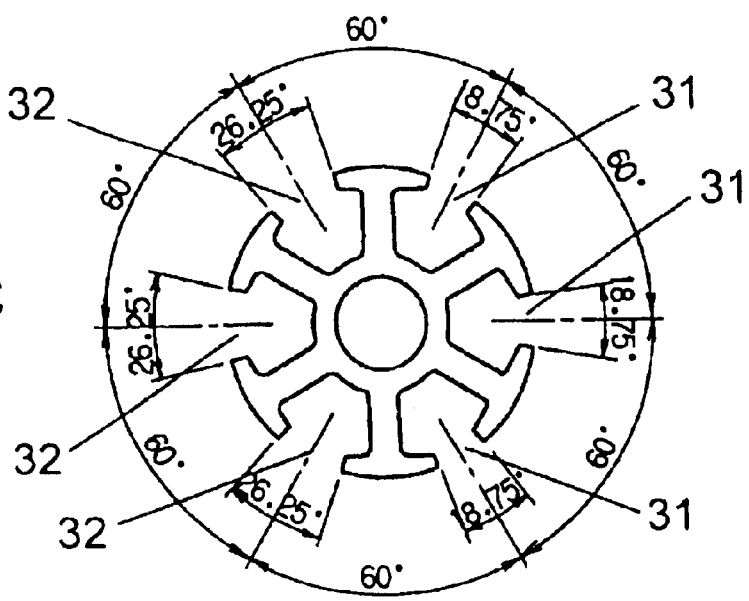
FIG. 39C illustrates a cross section taken on line 39C—39C of the core shape shown in FIG. 39A.
Figure 40A:
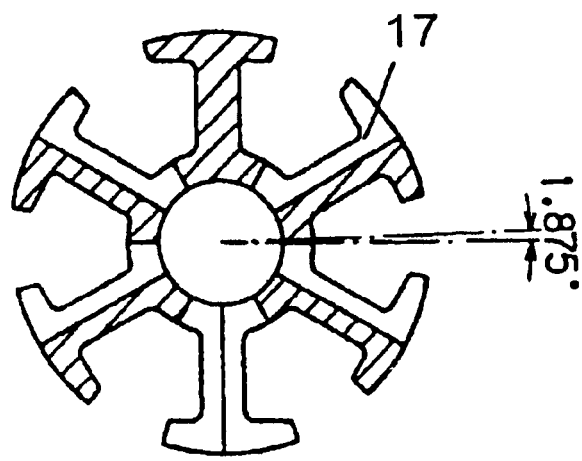
FIGS. 40A and 40B illustrate the configuration of core sections constituting the core shape shown in FIG. 39A.
Figure 40B:
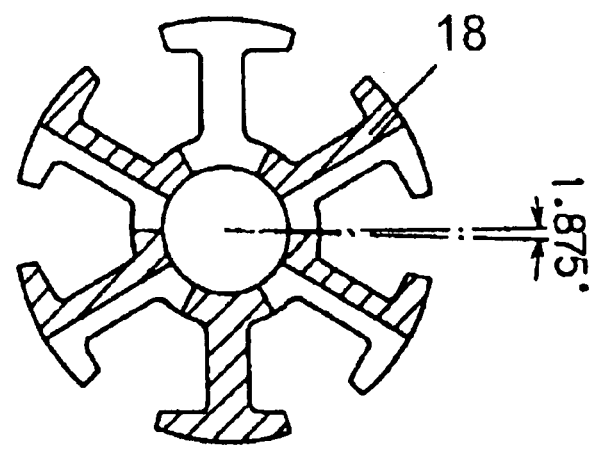

FIGS. 39A through 39C show core shapes in accordance with a fifteenth embodiment. Also in this embodiment, like the eleventh through fourteenth embodiments, a case where the number of magnet poles is "8" and the number of core slots is "6" is described as an example.

In FIG. 39A, core 16 is made by placing a core half over the other core half. In the upper half of core 16, slots are disposed with an equal angular pitch (60° in mechanical angle), and slots 31 on a half side of the upper core have an opening angle of 18.75° (90° in electrical angle−one-quarter the cycle of basic cogging torque) and slots 32 on the other half have an opening angle of 26.25° (90° in electrical angle+one-quarter the cycle of the basic cogging torque). The lower half is configured by laterally inverting the upper half. With intentionally unbalanced lateral magnetic condition like the eleventh through fourteen embodiments mentioned above, this shape also has the same effects that have been produced by the fourteenth embodiment. Furthermore, for the fifteenth embodiment, slots 32 having a larger opening angle disposed on one side serve as suitable spaces for placing position sensitive elements such as Hall elements.

Sixteenth Embodiment

The sixteenth and seventeenth embodiments below will describe how to improve volumetric efficiency of a motor as well as its rotational accuracy by applying the same techniques.

Figure 41A:
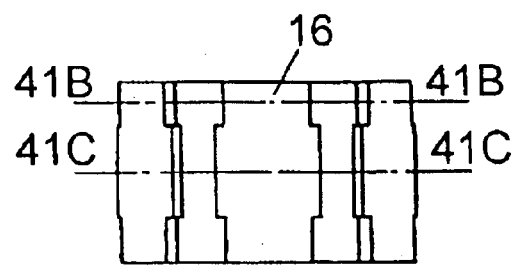
FIG. 41A illustrates a vertical section of a laminated core shape in accordance with a sixteenth embodiment of the present invention.
Figure 41B:
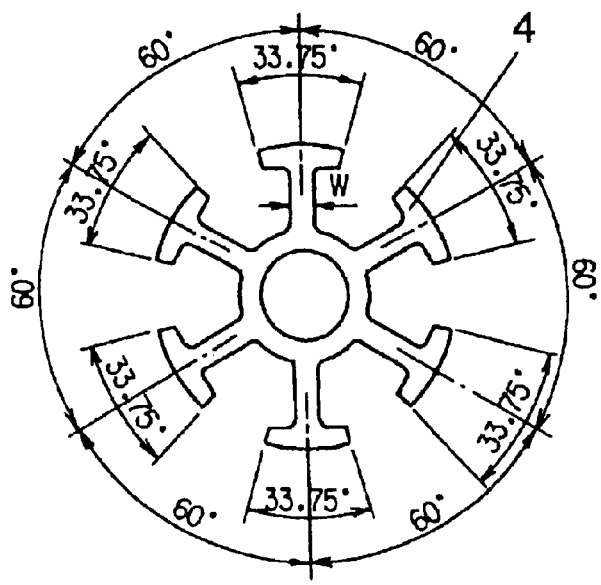
FIG. 41B illustrates a cross section taken on line 41B—41B of the core shape shown in FIG. 41A.
Figure 41C:
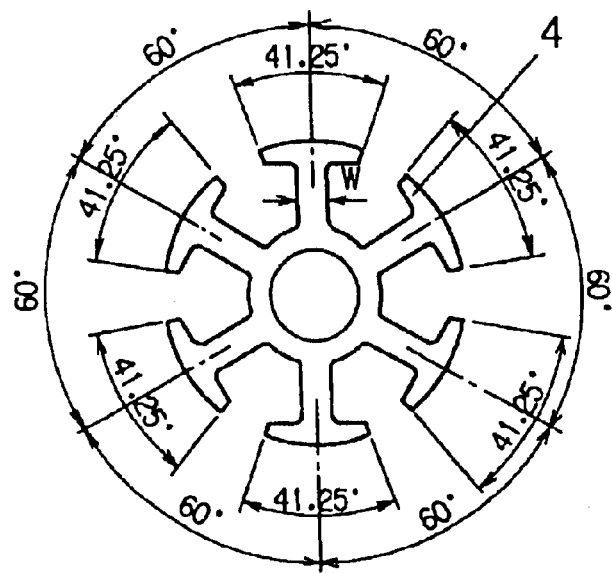
FIG. 41C illustrates a cross section taken on line 41C—41C of the core shape shown in FIG. 41A.

FIGS. 41A through 41C show core shapes in accordance with the sixteenth embodiment. Also in this embodiment, like the eleventh through fifteenth embodiments mentioned above, a case where the number of magnet poles is "8" and the number of core slots is "6" is described as an example.

While cores are made of upper and lower two halves in the eleventh through fifteenth embodiments, core 16 is configured by combining upper, middle, and lower thirds.

The core shapes of upper and lower thirds are identical. In each of these thirds, as shown in FIG. 41B, salient pole tips 4 are disposed with an equal angular pitch, and salient pole tips have an opening angle of 33.75° (150° in electrical angle–one-quarter the cycle of basic cogging torque). In the middle third of the core as shown in FIG. 41C, salient pole tips 4 are disposed with an equal angular pitch, and salient pole tips have an opening angle of 41.25° (150° in electrical angle+one-quarter the cycle of the basic cogging torque).

In addition to different opening angels of the salient pole tips, core 16 of the sixteenth embodiment is characterized in that the salient pole winding parts are narrower in the upper and lower thirds than the middle third.

Figure 42A:
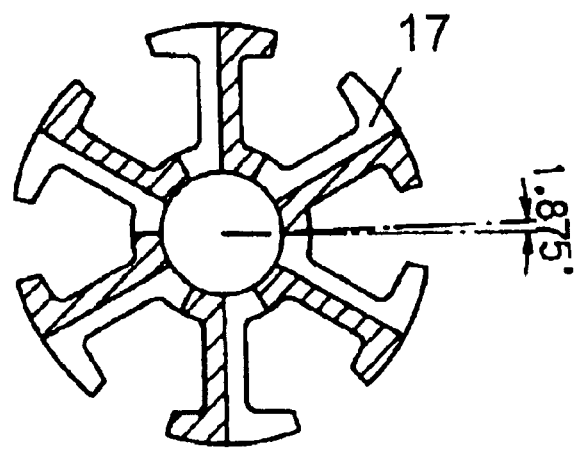
FIGS. 42A and 42B illustrate the configuration of core sections constituting the core shape shown in FIG. 41A.
Figure 42B:
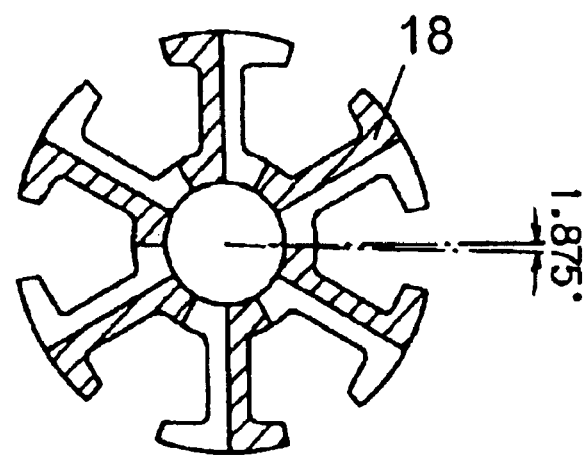

The core of the sixteenth embodiment is configured as follows. Each of the upper and lower thirds of core 16 is configured by combining the diagonally shaded parts of cores 17 and 18 shown in FIGS. 42A and 42B, respectively. The middle third of core 16 shown in FIG. 41C is configured by the parts other than the diagonally shaded parts of cores 17 and 18 shown in FIGS. 42A and 42B. This structure can considerably reduce the cogging torque like the eleventh trough fifteenth embodiments mentioned above.

In addition, for core 16 of the sixteenth embodiment, width W1 of each salient pole winding part in the upper and lower thirds is made smaller than width W2 of each salient pole winding part in the middle third, reflecting the difference in the opening angles of salient pole tips. This is because there is no problem with magnetic properties in the upper and lower thirds even though they have narrower winding parts. Since the opening angles of salient pole tips are smaller in the upper and lower thirds, the quantity of magnetic flux passing through the salient pole winding parts thereof is smaller.

Figure 43A:
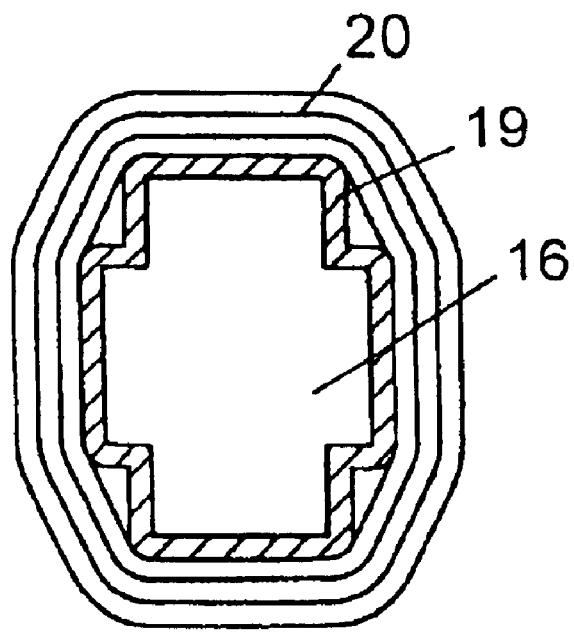
FIG. 43A shows a cross-sectional view of a salient-pole winding part of a core in accordance with the sixteenth embodiment of the present invention.

On the contrary, such narrower salient pole winding parts can produce the following effects. FIG. 43A shows a cross section of a salient pole winding part of a core in accordance with the sixteenth embodiment; and FIG. 43B shows a cross section of a salient pole winding part having a uniform width for comparison.

Figure 43B:
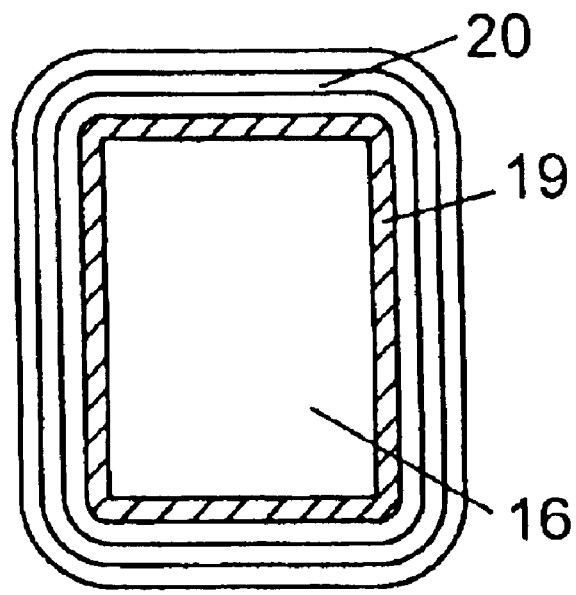
FIG. 43B shows a cross-sectional view of a salient-pole winding part of a core having a constant width of the present invention.

As shown in FIGS. 43A and 43B, insulation coatings 19 are applied to the cores and coils 20 are wound thereon. As clearly understood by the comparison of FIGS. 43A and 43B, the length of the coils per turn is shorter in the case shown in FIG. 43A. For this reason, when the both cores are wound by the same coil, the coils shown in FIG. 43A have lower resistance, thus producing higher volumetric efficiency of the motor. In addition, in this case, since the shape of wound coil 20 is hexagonal, the pressure applied to core edges is distributed at eight points. Thus, even with thinner coating than shown in FIG. 43B, the equivalent insulating performance can be maintained, and volumetric efficiency of the motor can be improved by winding up more coils into the space saved by the thinner insulation.

Seventeenth Embodiment

Figure 44A:
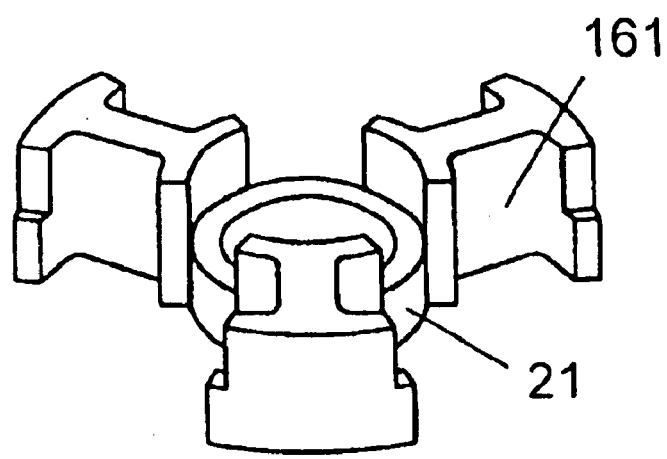
FIGS. 44A and 44B illustrate core parts in accordance with a seventeenth embodiment of the present invention.
Figure 44B:
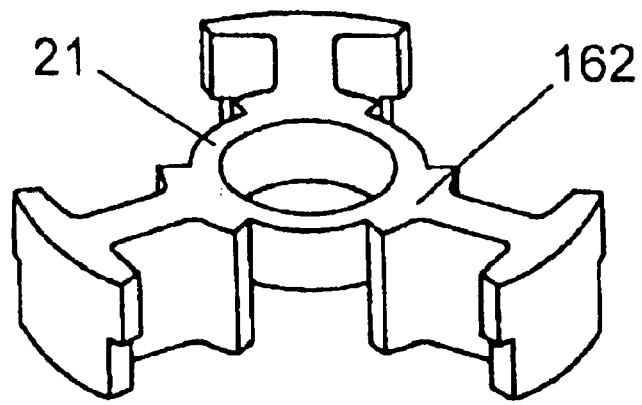

FIGS. 44A and 44B show core shapes in accordance with the seventeenth embodiment. In FIG. 44A, core 161 has three salient poles. The inner walls of the respective three salient poles are joined at lower part thereof by annular part 21. The upper core part having the three respective salient poles is configured so that its salient pole tips are disposed with an equal angular pitch, and the salient pole tips have an opening angle of 33.75° (150° in electrical angle–one-quarter the cycle of basic cogging torque). The lower core part is configured so that its salient pole tips are disposed with an equal angular pitch, and the salient pole tips have an opening angle of 41.25° (150° in electrical angle+one-quarter the cycle of the basic cogging torque).

In FIG. 44B, core 162 is identical to core 161 in configuration, but vertically inverted. Combining respective annular parts 21 of cores 161 and 162 together will make a core shape identical to that of the above fourteenth embodiment, thereby providing a motor with minimized cogging torque.

Moreover, winding coils on cores 161 and 162 with both cores separated and assembling them thereafter allows coils to be wound on the area where adjacent salient poles have hindered the winding in conventional structures. This substantially improves the space factor of coils, thus volumetric efficiency of the motor.

Thus, separating the core into several identical core parts makes it possible to substantially improve the motor characteristics while minimizing a rise in manufacturing costs of cores.

In the above-mentioned case, the core shape in accordance with the fourteenth embodiment has been separated into several parts. Similarly, the core shapes in accordance with the twelfth, thirteenth, fifteenth, and sixteenth embodiments can be separated into several identical core parts.

The above-mentioned eleven through seventeenth embodiments are examples designed according to a basic configuration in which opening angles of core slots are set to 90° in mechanical angle. However, as described in the first embodiment, it is preferable to set the opening angles of the slots of the basic configuration to an appropriate value ranging from 80° to 95° and from 20° to 35°. When the number of magnet poles are set to 2m (m is an integer), the above-mentioned preferable range of slot opening angles can be expressed as from $(80/m)°$ to $(95/m)°$ and from $(20/m)°$ to $(35/m)°$ in mechanical angle. Each of the above-mentioned embodiments having opening angles of core slots set to 90° in electrical angle can be generalized by replacing 90° in electrical angle with an appropriate value ranging from $(80/m)°$ to $(95/m)°$ and from $(20/m)°$ to $(35/m)°$ in mechanical angle.

Furthermore, the above-mentioned preferable range can be generalized for the opening angles of salient pole tips. When a ratio of the number of magnet poles to the number of core slots is 4:3, for a core having salient pole tips whose opening angles are set to 150° in electrical angle, the preferable range of salient pole tip opening angles can be generalized by replacing 150° in electrical angle with an appropriate value ranging from $(145/m)°$ to $(160/m)°$ and from $(205/m)°$ to $(220/m)°$ in mechanical angle in a similar manner.

The above-mentioned eleventh through seventeenth embodiments are typical examples of the core shapes in accordance of the present invention and other shapes can be used as well. In general, when the number of magnet poles is 2m and the number of core slots is 3n (m and n are integers), a basic configuration of a core shape producing cogging torque having one-half the cycle of basic cogging torque is determined by setting its slot opening angles to an appropriate value ranging from 80° to 95° and from 20° to 35° in electrical angle (from (80/m)° to (95/m)° and from (20/m)° to (35/m)° in mechanical angle). In addition, making coplanar and axial combinations of two shapes each having the slots displaced by an angle equal to one-quarter the cycle of the basic cogging torque ((90/k)° in mechanical angle [k is a least common multiple of 2m and 6n]) can provide a motor in which the cogging torque has one-quarter the cycle of the basic cogging torque as well as a considerably reduced absolute value.

Eighteenth Embodiment

For the above-mentioned eleventh through seventeenth embodiments, one-quarter the cycle of basic cogging torque has been generated by a combination of two core shapes. In the following embodiments, techniques of further reducing the cogging torque with a combination of four core shapes will be described.

In the eighteenth embodiment, an example in which four core shapes generating cogging torque waveforms 90° out of phase each other are combined will be described.

Figure 45A:
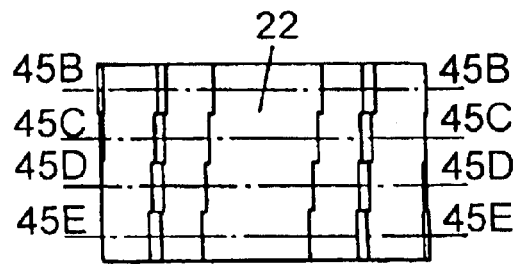
FIG. 45A illustrates a vertical section of a laminated core shape in accordance with an eighteenth embodiment of the present invention.
Figure 45B:
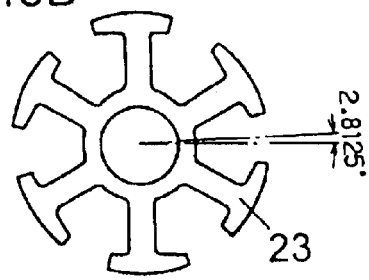
Figure 45C:
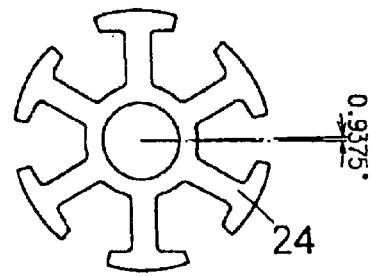
Figure 45D:
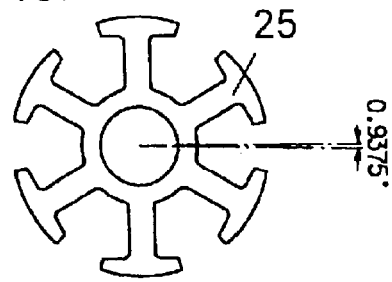
Figure 45E:
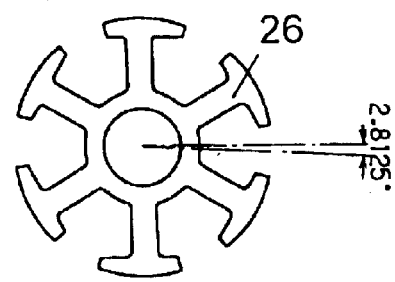

FIG. 45A shows a core shape in accordance with the eighteenth embodiment. Also in this embodiment, a case where the number of magnet poles is "8" and the number of core slots is "6" is described as an example. Since the number of magnet poles is "8", a mechanical angle of 90° corresponds to an electrical angle of 360°. The least common multiple of "8" and "6" is "24"; and thus the cycle of basic cogging torque is 15° in mechanical angle, or 60° in electrical angle.

Four core shapes constituting core 22 of the eighteenth embodiment are shown in FIGS. 45B through 45E. Core 22 is configured by these four core shapes 23, 24, 25 and 26 placed one on another so that salient pole tips of each core are 1.875° (one-eighth the cycle of the basic cogging torque) displaced from each other. This structure makes cogging torque waveforms generated by respective cores 90° out of phase each other.

For the cogging torque waveform generated by core 22 that is a combination of the respective torque waveforms generated by these four core shapes, odd-numbered- and second-order components of respective cogging torque waveforms are cancelled. Therefore, the cogging torque is reduced to an extent that its cycle is one-quarter the cycle of and its absolute value is much smaller than those generated by the cores of the eleventh through seventeenth embodiments.

Nineteenth Embodiment

In the eighteenth embodiment, an example of an axial combination of the plane configurations of four cores has been described. According to the idea of these eleventh through fifteenth embodiments, not only axial but also coplanar combinations of core plane configurations can be made.

FIGS. 46A through 46C show core shapes in accordance with a nineteenth embodiment. Also in this embodiment, a case where the number of magnetic poles is "8" and the number of core slots is "6" is described as an example. In FIG. 46A, core 22 is configured by vertically combining two halves. The upper half has a plane configuration shown in FIG. 46B, and the lower half has a plane configuration shown in FIG. 46C.

Similar to the eighteenth embodiment, this core 22 is made of a combination of four shapes shown in FIGS. 47A through 47D generating cogging torque waveforms 90° out of phase each other. In other words, the plane configuration shown in FIG. 46B is made by combining the diagonally shaded parts of cores 23 and 24 shown in FIGS. 47A and 47B; and the plane configuration shown in FIG. 46C is made by combining the diagonally shaded parts of cores 25 and 26 shown in FIGS. 47C and 47D. This structure can provide a motor generating extremely minimized cogging torque with a combination of two instead of four core shapes, though making this structure is slightly complicated.

Furthermore, the plane configurations of the upper and lower halves of core 22 are laterally inverted. Therefore, since two core halves are combined with one half inverted, only one type of core shape is sufficient; and thus only one die is needed for manufacturing the core. This allows motor characteristics to be improved while maintaining a rise in manufacturing costs.

According to the same idea, other core shapes can be produced.

FIGS. 48A through 48C show another example of a core shape in accordance with the nineteenth embodiment. In FIG. 48A, core 22 is configured by vertically combining two halves. The upper half has a plane configuration shown in FIG. 48B, and the lower half has a plane configuration shown in FIG. 48C.

The plane configuration shown in FIG. 48B is made by combining the diagonally shaded parts of cores 23 and 24 shown in FIGS. 49A and 49B; and the plane configuration shown in FIG. 48C is made by combining the diagonally shaded parts of cores 25 and 26 shown in FIGS. 49C and 49D. With this structure, the same effects produced by the core shown in FIG. 46A can be expected.

The above-mentioned are typical examples; and similarly, various types of other cores can be produced by making not only axial but also coplanar combinations of core plane configurations. Specifically designed combinations allow motor characteristics to be improved while minimizing a rise in costs of manufacturing complicated core shapes.

While combinations of four core shapes have been described in the examples of the eighteenth and nineteenth embodiments, the same techniques can be used for three or more core shapes. In general, when the number of magnet poles is 2m and the number of core slots is 3m (m and n are integers), a basic configuration of a core shape is determined by setting its slot opening angles to an appropriate value ranging from 80° to 95° and from 20° to 35° in electrical angle (from (80/m)° to (95/m)° and from (20/m)° to (35/m)° in mechanical angle). In addition, combining j core shapes each having the slots displaced by an angle equal to one-2j-th (j is an integer equal to 3 or more) the cycle of basic cogging torque ((180/(j·K)° in mechanical angle [k is a least common multiple of 2m and 6n]) allows the cogging torque to have one-sixth the cycle of the basic cogging torque and its absolute value to be reduced considerably.

In the above descriptions of each embodiment, the methods of manufacturing cores have not been referred to specifically. The above-mentioned respective core shapes can be made relatively easily by processing a thin plate of magnetic material (e.g. silicon steel plate) with a press technique.

While cases where the magnetic field generating means is a magnet have been shown for each of these embodiments, the same effects can be expected if other magnetic field generating means such as an electromagnet or a rotor with interior magnet are used. Furthermore, while a magnet is outside and a core is inside for each embodiment mentioned above, the same effects can be expected when a magnet is inside and a core is outside. Moreover, while a magnet rotates with respect to a core for each of these embodiments, the same effects can be expected when a core rotates with respect to a fixed magnet.

For each of these embodiments, shown are cases in which the angular displacement of the slots in respective core shapes to be combined is one-quarter (one-sixth or one-eighth) the cycle of basic cogging torque. In order to maximize the effect of this invention, the displacement should strictly be set to the above-mentioned angle. Even when the angle is not strictly set to the above-mentioned value for the convenience of manufacturing, setting the value within ±10% allows the reduction of the second-order components of basic cogging torque by 70%; and whereby practical reduction of cogging torque can be accomplished, though its effect is smaller.

Twentieth Embodiment

For each embodiment mentioned above, only core shapes have contributed to the reduction of cogging torque. In the twentieth embodiment, a method of further reducing cogging torque using polarization configurations together with the above-mentioned core shapes will be described.

For the twentieth embodiment, the core shape of the second embodiment will be described as an example. FIG. 50 is a schematic representation showing polarized condition of magnet 2 in accordance with the twentieth embodiment. As shown in FIG. 50, magnet 2 is polarized so that poles are inclined a predetermined angle with respect to the center of magnet 2. FIG. 51A shows how cogging torque varies with a change in this angle of inclination β (hereinafter referred to as a "skew angle"). FIG. 51B shows how motor efficiency varies with a change in skew angle β.

As shown in FIG. 51A, cogging torque is minimized when skew angle β forms an angle of about 3.75°(one-quarter the cycle of the basic cogging torque) or 7.5°(one-half the cycle of the basic cogging torque) with respect to the center of the motor. This is because axially averaged cogging torque is output to the motor axis by providing a skew angle equivalent to one (or two) cycle(s) of the cogging torque.

On the other hand, motor efficiency decreases as the skew angle is increased. Therefore, when it is desired to reduce cogging torque and maintain motor efficiency at the same, the skew angle should be set to 3.75°(one-quarter the cycle of the cogging torque); and when reduction of cogging torque is mainly desired, the skew angle should be set to 7.5°(one-half the cycle of the cogging torque). Thus, a motor with extremely excellent characteristics can be provided.

For the twentieth embodiment, efficient cogging torque reduction effects can be produced with a skew angle equal to or less than one-half (more preferably, one-quarter) the cycle of the basic cogging torque without affecting motor efficiency.

Actually, the angle at which cogging torque is minimized may vary by 10% or the like with variations in the axial lengths of the magnet and core. Generally, the skew angle should be set to $200/k°$ or less (k is a least common multiple of 2m and 3n) in central angle, more preferably to $(80/k)°$ to $(100/k)°$.

One of the conventional methods of providing a skew angle on a magnet in a similar manner is disclosed in Japanese Patent Publication No. 2588661. However, in the nineteenth embodiment of the present invention, efficient cogging torque reduction effects can be obtained with one-half or less the angle provided on the above-mentioned conventional magnet. The present invention also has excellent effects of improving motor characteristics while minimizing ill effects caused by a larger skew angle.

As described above, this invention can provide a motor generating cogging torque having a short cycle and reduced absolute value. In addition, canceling different cogging torque waveforms in the same motor further shortens the cycle and considerably decreases the absolute value of the cogging torque.

What is claimed is:

1. A core for use in a motor, said motor including N and S magnetic poles for generating a magnetic field to which said core is opposed, said core comprising:

a plurality of slots formed in said core, said slots have an electrical angle which is one of:

a) between 80 degrees and 95 degrees; and b) between 20 degrees and 35 degrees wherein a first portion of said core is displaced from a second portion of said core by an angle equal to ¼ of a basic cogging torque cycle of said motor a number of said magnetic poles is 2m and a number of said slots is 6n (m and n are integers).

2. The core as described in claim 1 wherein a ratio of said number of magnetic poles to said number of slots is 4:3, said core is configured so that opening angles of salient pole tips of said core are constant at electrical angle γ ranging from 145° to 160° ((γ/m)° in mechanical angle), and said core is configured so that the salient pole tips on a half side of said core are displaced clockwise by an angle equal to one-eighth the cycle of the basic cogging torque ((45/k)° in mechanical angle, where k is the least common multiple of 2m and 6n), and the salient pole tips on the other half side are displaced counterclockwise by the same angle.

3. The core as described in claim 1 wherein a ratio of said number of magnetic pales to said number of slots is 4:3, said core is configured so that opening angles of salient pole tips of said core are constant at an electrical angle δ ranging from 205° to 220° ((δ/m)° in mechanical angle), and said core is configured so that the salient pole tips on a half side of said core are displaced clockwise by an angle equal to one-eighth the cycle of the basic cogging torque ((45/k)° in mechanical angle, where k is the least common multiple of 2m and 6n), and the salient pole tips on the other half side are displaced counterclockwise by the same angle.

4. The core as described in claim 1 wherein said core is configured so that opening angles of slots of said core are constant at an electrical angle a ranging from 80° to 95° ((α/m)° in mechanical angle), and said core is configured so that the slots on a half side of said core are displaced clockwise by an angle equal to one-eighth the cycle of the basic cogging torque ((45/k)° in mechanical angle, where k is the least common multiple of 2m and 6n), and the slots on the other half side are displaced counterclockwise by the same angle.

5. The core as described in claim 1 wherein said core is configured so that opening angles of slots of said core are constant at an electrical angle β ranging from 20° to 35° ((β/m)° in mechanical angle), and said core is configured so that the slots on a half side of said core are displaced clockwise by an angle equal to one-eighth the cycle of the basic cogging torque ((45/k)° in mechanical angle, where k is the least common multiple of 2m and 6n), and the slots on the other half side are displaced counterclockwise by the same angle.

6. The core as described in claim 1 wherein
said core is configured so that slots of said core are disposed with an equal angular pitch, and slots each having an opening angle equal to an electrical angle α (80° to 95°)–one-quarter the cycle of the basic cogging torque ((α/m−90/k)° in mechanical angle, where k is the least common multiple of 2m and 6n) and slots each having an opening angle equal to the electrical angle α (80° to 95°)+one-quarter the cycle of the basic cogging torque ((α/m+90/k)° in mechanical angle) are alternately provided.

7. The core as described in claim 1 wherein
said core is configured so that slots of said core are disposed with an equal angular pitch, and slots each having an opening angle equal to an electrical angle β (20° to 35°)–one-quarter the cycle of the basic cogging torque (((β/m−90/k)° in mechanical angle, where k is the least common multiple of 2m and 6n) and slots each having an opening angle equal to the electrical angle β (20° to 35°)+one-quarter the cycle of the basic cogging torque ((β/m+90/k)° in mechanical angle) are alternately provided.

8. The core as described in claim 1 wherein
a ratio of said number of magnetic poles to said number of slots is 4:3, and
said core is configured so that salient pole tips of said core are disposed with an equal angular pitch, and salient poles each having an opening angle equal to an electrical angle γ (145° to 160°)–one-quarter the cycle of the basic cogging torque ((γ/m−90/k)° in mechanical angle, where k is the least common multiple of 2m and 6n) and salient poles each having an opening angle equal to the electrical angle γ (145° to 160°)+one-quarter the cycle of the basic cogging torque ((γ/m+90/k)° in mechanical angle) are alternately provided.

9. The core as described in claim 1 wherein
a ratio of said number of magnetic poles to said number of slots is 4:3, and
said core is configured so that salient pole tips of said core are disposed with an equal angular pitch, and salient poles each having an opening angle equal to an electrical angle δ (205° to 220°)–one-quarter the cycle of the basic cogging torque ((δ/m−90/k)° in mechanical angle, where k is the least common multiple of 2m and 6n) and salient poles each having an opening angle equal to the electrical angle δ (205° to 220°)+one-quarter the cycle of the basic cogging torque ((δ/m+90/k)° in mechanical angle) are alternately provided.

10. The core as described in claim 1 wherein
a ratio said number of magnetic poles to said number of slots is 4:3, and
said core is configured so that salient pole tips of said core are disposed with an equal angular pitch, and salient poles on a half side of said core have an opening angle equal to an electrical angle γ (145° to 160°)–one-quarter the cycle of the basic cogging torque ((γ/m−90/k)° in mechanical angle, where k is the least common multiple of 2m and 6n) and salient poles on the other half have an opening angle equal to the electrical angle γ (145° to 160°)+one-quarter the cycle of the basic cogging torque ((γ/m+90/k)° in mechanical angle).

11. The core as described in claim 1 wherein
a ratio of said number of magnetic poles to said number of slots is 4:3, and
said core is configured so that salient pole tips of said core are disposed with an equal angular pitch, and salient poles on a half side of said core have an opening angle equal to an electrical angle δ (205° to 220°)–one-quarter the cycle of the basic cogging torque ((δ/m−90/k)° in mechanical angle, where k is the least common multiple of 2m and 6n) and salient poles on the other half have an opening angle equal to the electrical angle δ (205° to 220°)+one-quarter the cycle of the basic cogging torque ((δ/m+90/k)° in mechanical angle).

12. The core as described in claim 1 wherein
said core is configured so that slots of said core are disposed with an equal angular pitch, and slots on a half side of said core have an opening angle equal to an electrical angle α (80° to 95°)–one-quarter the cycle of the basic cogging torque ((α/m−90/k)° in mechanical angle, where k is the least common multiple of 2m and 6n) and slots on the other half have an opening angle equal to the electrical angle α (80 ° to 95°)+one-quarter the cycle of the basic cogging torque ((α/m+90/k)° in mechanical angle).

13. The core as described in claim 1 wherein
said core is configured so that slots of said core are disposed with an equal angular pitch, and slots on a half side of said core have an opening angle equal to an electrical angle β (20° to 35°)–one-quarter the cycle of the basic cogging torque ((β/m−90/k)° in mechanical angle, where k is the least common multiple of 2m and 6n) and slots on the other half have an opening angle equal to the electrical angle β (20° to 35°)+one-quarter the cycle of the basic cogging torque ((β/m+90/k)° in mechanical angle).

14. A core for use in a motor, said motor including N and S magnetic poles for generating a magnetic field to which said core is opposed, said core comprising:
a plurality of slots formed in said core, said slots have an electrical angle which is one of:
a) between 80 degrees and 95 degrees; and
b) between 20 degrees and 35 degrees
a number of said magnetic poles is 2m and a number of said slot is 3n (m and n are integers)
wherein said core is configured by making coplanar and axial combinations of two core shapes each having the slots displaced by an angle equal to one-quarter the cycle of basic cogging torque ((90/k)° in mechanical angle, where k is a least common multiple of 2m and 3n).

15. The core as described in claim 14 wherein
said core has two different plane configurations in an axial direction, and is configured so that the opening angles of slots are constant at an electrical angle α ranging from 80° to 95° ((α/m)° in mechanical angle), and salient pole tips in an upper half are displaced clockwise by an angle equal to one-eighth the cycle of the basic cogging torque ((45/k)° in mechanical angle, where k is the least common multiple of 2m and 3n) and salient pole tips in a lower half are displaced counterclockwise by the same angle.

16. The core as described in claim 14 wherein
said core has two different plane configurations in an axial direction, and is configured so that the opening angles of slots of said core are constant at an electrical angle β ranging from 20° to 35° ((β/m)° in mechanical angle), and salient pole tips in a upper half are displaced clockwise by an angle equal to one-eighth the cycle of the basic cogging torque ((45/k)° in mechanical angle, where k is the least common multiple of 2m and 3n) and salient pole tips in a lower half are displaced counterclockwise by the same angle.

17. The core as described in claim 14 wherein said core has two different plane configurations in an axial direction, an upper half of said core is configured so that slots of said half are disposed with an equal angular pitch, and slots each having an opening angle equal to an electrical angle α (80° to 95°)−one-quarter the cycle of the basic cogging torque ((α/m−90/k)° in mechanical angle, where k is the least common multiple of 2m and 3n) and slots each having an opening angle equal to the electrical angle α (85° to 95°)+one-quarter the cycle of the basic cogging torque ((α/m+90/k)° in mechanical angle) are alternately provided, and a lower half of said core is configured as a laterally inverted upper half.

18. The core as described in claim 14 wherein said core has two different plane configurations in an axial direction, an upper half of said core is configured so that slots of said half are disposed with an equal angular pitch, and slots each having an opening angle equal to an electrical angle β (20° to 35°)−one-quarter the cycle of the basic cogging torque ((β/m−90/k)° in mechanical angle, where k is the least common multiple of 2m and 3n) and slots each having an opening angle equal to the electrical angle β (25° to 35°)+one-quarter the cycle of the basic cogging torque ((β/m+90/k)° in mechanical angle) are alternately provided, and a lower half of said core is configured as a laterally inverted the upper half.

19. The core as described in claim 14 wherein said core has two different plane configurations in an axial direction, an upper half of said core is configured so that opening angles of slots of said half are constant at an electrical angle a ranging from 80° to 95° ((α/m)° in mechanical angle), and slots disposed with an angular pitch equal to a quotient of 360° divided by the number of the slots+one-quarter the cycle of the basic cogging torque ((120/m+90/k)° in mechanical angle, where k is the least common multiple of 2m and 3n) and slots disposed with an angular pitch equal to the quotient of 360° divided by the number of the slots−one-quarter the cycle of the basic cogging torque ((120/m−90/k)° in mechanical angle, where k is the least common multiple of 2m and 3n) are alternately provided, and the lower half of said core is configured as a vertically inverted upper half.

20. The core as described in claim 14 wherein said core has two different plane configurations in an axial direction, an upper half of said core is configured so that opening angles of slots of said half are constant at an electrical angle β ranging from 20° to 35° ((/β/m)° in mechanical angle), and slots disposed with an angular pitch equal to a quotient of 360° divided by the number of the slots+one-quarter the cycle of the basic cogging torque ((120/m+90/k)° in mechanical angle, where k is the least common multiple of 2m and 3n) and slots disposed with an angular pitch equal to the quotient of 360° divided by the number of the slots−one-quarter the cycle of the basic cogging torque ((120/m−90/k)° in mechanical angle, where k is the least common multiple of 2m and 3n) are alternately provided, and a lower half of said core is configured as a vertically inverted upper half.

21. The core as described in claim 14 wherein a ratio of said number of magnetic poles to said number of slots is 4:3, said core has two different plane configurations in an axial direction, an upper half of said core is configured so that salient pole tips of said core are disposed with an equal angular pitch, and salient poles on a half side of said upper core half have an opening angle equal to an electrical angle γ (145° to 160°)−one-quarter the cycle of the basic cogging torque ((γ/m−90/k)° in mechanical angle, where k is the least common multiple of 2m and 3n) and salient poles on the other half side have an opening angle equal to the electrical angle γ (145° to 160°)+one-quarter the cycle of the basic cogging torque ((γ/m+90/k)° in mechanical angle) and, a lower half of said core is configured as a laterally inverted upper half.

22. The core as described in claim 14 wherein a ratio of said number of magnetic poles to said number of slots is 4:3, said core has two different plane configurations in an axial direction, an upper half of said core is configured so that salient pole tips of said core are disposed with an equal angular pitch, and salient pales on a half side of said upper core half have an opening angle equal to an electrical angle δ (205° to 220°)−one-quarter the cycle of the basic cogging torque ((δ/m−90/k)° in mechanical angle, where k is the least common multiple of 2m and 3n) and salient poles on the other half side have an opening angle equal to the electrical angle δ (205° to 220°)+one-quarter the cycle of the basic cogging torque ((δ/m+90/k)° in mechanical angle) and, a lower half of said core is configured as a laterally inverted upper half.

23. The core as described in claim 14 wherein said core has two different plane configurations in an axial direction, an upper half of said core is configured so that slots of said core are disposed with an equal angular pitch, and slots on a half side of the upper core half have an opening angle equal to an electrical angle α (80° to 95°)−one-quarter the cycle of the basic cogging torque ((α/m−90/k)° in mechanical angle, where k is the least common multiple of 2m and 3n) and slots on the other half side have an opening angle equal to the electrical angle α (80° to 95°)+one-quarter the cycle of the basic cogging torque ((α/m+90/k)° in mechanical angle), and a lower half of said core is configured as a laterally inverted upper half.

24. The core as described in claim 14 wherein
said core has two different plane configurations in an axial direction,
an upper half of said core is configured so that slots of said core are disposed with an equal angular pitch, and slots on a half side of the upper core half have an opening angle equal to an electrical angle β (20° to 35°)–one-quarter the cycle of the basic cogging torque ((β/m–90/k)° in mechanical angle, where k is the least common multiple of 2m and 3n) and slots on the other half side have an opening angle equal to the electrical angle β (20° to 35°)+one-quarter the cycle of the basic cogging torque ((β/m+90/k)° in mechanical angle), and
a lower half of said core is configured as a laterally inverted upper half.

25. The core as described in claim 14 wherein
said core is structured by combining a plurality of separated cores whose inner walls of a plurality of salient poles are joined by an annular part.

26. The core as described in claim 25 wherein
said separated cores are shaped identical.

27. The core as described in claim 1 wherein
said core is structured by laminating thin plates of magnetic material.

28. The core as described in claim 14 wherein
said core is structured by laminating thin plates of magnetic material.

29. A motor including:
(a) magnetic field generating means having N and S magnetic poles for generating a magnetic field; and
(b) a core made of magnetic material and opposed to said magnetic field generating means;
wherein one of said magnetic field generating means and said core rotates with respect to the other,
wherein a number of said magnetic poles is 2m and a number of slots of said core is 6n (m and n are integers),
a plurality of slots formed in said core, said slots have an electrical angle which is one of:
a) between 80 degrees and 95 degrees; and
b) between 20 degrees and 35 degrees
wherein said core is configured by combining two core shapes each having the slots displaced by an angle equal to one-quarter the cycle of basic cogging torque ((90/k)° in mechanical angle, where k is a least common multiple of 2m and 6n).

30. A motor including:
(a) magnetic field generating means having N and S magnetic poles for generating a magnetic field; and
(b) a core made of magnetic material and opposed to said magnetic field generating means;
wherein one of said magnetic field generating means and said core rotates with respect to the other,
wherein a number of said magnetic poles is 2m and a number of slots of said core is 3n (m and n are integers),
a plurality of slots formed in said core, said slots have an electrical angle which is one of:
a) between 80 degrees and 95 degrees; and
b) between 20 degrees and 35 degrees
wherein said core is configured by making coplanar and axial combinations of two core shapes each having the slots displaced by an angle equal to one-quarter the cycle of basic cogging torque ((90/k)° in mechanical angle, where k is a least common multiple of 2m and 3n).

31. The motor described in claim 30 wherein
polarization is performed at a skew angle of (200/k)° or less in central angle (k is the least common multiple of 2m and 3n).

32. The motor described in claim 31 wherein
polarization is performed at a skew angle ranging from (80/k)° to (100/k)° in said central angle.

* * * * *